United States Patent
Resch et al.

(10) Patent No.: US 10,042,703 B2
(45) Date of Patent: Aug. 7, 2018

(54) ENCRYPTING DATA FOR STORAGE IN A DISPERSED STORAGE NETWORK

(71) Applicant: International Business Machines Corporation, Armonk, NY (US)

(72) Inventors: Jason K. Resch, Chicago, IL (US); Greg Dhuse, Chicago, IL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/193,335

(22) Filed: Jun. 27, 2016

(65) Prior Publication Data

US 2016/0306699 A1    Oct. 20, 2016

Related U.S. Application Data

(63) Continuation of application No. 13/868,311, filed on Apr. 23, 2013, now Pat. No. 9,380,032.

(Continued)

(51) Int. Cl.
*H04L 29/06* (2006.01)
*H04L 29/08* (2006.01)
(Continued)

(52) U.S. Cl.
CPC .......... *G06F 11/1076* (2013.01); *G06F 3/064* (2013.01); *G06F 3/067* (2013.01); *G06F 3/0619* (2013.01); *H04L 9/0861* (2013.01); *H04L 63/0428* (2013.01); *H04L 67/1097* (2013.01); *H04L 9/0822* (2013.01);
(Continued)

(58) Field of Classification Search
CPC ........ G06F 11/108; G06F 3/067; G06F 3/064; H04L 63/0428; H04L 63/0435; H04L 63/06; H04L 67/1097
See application file for complete search history.

(56) References Cited

U.S. PATENT DOCUMENTS

| | | |
|---|---|---|
| 3,906,480 A | 9/1975 | Schwartz et al. |
| 4,092,732 A | 5/1978 | Ouchi |

(Continued)

OTHER PUBLICATIONS

J. Maucher, V. V. Zyablov and M. Bossert, "On the equivalence of generalized concatenated codes and generalized error location codes," Mar. 2000, IEEE Transactions on Information Theory, vol. 46, No. 2, pp. 642-649.*

(Continued)

*Primary Examiner* — Nelson Giddins
(74) *Attorney, Agent, or Firm* — Garlick & Markison; Timothy W. Markison

(57) ABSTRACT

A method includes generating a data matrix from the data, wherein the data matrix includes a plurality of columns and a plurality of rows. The method further includes generating a chunkset data matrix from one or more rows of the data matrix. The method further includes matrix multiplying the chunkset data matrix by an encoding matrix to produce a chunkset slice matrix, wherein a row of the chunkset slice matrix corresponds to an encoded data slice and wherein the plurality of rows of the chunkset slice matrix corresponds to a set of encoded data slices, wherein a decode threshold number of encoded data slices of the set of encoded data slices is needed to recover the data grouping associated with the one or more rows of the data matrix.

10 Claims, 62 Drawing Sheets

Related U.S. Application Data

(60) Provisional application No. 61/637,940, filed on Apr. 25, 2012.

(51) Int. Cl.
*G06F 3/06* (2006.01)
*G06F 11/10* (2006.01)
*H04L 9/08* (2006.01)
*H04W 12/04* (2009.01)

(52) U.S. Cl.
CPC .......... *H04L 63/0435* (2013.01); *H04L 63/06* (2013.01); *H04L 2463/061* (2013.01); *H04W 12/04* (2013.01)

(56) References Cited

U.S. PATENT DOCUMENTS

| | | | |
|---|---|---|---|
| 5,454,101 A | 9/1995 | Mackay et al. | |
| 5,485,474 A | 1/1996 | Rabin | |
| 5,551,020 A | 8/1996 | Flax et al. | |
| 5,774,643 A | 6/1998 | Lubbers et al. | |
| 5,802,364 A | 9/1998 | Senator et al. | |
| 5,809,285 A | 9/1998 | Hilland | |
| 5,890,156 A | 3/1999 | Rekieta et al. | |
| 5,987,622 A | 11/1999 | Lo Verso et al. | |
| 5,991,414 A | 11/1999 | Garay et al. | |
| 6,012,159 A | 1/2000 | Fischer et al. | |
| 6,058,454 A | 5/2000 | Gerlach et al. | |
| 6,128,277 A | 10/2000 | Bruck et al. | |
| 6,175,571 B1 | 1/2001 | Haddock et al. | |
| 6,192,472 B1 | 2/2001 | Garay et al. | |
| 6,256,688 B1 | 7/2001 | Suetaka et al. | |
| 6,272,658 B1 | 8/2001 | Steele et al. | |
| 6,301,604 B1 | 10/2001 | Nojima | |
| 6,356,949 B1 | 3/2002 | Katsandres et al. | |
| 6,366,995 B1 | 4/2002 | Vilkov et al. | |
| 6,374,336 B1 | 4/2002 | Peters et al. | |
| 6,415,373 B1 | 7/2002 | Peters et al. | |
| 6,418,539 B1 | 7/2002 | Walker | |
| 6,449,688 B1 | 9/2002 | Peters et al. | |
| 6,567,948 B2 | 5/2003 | Steele et al. | |
| 6,571,282 B1 | 5/2003 | Bowman-Amuah | |
| 6,609,223 B1 | 8/2003 | Wolfgang | |
| 6,718,361 B1 | 4/2004 | Basani et al. | |
| 6,760,808 B2 | 7/2004 | Peters et al. | |
| 6,785,768 B2 | 8/2004 | Peters et al. | |
| 6,785,783 B2 | 8/2004 | Buckland | |
| 6,826,711 B2 | 11/2004 | Moulton et al. | |
| 6,879,596 B1 | 4/2005 | Dooply | |
| 7,003,688 B1 | 2/2006 | Pittelkow et al. | |
| 7,024,451 B2 | 4/2006 | Jorgenson | |
| 7,024,609 B2 | 4/2006 | Wolfgang et al. | |
| 7,080,101 B1 | 7/2006 | Watson et al. | |
| 7,103,824 B2 | 9/2006 | Halford | |
| 7,103,915 B2 | 9/2006 | Redlich et al. | |
| 7,111,115 B2 | 9/2006 | Peters et al. | |
| 7,140,044 B2 | 11/2006 | Redlich et al. | |
| 7,146,644 B2 | 12/2006 | Redlich et al. | |
| 7,171,493 B2 | 1/2007 | Shu et al. | |
| 7,222,133 B1 | 5/2007 | Raipurkar et al. | |
| 7,240,236 B2 | 7/2007 | Cutts et al. | |
| 7,272,613 B2 | 9/2007 | Sim et al. | |
| 7,636,724 B2 | 12/2009 | de la Torre et al. | |
| 7,801,308 B1 | 9/2010 | Hang | |
| 8,266,430 B1 | 9/2012 | Lumb | |
| 8,352,847 B2 * | 1/2013 | Gunnam | G06F 17/16 714/758 |
| 8,379,843 B2 | 2/2013 | Shirai et al. | |
| 8,483,423 B2 | 7/2013 | Malik et al. | |
| 8,627,073 B2 | 1/2014 | Kherani et al. | |
| 8,662,396 B2 | 3/2014 | Berkun et al. | |
| 8,949,691 B2 * | 2/2015 | Shinohara | H03M 13/13 714/752 |
| 8,984,384 B1 * | 3/2015 | Juels | G06F 21/64 714/800 |
| 9,137,492 B2 * | 9/2015 | Lima | H04L 1/1812 |
| 9,529,834 B2 * | 12/2016 | Resch | G06F 17/30864 |
| 2002/0062422 A1 | 5/2002 | Butterworth et al. | |
| 2002/0166079 A1 | 11/2002 | Ulrich et al. | |
| 2003/0018927 A1 | 1/2003 | Gadir et al. | |
| 2003/0037261 A1 | 2/2003 | Meffert et al. | |
| 2003/0046635 A1 * | 3/2003 | Murillo | H03M 13/19 714/781 |
| 2003/0065617 A1 | 4/2003 | Watkins et al. | |
| 2003/0084020 A1 | 5/2003 | Shu | |
| 2003/0196023 A1 * | 10/2003 | Dickson | G06F 11/1076 711/1 |
| 2004/0024963 A1 | 2/2004 | Talagala et al. | |
| 2004/0049687 A1 | 3/2004 | Orsini et al. | |
| 2004/0122917 A1 | 6/2004 | Menon et al. | |
| 2004/0151107 A1 * | 8/2004 | Plotnikov | H03M 13/00 370/203 |
| 2004/0152428 A1 * | 8/2004 | Plotnikov | H03M 13/00 455/91 |
| 2004/0165724 A1 | 8/2004 | Choi et al. | |
| 2004/0215998 A1 | 10/2004 | Buxton et al. | |
| 2004/0228493 A1 | 11/2004 | Ma | |
| 2004/0243814 A1 | 12/2004 | Nakano et al. | |
| 2005/0100022 A1 | 5/2005 | Ramprashad | |
| 2005/0114594 A1 | 5/2005 | Corbett et al. | |
| 2005/0125593 A1 | 6/2005 | Karpoff et al. | |
| 2005/0131993 A1 | 6/2005 | Fatula | |
| 2005/0132070 A1 | 6/2005 | Redlich et al. | |
| 2005/0144382 A1 | 6/2005 | Schmisseur | |
| 2005/0168358 A1 | 8/2005 | Kuznetsov et al. | |
| 2005/0229069 A1 | 10/2005 | Hassner et al. | |
| 2006/0047907 A1 | 3/2006 | Shiga et al. | |
| 2006/0136448 A1 | 6/2006 | Cialini et al. | |
| 2006/0156059 A1 | 7/2006 | Kitamura | |
| 2006/0224603 A1 | 10/2006 | Correll | |
| 2006/0248434 A1 | 11/2006 | Radke et al. | |
| 2006/0250941 A1 | 11/2006 | Onggosanusi et al. | |
| 2007/0079081 A1 | 4/2007 | Gladwin et al. | |
| 2007/0079082 A1 | 4/2007 | Gladwin et al. | |
| 2007/0079083 A1 | 4/2007 | Gladwin et al. | |
| 2007/0088970 A1 | 4/2007 | Buxton et al. | |
| 2007/0174192 A1 | 7/2007 | Gladwin et al. | |
| 2007/0214285 A1 | 9/2007 | Au et al. | |
| 2007/0234110 A1 | 10/2007 | Soran et al. | |
| 2007/0283167 A1 | 12/2007 | Venters et al. | |
| 2008/0170591 A1 * | 7/2008 | Kameyama | H04L 1/0041 370/476 |
| 2009/0089642 A1 * | 4/2009 | Miles | H03M 13/118 714/752 |
| 2009/0094251 A1 | 4/2009 | Gladwin et al. | |
| 2009/0094318 A1 | 4/2009 | Gladwin et al. | |
| 2009/0147958 A1 | 6/2009 | Calcaterra et al. | |
| 2010/0023524 A1 | 1/2010 | Gladwin et al. | |
| 2010/0061465 A1 | 3/2010 | Limberg | |
| 2010/0138719 A1 * | 6/2010 | Lee | H03M 13/1102 714/752 |
| 2010/0241923 A1 * | 9/2010 | Wang | H03M 13/253 714/755 |
| 2010/0266120 A1 * | 10/2010 | Leggette | G06F 11/1012 380/28 |
| 2011/0029756 A1 * | 2/2011 | Biscondi | H03M 13/1114 712/22 |
| 2011/0115654 A1 | 5/2011 | Kameyama et al. | |
| 2011/0125771 A1 * | 5/2011 | Gladwin | G06F 17/30067 707/758 |
| 2011/0131462 A1 * | 6/2011 | Gunnam | G06F 17/16 714/752 |
| 2011/0138192 A1 | 6/2011 | Kocher et al. | |
| 2011/0185149 A1 | 7/2011 | Gruhl et al. | |
| 2011/0238987 A1 | 9/2011 | Kherani et al. | |
| 2011/0243324 A1 * | 10/2011 | Lima | H04L 1/1812 380/212 |
| 2011/0264984 A1 * | 10/2011 | Murakami | H03M 13/1102 714/758 |
| 2011/0289351 A1 * | 11/2011 | Rashmi | G06F 11/1662 714/6.32 |

(56) References Cited

U.S. PATENT DOCUMENTS

| | | | |
|---|---|---|---|
| 2011/0317839 A1 | 12/2011 | Yoneda | |
| 2012/0057696 A1 | 3/2012 | Chew | |
| 2012/0110409 A1 | 5/2012 | Gherman et al. | |
| 2012/0173949 A1* | 7/2012 | Liu | H03M 13/116 714/752 |
| 2012/0272036 A1* | 10/2012 | Muralimanohar | G06F 12/0238 711/202 |
| 2013/0024687 A1* | 1/2013 | Lumb | G06F 21/62 713/165 |
| 2013/0044818 A1* | 2/2013 | Jiang | H04N 19/90 375/240.22 |
| 2013/0166992 A1* | 6/2013 | Shinohara | H03M 13/036 714/766 |
| 2013/0170433 A1* | 7/2013 | Summerson | H04W 28/065 370/328 |
| 2013/0173956 A1* | 7/2013 | Anderson | G06F 11/1076 714/6.24 |
| 2013/0173996 A1* | 7/2013 | Anderson | H03M 13/373 714/770 |
| 2013/0262854 A1* | 10/2013 | Gladwin | G06F 17/30067 713/150 |
| 2013/0297993 A1* | 11/2013 | Murakami | H03M 13/036 714/786 |
| 2014/0185803 A1* | 7/2014 | Lima | H04L 1/1812 380/212 |
| 2014/0331085 A1* | 11/2014 | Dhuse | G06F 11/1076 714/6.24 |
| 2015/0074388 A1* | 3/2015 | Josa | H04L 63/0428 713/154 |
| 2015/0142923 A1* | 5/2015 | Josa | H04L 63/0428 709/219 |
| 2015/0163060 A1* | 6/2015 | Tomlinson | H04L 9/304 380/30 |
| 2016/0203382 A1* | 7/2016 | Gardiner | G06K 9/4633 382/190 |
| 2016/0254889 A1* | 9/2016 | Shattil | H04L 5/0035 370/329 |
| 2017/0005845 A1* | 1/2017 | Moon | H04B 7/0413 |
| 2017/0126301 A1* | 5/2017 | Taherzadehboroujeni | H04B 7/0669 |

OTHER PUBLICATIONS

Shamir; How to Share a Secret; Communications of the ACM; vol. 22, No. 11; Nov. 1979; pp. 612-613.

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 1511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

\* cited by examiner distributed computing system 10

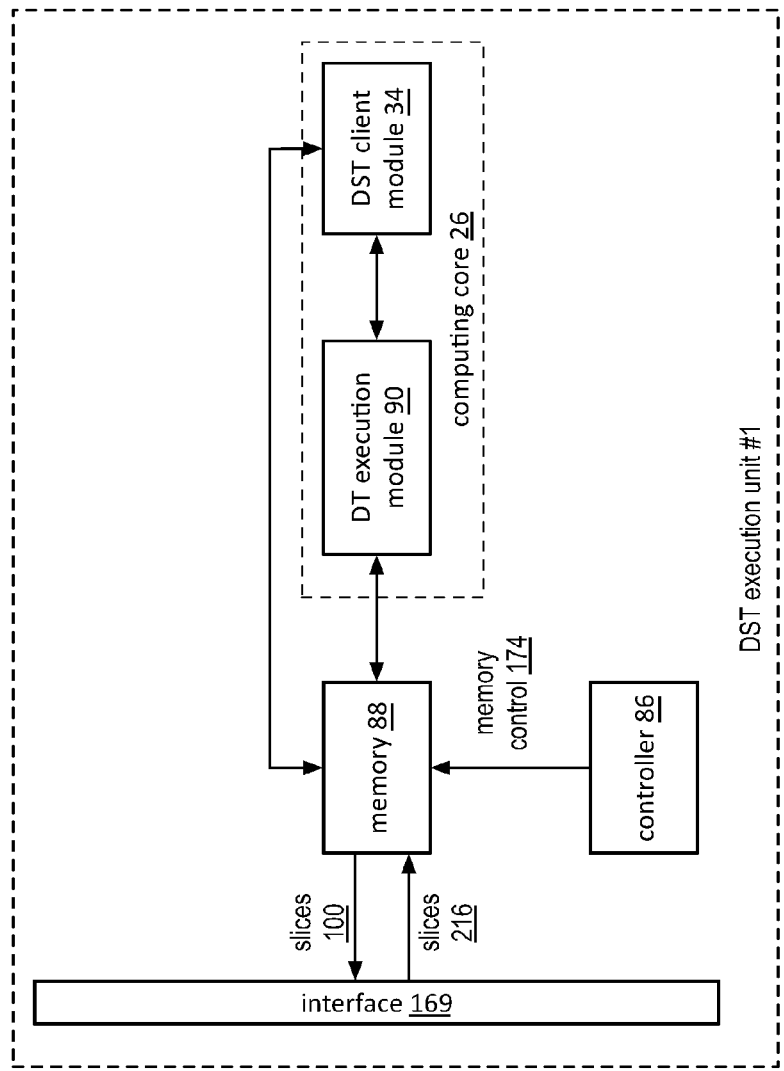
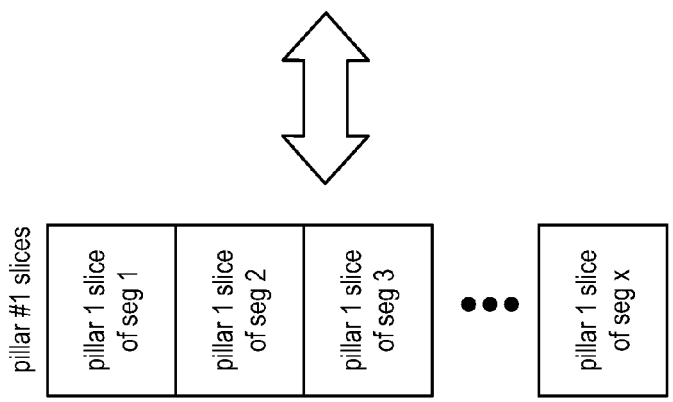
FIG. 24

DST allocation info 242: data partition info 320: W data ID; No. of partitions; Addr. info for each partition; format conversion indication

| | task execution info 322 | | | | intermediate result info 324 | | |
|---|---|---|---|---|---|---|---|
| task 326 | task ordering 328 | data partition 330 | set of DT EX mods 332 | Name 334 | interm. result processing 336 | scratch pad storage 338 | intermediate result storage 340 |
| 1_1 | none | 2_1 - 2_z | 1_1, 2_1, 3_1, 4_1, & 5_1 | R1-1 | DST unit 1 | DST unit 1 | DST units 1-5 |
| 1_2 | none | 2_1 - 2_4 | 1_1, 2_1, 3_1, 4_1, & 5_1 | R1-2 | DST unit 1 | DST unit 1 | DST units 1-5 |
| 1_3 | none | 2_1 - 2_4<br>2_5 - 2_z | 1_1, 2_1, 3_1, 4_1, & 5_1<br>1_2, 2_2, 3_2, 4_2, & 5_2 | R1-3 | DST unit 2 | DST unit 2 | DST units 2-6 |
| 1_4 | after 1_3 | R1-3_1 - R1-3_4<br>R1-3_5 - R1-3_z | 1_1, 2_1, 3_1, 4_1, & 5_1<br>1_2, 2_2, 6_1, 7_1, & 7_2 | R1_4 | DST unit 3 | DST unit 3 | DST units 3-7 |
| 1_5 | after 1_4 | R1-4_1 - R1-4_z &<br>2_1 - 2_z | 1_1, 2_1, 3_1, 4_1, & 5_1 | R1-5 | DST unit 1 | DST unit 1 | DST units 1-5 |
| 1_6 | after 1_1 &<br>1_5 | R1-1_1 - R1-1_z &<br>R1-5_1 - R1-5_z | 1_1, 2_1, 3_1, 4_1, & 5_1 | R1-6 | DST unit 2 | DST unit 2 | DST units 2-6 |
| 1_7 | after 1_2 &<br>1_5 | R1-2_1 - R1-2_z &<br>R1-5_1 - R1-5_z | 1_2, 2_2, 3_2, 4_2, & 5_2 | R1-7 | DST unit 3 | DST unit 3 | DST units 3-7 |
| 2 | none | 2_1 - 2_z | 3_1, 4_1, 5_1, 6_1, & 7_1 | R2 | DST unit 7 | DST unit 7 | DST units 7, 1-4 |
| 3_1 | none (same as 1_3) | use R1_3 | | R1-1 | | | |
| 3_2 | after 3_1 | R1-3_1 - R1-3_z | 1_2, 2_2, 3_2, 4_2, & 5_2 | R3-2 | DST unit 5 | DST unit 5 | DST units 5,6, 1-3 |

FIG. 32

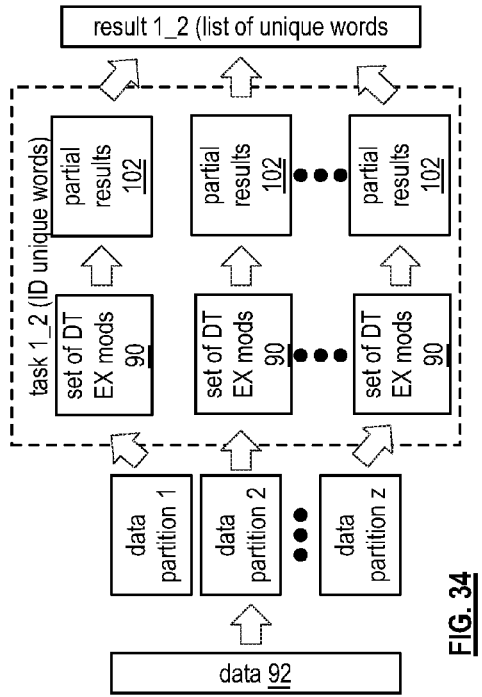
FIG. 34
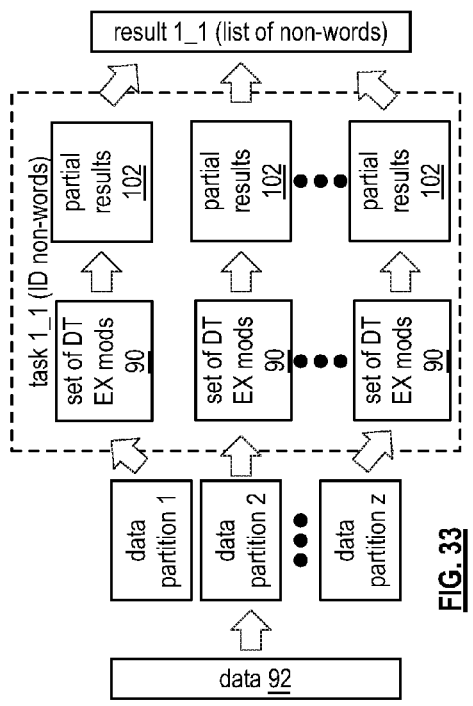
FIG. 33
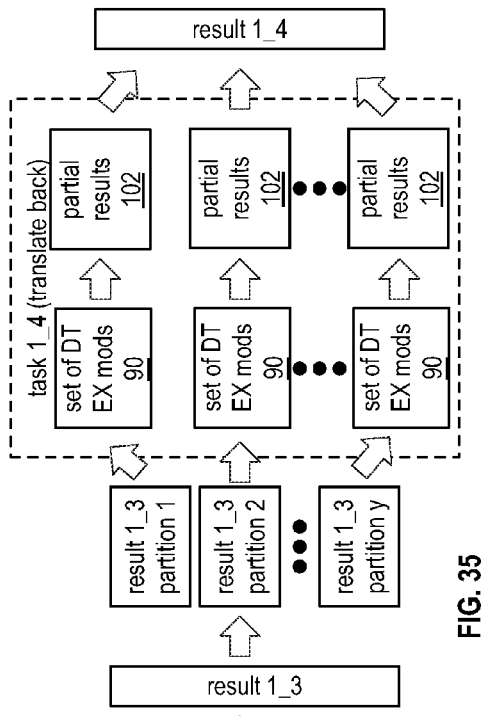
FIG. 35
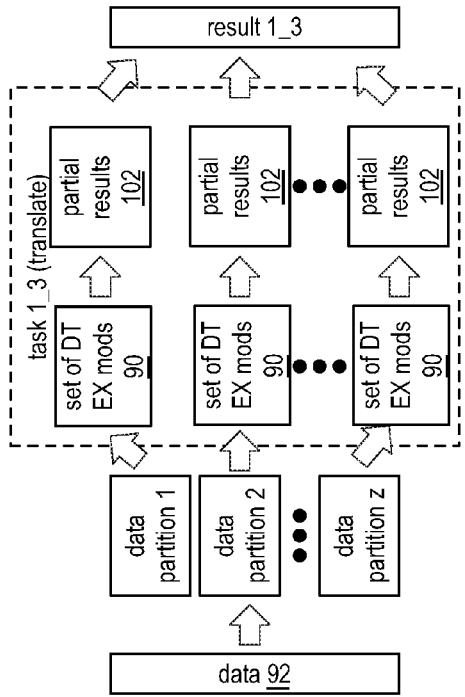

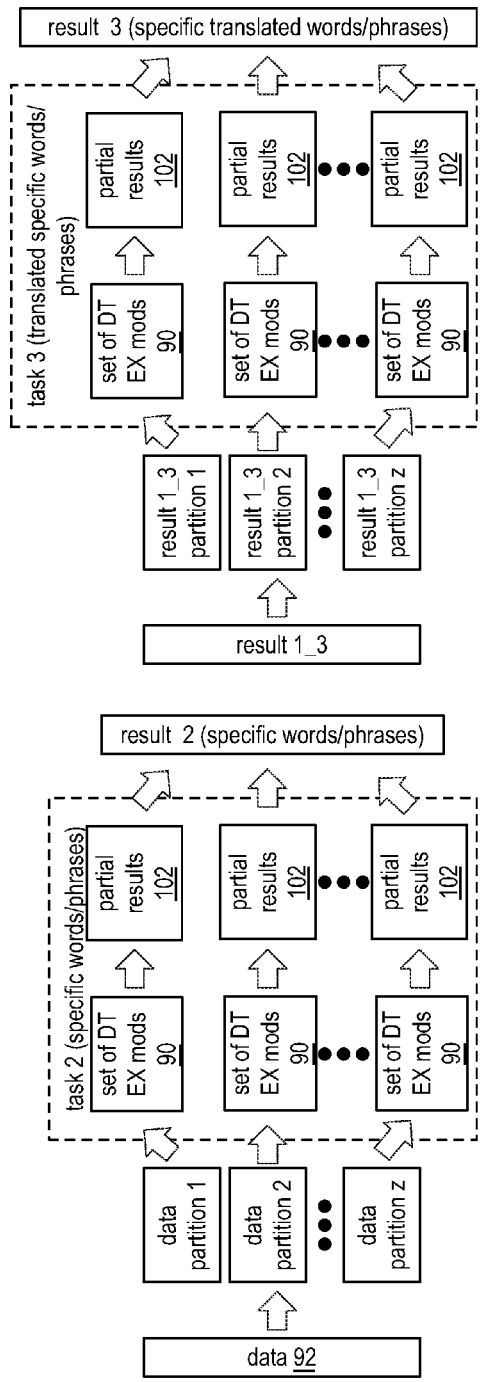
FIG. 38
FIG. 37
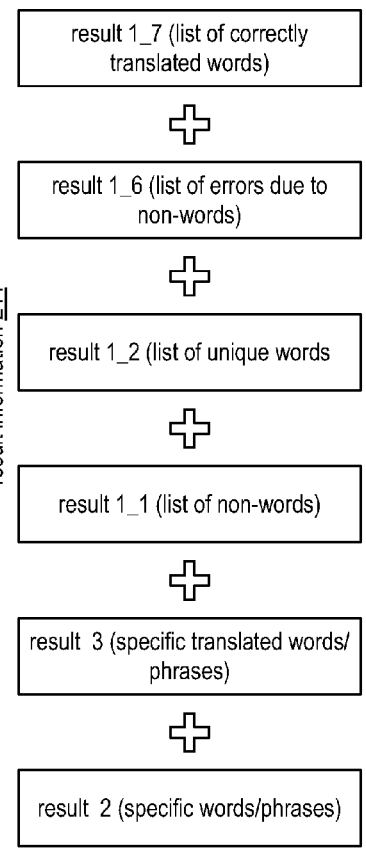
FIG. 39

FIG. 41A

DST EX unit 1 memory

| slice 1,1,1 | slice 2,1,1 | slice 3,1,1 | slice 4,1,1 |
| slice 1,1,2 | slice 2,1,2 | slice 3,1,2 | slice 4,1,2 |
| slice 1,1,3 | slice 2,1,3 | slice 3,1,3 | slice 4,1,3 |
| slice 1,1,4 | slice 2,1,4 | slice 3,1,4 | slice 4,1,4 |

DST EX unit 2 memory

| slice 1,2,1 | slice 2,2,1 | slice 3,2,1 | slice 4,2,1 |
| slice 1,2,2 | slice 2,2,2 | slice 3,2,2 | slice 4,2,2 |
| slice 1,2,3 | slice 2,2,3 | slice 3,2,3 | slice 4,2,3 |
| slice 1,2,4 | slice 2,2,4 | slice 3,2,4 | slice 4,2,4 |

FIG. 41B

DST EX unit 1 memory

| slice 1,1,1 | slice 2,1,1 | slice 3,1,1 | slice 4,1,1 |
| slice 1,2,2 | slice 2,2,2 | slice 3,2,2 | slice 4,2,2 |
| slice 1,3,3 | slice 2,3,3 | slice 3,3,3 | slice 4,3,3 |
| slice 1,4,4 | slice 2,4,4 | slice 3,4,4 | slice 4,4,4 |

DST EX unit 2 memory

| slice 1,2,1 | slice 2,2,1 | slice 3,2,1 | slice 4,2,1 |
| slice 1,3,2 | slice 2,3,2 | slice 3,3,2 | slice 4,3,2 |
| slice 1,4,3 | slice 2,4,3 | slice 3,4,3 | slice 4,4,3 |
| slice 1,5,4 | slice 2,5,4 | slice 3,5,4 | slice 4,5,4 |

| DST EX unit 1 memory | DST EX unit 2 memory | DST EX unit 3 memory | DST EX unit 4 memory | DST EX unit 5 memory |
|---|---|---|---|---|
| slice 1,1,1 | slice 1,2,1 | slice 1,3,1 | EC slice 1,4,1 | EC slice 1,5,1 |
| slice 1,2,2 | slice 1,3,2 | EC slice 1,4,2 | EC slice 1,5,2 | slice 1,1,2 |
| slice 1,3,3 | EC slice 1,4,3 | EC slice 1,5,3 | slice 1,1,3 | slice 1,2,3 |
| EC slice 1,4,4 | EC slice 1,5,4 | slice 1,1,4 | slice 1,2,4 | slice 1,3,4 |
| slice 2,1,1 | slice 2,2,1 | slice 2,3,1 | EC slice 2,4,1 | EC slice 2,5,1 |
| slice 2,2,2 | slice 2,3,2 | EC slice 2,4,2 | EC slice 2,5,2 | slice 2,1,2 |
| slice 2,3,3 | EC slice 2,4,3 | EC slice 2,5,3 | slice 2,1,3 | slice 2,2,3 |
| EC slice 2,4,4 | EC slice 2,5,4 | slice 2,1,4 | slice 2,2,4 | slice 2,3,4 |
| slice 3,1,1 | slice 3,2,1 | slice 3,3,1 | EC slice 3,4,1 | EC slice 3,5,1 |
| slice 3,2,2 | slice 3,3,2 | EC slice 3,4,2 | EC slice 3,5,2 | slice 3,1,2 |
| slice 3,3,3 | EC slice 3,4,3 | EC slice 3,5,3 | slice 3,1,3 | slice 3,2,3 |
| EC slice 3,4,4 | EC slice 3,5,4 | slice 3,1,4 | slice 3,2,4 | slice 3,3,4 |
| slice 4,1,1 | slice 4,2,1 | slice 4,3,1 | EC slice 4,4,1 | EC slice 4,5,1 |
| slice 4,2,2 | slice 4,3,2 | EC slice 4,4,2 | EC slice 4,5,2 | slice 4,1,2 |
| slice 4,3,3 | EC slice 4,4,3 | EC slice 4,5,3 | slice 4,1,3 | slice 4,2,3 |
| EC slice 4,4,4 | EC slice 4,5,4 | slice 4,1,4 | slice 4,2,4 | slice 4,3,4 |
| partial task 1-1 | partial task 2-1 | partial task 3-1 | partial task 1-3 | partial task 1-2 |
| partial task 2-2 | partial task 3-2 | partial task 1-4 | partial task 2-4 | partial task 2-3 |
| partial task 3-3 | | | | partial task 3-4 |

FIG. 44A

| | | | | |
|---|---|---|---|---|
| slice 1,1,1 | slice 2,1,1 | slice 3,1,1 | slice 4,1,1 | partial task 1-1 |
| EC slice 1,4,1 | EC slice 2,4,1 | EC slice 3,4,1 | EC slice 4,4,1 | |
| slice 1,1,2 | slice 2,1,2 | slice 3,1,2 | slice 4,1,2 | partial task 1-2 |
| EC slice 1,5,2 | EC slice 2,5,2 | EC slice 3,5,2 | EC slice 4,5,2 | |
| slice 1,1,3 | slice 2,1,3 | slice 3,1,3 | slice 4,1,3 | partial task 1-3 |
| slice 1,1,4 | slice 2,1,4 | slice 3,1,4 | slice 4,1,4 | partial task 1-4 |
| EC slice 1,4,4 | EC slice 2,4,4 | EC slice 3,4,4 | EC slice 4,4,4 | |

DST EX unit 1 memory

| | | | | |
|---|---|---|---|---|
| slice 1,2,1 | slice 2,2,1 | slice 3,2,1 | slice 4,2,1 | partial task 2-1 |
| EC slice 1,5,1 | EC slice 2,5,1 | EC slice 3,5,1 | EC slice 4,5,1 | |
| slice 1,2,2 | slice 2,2,2 | slice 3,2,2 | slice 4,2,2 | partial task 2-2 |
| slice 1,2,3 | slice 2,2,3 | slice 3,2,3 | slice 4,2,3 | partial task 2-3 |
| EC slice 1,4,3 | EC slice 2,4,3 | EC slice 3,4,3 | EC slice 4,4,3 | |
| slice 1,2,4 | slice 2,2,4 | slice 3,2,4 | slice 4,2,4 | partial task 2-4 |
| EC slice 1,5,4 | EC slice 2,5,4 | EC slice 3,5,4 | EC slice 4,5,4 | |

DST EX unit 2 memory

| | | | | |
|---|---|---|---|---|
| slice 1,3,1 | slice 2,3,1 | slice 3,3,1 | slice 4,3,1 | partial task 3-1 |
| slice 1,3,2 | slice 2,3,2 | slice 3,3,2 | slice 4,3,2 | partial task 3-2 |
| EC slice 1,4,2 | EC slice 2,4,2 | EC slice 3,4,2 | EC slice 4,4,2 | |
| slice 1,3,3 | slice 2,3,3 | slice 3,3,3 | slice 4,3,3 | partial task 3-3 |
| EC slice 1,5,3 | EC slice 2,5,3 | EC slice 3,5,3 | EC slice 4,5,3 | |
| slice 1,3,4 | slice 2,3,4 | slice 3,3,4 | slice 4,3,4 | partial task 3-4 |

DST EX unit 3 memory

DST EX unit 1 memory chunk storage location table 630

| chunk 1 of chunkset 1, chunk ID = F4A7310B58 | |
|---|---|
| slice a | slice b | slice c |

| chunk 2 of chunkset 2, chunk ID = 3649D5B1A0 | |
|---|---|
| slice j | slice k | slice l |

| chunk 3 of chunkset 3, chunk ID = 92A92C891E | |
|---|---|
| slice r | slice s | slice t |

•••

FIG. 49B chunk storage location table 630

| chunk ID 632 | slice name 634 | slice storage location 636 |
|---|---|---|
| F4A7310B58 | a | F528 |
|  | b | F560 |
|  | c | F5E0 |
| 3649D5B1A0 | j | A600 |
|  | k | A630 |
|  | l | A660 |
| 92A92C891E | r | 5F01 |
|  | s | 5F41 |
|  | t | 5F81 |

•••

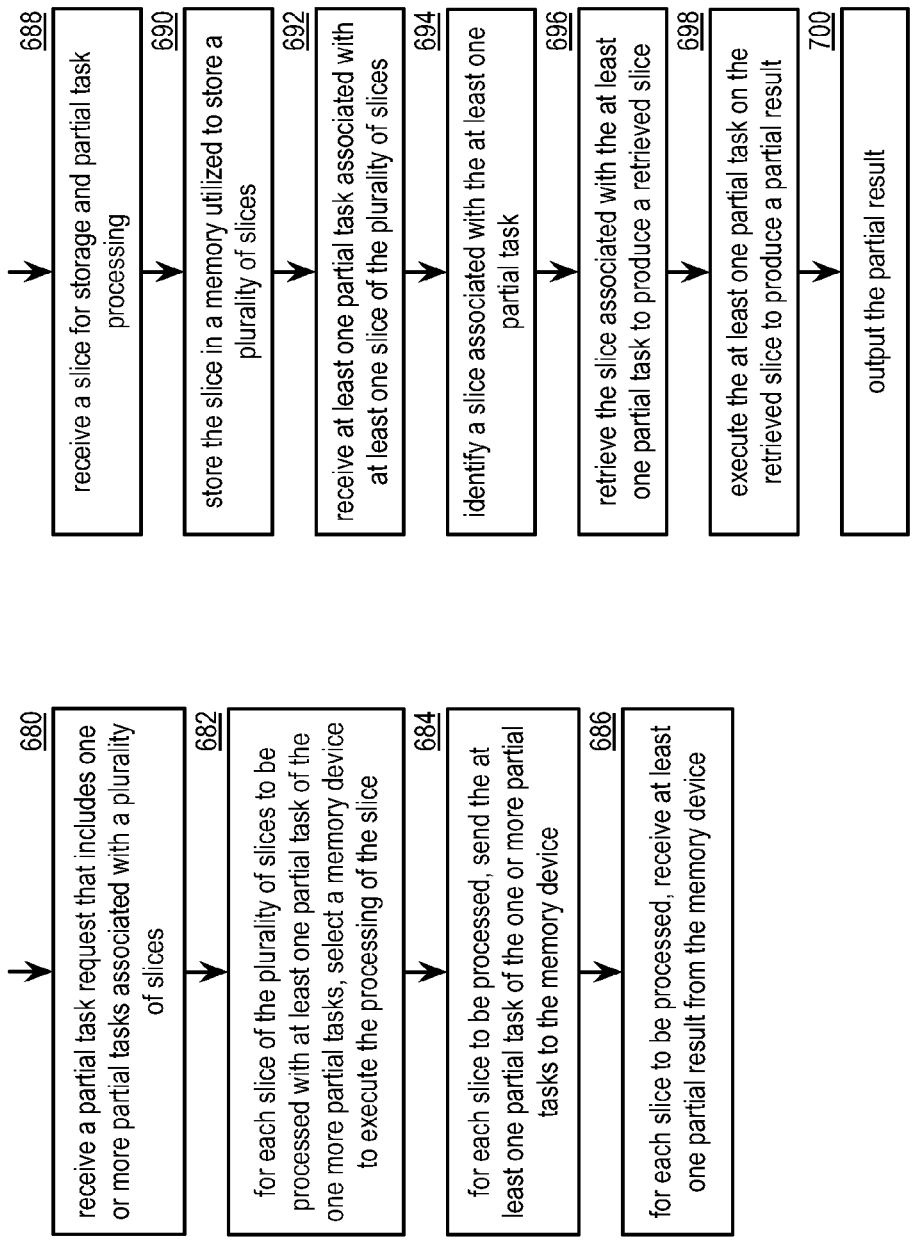

ENCRYPTING DATA FOR STORAGE IN A DISPERSED STORAGE NETWORK

CROSS REFERENCE TO RELATED PATENTS

The present U.S. Utility Patent Application claims priority pursuant to 35 U.S.C. § 120 as a continuation of U.S. Utility application Ser. No. 13/868,311, entitled "ENCRYPTING DATA FOR STORAGE IN A DISPERSED STORAGE NETWORK", filed Apr. 23, 2013, issuing as U.S. Pat. No. 9,380,032, on Jun. 28, 2016, which claims priority pursuant to 35 U.S.C. § 119(e) to U.S. Provisional Application No. 61/637,940, entitled "DATA PROCESSING BY A DISTRIBUTED STORAGE AND TASK EXECUTION UNIT", filed Apr. 25, 2012, both of which are hereby incorporated herein by reference in their entirety and made part of the present U.S. Utility Patent Application for all purposes.

STATEMENT REGARDING FEDERALLY SPONSORED RESEARCH OR DEVELOPMENT

NOT APPLICABLE

INCORPORATION-BY-REFERENCE OF MATERIAL SUBMITTED ON A COMPACT DISC

NOT APPLICABLE

BACKGROUND OF THE INVENTION

Technical Field of the Invention

This invention relates generally to computer networks and more particularly to dispersed storage of data and distributed task processing of data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 24 is a schematic block diagram of an example of a storage operation of a DST execution unit in accordance with the present invention;

FIG. 32 is a diagram of an example of DST allocation information for the example of FIG. 30 in accordance with the present invention;

FIGS. 33-38 are schematic block diagrams of the DSTN module performing the example of FIG. 30 in accordance with the present invention;

FIG. 39 is a diagram of an example of combining result information into final results for the example of FIG. 30 in accordance with the present invention;

FIG. 41A is a diagram illustrating an example of mapping slice groupings to a set of distributed storage and task (DST) execution unit memories in accordance with the present invention;

FIG. 41B is a diagram illustrating another example of mapping slice groupings to a set of distributed storage and task (DST) execution unit memories in accordance with the present invention;

FIG. 44A is a diagram illustrating another example of mapping slice groupings to a set of distributed storage and task (DST) execution unit memories in accordance with the present invention;

FIG. 44B is a diagram illustrating another example of mapping slice groupings to a set of distributed storage and task (DST) execution unit memories in accordance with the present invention;

FIG. 49A is a diagram illustrating an example of identifying stored chunks in accordance with the present invention;

FIG. 49B is a diagram illustrating an example of a chunk storage location table in accordance with the present invention;

FIG. 50B is a flowchart illustrating another example of processing a partial task request in accordance with the present invention; and FIG. 50C is a flowchart illustrating another example of processing a partial task request in accordance with the present invention.

DETAILED DESCRIPTION OF THE INVENTION

Figure 1:
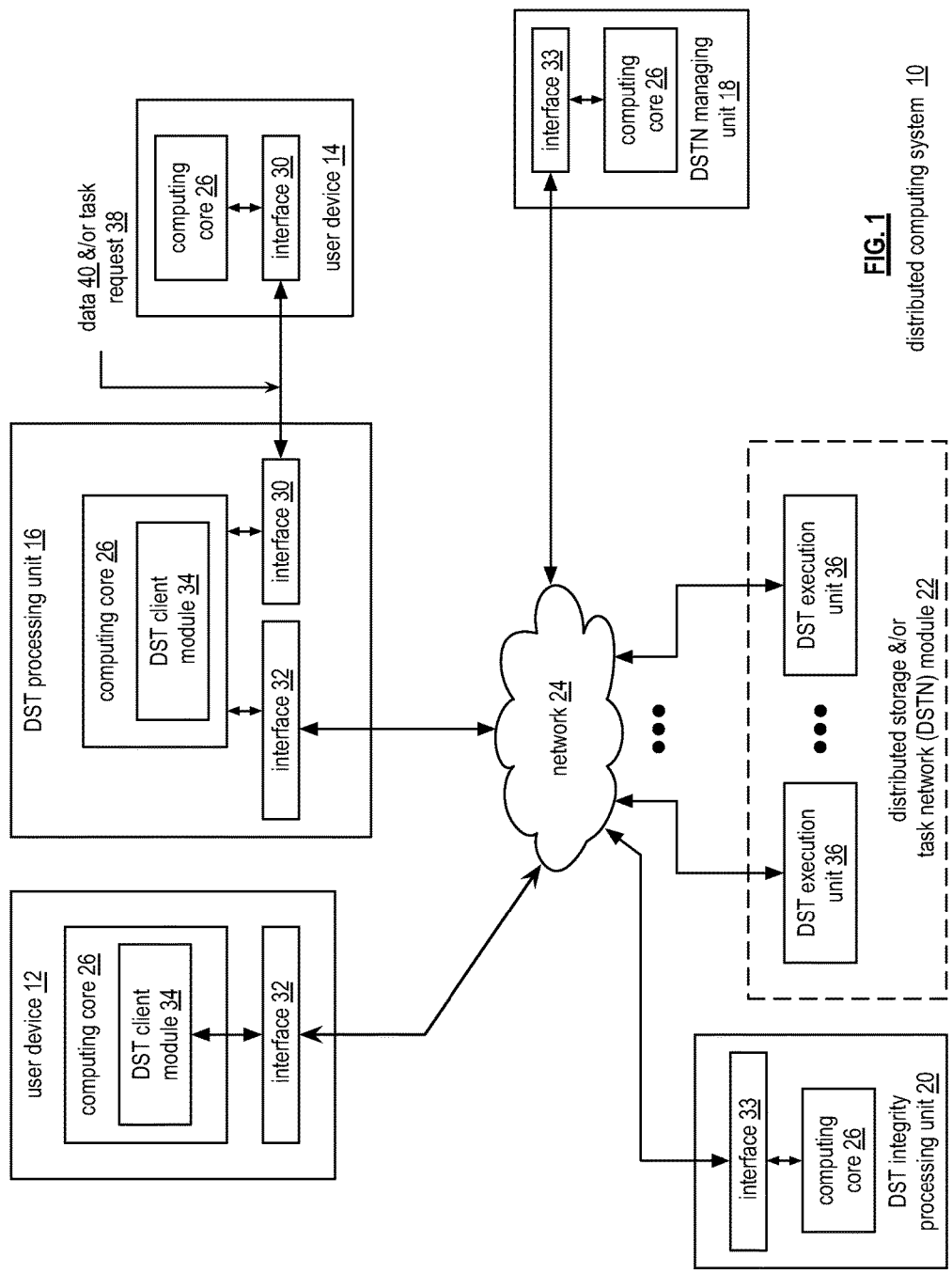
FIG. 1 is a schematic block diagram of an embodiment of a distributed computing system in accordance with the present invention.

FIG. 1 is a schematic block diagram of an embodiment of a distributed computing system 10 that includes a user device 12 and/or a user device 14, a distributed storage and/or task (DST) processing unit 16, a distributed storage and/or task network (DSTN) managing unit 18, a DST integrity processing unit 20, and a distributed storage and/or task network (DSTN) module 22. The components of the distributed computing system 10 are coupled via a network 24, which may include one or more wireless and/or wire lined communication systems; one or more private intranet systems and/or public internet systems; and/or one or more local area networks (LAN) and/or wide area networks (WAN).

The DSTN module 22 includes a plurality of distributed storage and/or task (DST) execution units 36 that may be located at geographically different sites (e.g., one in Chicago, one in Milwaukee, etc.). Each of the DST execution units is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc.

Each of the user devices 12-14, the DST processing unit 16, the DSTN managing unit 18, and the DST integrity processing unit 20 include a computing core 26 and may be a portable computing device and/or a fixed computing device. A portable computing device may be a social networking device, a gaming device, a cell phone, a smart phone, a personal digital assistant, a digital music player, a digital video player, a laptop computer, a handheld computer, a tablet, a video game controller, and/or any other portable device that includes a computing core. A fixed computing device may be a personal computer (PC), a computer server, a cable set-top box, a satellite receiver, a television set, a printer, a fax machine, home entertainment equipment, a video game console, and/or any type of home or office computing equipment. User device 12 and DST processing unit 16 are configured to include a DST client module 34.

With respect to interfaces, each interface 30, 32, and 33 includes software and/or hardware to support one or more communication links via the network 24 indirectly and/or directly. For example, interface 30 supports a communication link (e.g., wired, wireless, direct, via a LAN, via the network 24, etc.) between user device 14 and the DST processing unit 16. As another example, interface 32 supports communication links (e.g., a wired connection, a wireless connection, a LAN connection, and/or any other type of connection to/from the network 24) between user device 12 and the DSTN module 22 and between the DST processing unit 16 and the DSTN module 22. As yet another example, interface 33 supports a communication link for each of the DSTN managing unit 18 and DST integrity processing unit 20 to the network 24.

The distributed computing system 10 is operable to support dispersed storage (DS) error encoded data storage and retrieval, to support distributed task processing on received data, and/or to support distributed task processing on stored data. In general and with respect to DS error encoded data storage and retrieval, the distributed computing system 10 supports three primary operations: storage management, data storage and retrieval (an example of which will be discussed with reference to FIGS. 20-26), and data storage integrity verification. In accordance with these three primary functions, data can be encoded, distributedly stored in physically different locations, and subsequently retrieved in a reliable and secure manner. Such a system is tolerant of a significant number of failures (e.g., up to a failure level, which may be greater than or equal to a pillar width minus a decode threshold minus one) that may result from individual storage device failures and/or network equipment failures without loss of data and without the need for a redundant or backup copy. Further, the system allows the data to be stored for an indefinite period of time without data loss and does so in a secure manner (e.g., the system is very resistant to attempts at hacking the data).

The second primary function (i.e., distributed data storage and retrieval) begins and ends with a user device 12-14. For instance, if a second type of user device 14 has data 40 to store in the DSTN module 22, it sends the data 40 to the DST processing unit 16 via its interface 30. The interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data 40.

To support storage management, the DSTN managing unit 18 performs DS management services. One such DS management service includes the DSTN managing unit 18 establishing distributed data storage parameters (e.g., vault creation, distributed storage parameters, security parameters, billing information, user profile information, etc.) for a user device 12-14 individually or as part of a group of user devices. For example, the DSTN managing unit 18 coordinates creation of a vault (e.g., a virtual memory block) within memory of the DSTN module 22 for a user device, a group of devices, or for public access and establishes per vault dispersed storage (DS) error encoding parameters for a vault. The DSTN managing unit 18 may facilitate storage of DS error encoding parameters for each vault of a plurality of vaults by updating registry information for the distributed computing system 10. The facilitating includes storing updated registry information in one or more of the DSTN module 22, the user device 12, the DST processing unit 16, and the DST integrity processing unit 20.

The DS error encoding parameters (e.g., or dispersed storage error coding parameters) include data segmenting information (e.g., how many segments data (e.g., a file, a group of files, a data block, etc.) is divided into), segment security information (e.g., per segment encryption, compression, integrity checksum, etc.), error coding information (e.g., pillar width, decode threshold, read threshold, write threshold, etc.), slicing information (e.g., the number of encoded data slices that will be created for each data segment); and slice security information (e.g., per encoded data slice encryption, compression, integrity checksum, etc.).

The DSTN managing unit 18 creates and stores user profile information (e.g., an access control list (ACL)) in local memory and/or within memory of the DSTN module 22. The user profile information includes authentication information, permissions, and/or the security parameters. The security parameters may include encryption/decryption scheme, one or more encryption keys, key generation scheme, and/or data encoding/decoding scheme.

The DSTN managing unit 18 creates billing information for a particular user, a user group, a vault access, public vault access, etc. For instance, the DSTN managing unit 18 tracks the number of times a user accesses a private vault and/or public vaults, which can be used to generate a per-access billing information. In another instance, the DSTN managing unit 18 tracks the amount of data stored and/or retrieved by a user device and/or a user group, which can be used to generate a per-data-amount billing information.

Another DS management service includes the DSTN managing unit 18 performing network operations, network administration, and/or network maintenance. Network operations includes authenticating user data allocation requests (e.g., read and/or write requests), managing creation of vaults, establishing authentication credentials for user devices, adding/deleting components (e.g., user devices, DST execution units, and/or DST processing units) from the distributed computing system 10, and/or establishing authentication credentials for DST execution units 36. Network administration includes monitoring devices and/or units for failures, maintaining vault information, determining device and/or unit activation status, determining device and/or unit loading, and/or determining any other system level operation that affects the performance level of the system 10. Network maintenance includes facilitating replacing, upgrading, repairing, and/or expanding a device and/or unit of the system 10.

To support data storage integrity verification within the distributed computing system 10, the DST integrity processing unit 20 performs rebuilding of 'bad' or missing encoded data slices. At a high level, the DST integrity processing unit 20 performs rebuilding by periodically attempting to retrieve/list encoded data slices, and/or slice names of the encoded data slices, from the DSTN module 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in memory of the DSTN module 22. Note that the DST integrity processing unit 20 may be a separate unit as shown, it may be included in the DSTN module 22, it may be included in the DST processing unit 16, and/or distributed among the DST execution units 36.

To support distributed task processing on received data, the distributed computing system 10 has two primary operations: DST (distributed storage and/or task processing) management and DST execution on received data (an example of which will be discussed with reference to FIGS. 3-19). With respect to the storage portion of the DST management, the DSTN managing unit 18 functions as previously described. With respect to the tasking processing of the DST management, the DSTN managing unit 18 performs distributed task processing (DTP) management services. One such DTP management service includes the DSTN managing unit 18 establishing DTP parameters (e.g., user-vault affiliation information, billing information, user-task information, etc.) for a user device 12-14 individually or as part of a group of user devices.

Another DTP management service includes the DSTN managing unit 18 performing DTP network operations, network administration (which is essentially the same as described above), and/or network maintenance (which is essentially the same as described above). Network operations include, but are not limited to, authenticating user task processing requests (e.g., valid request, valid user, etc.), authenticating results and/or partial results, establishing DTP authentication credentials for user devices, adding/deleting components (e.g., user devices, DST execution units, and/or DST processing units) from the distributed computing system, and/or establishing DTP authentication credentials for DST execution units.

To support distributed task processing on stored data, the distributed computing system 10 has two primary operations: DST (distributed storage and/or task) management and DST execution on stored data. With respect to the DST execution on stored data, if the second type of user device 14 has a task request 38 for execution by the DSTN module 22, it sends the task request 38 to the DST processing unit 16 via its interface 30. An example of DST execution on stored data will be discussed in greater detail with reference to FIGS. 27-39. With respect to the DST management, it is substantially similar to the DST management to support distributed task processing on received data.

Figure 2:
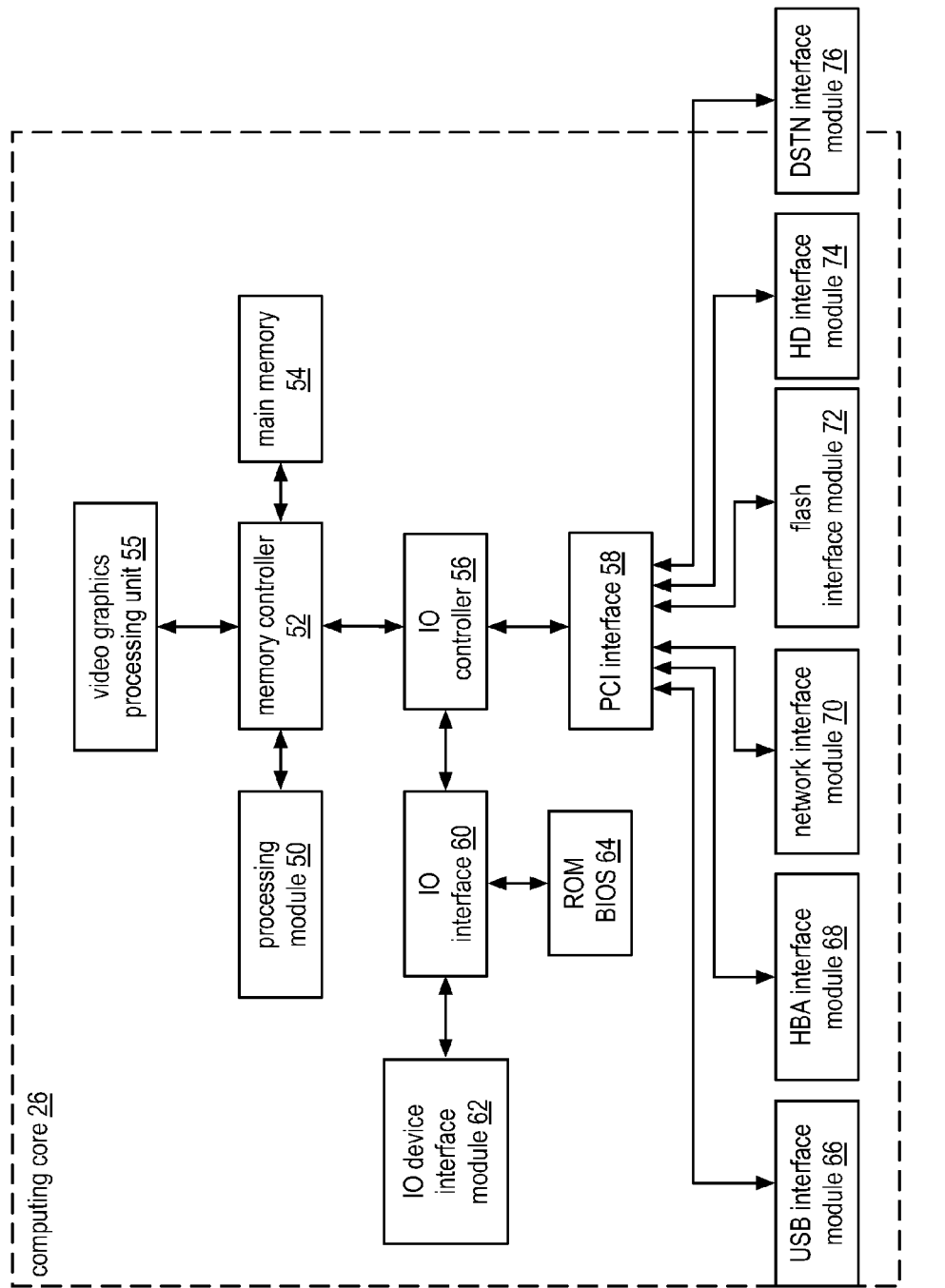
FIG. 2 is a schematic block diagram of an embodiment of a computing core in accordance with the present invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSTN interface module 76.

The DSTN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSTN interface module 76 and/or the network interface module 70 may function as the interface 30 of the user device 14 of FIG. 1. Further note that the IO device interface module 62 and/or the memory interface modules may be collectively or individually referred to as IO ports.

Figure 3:
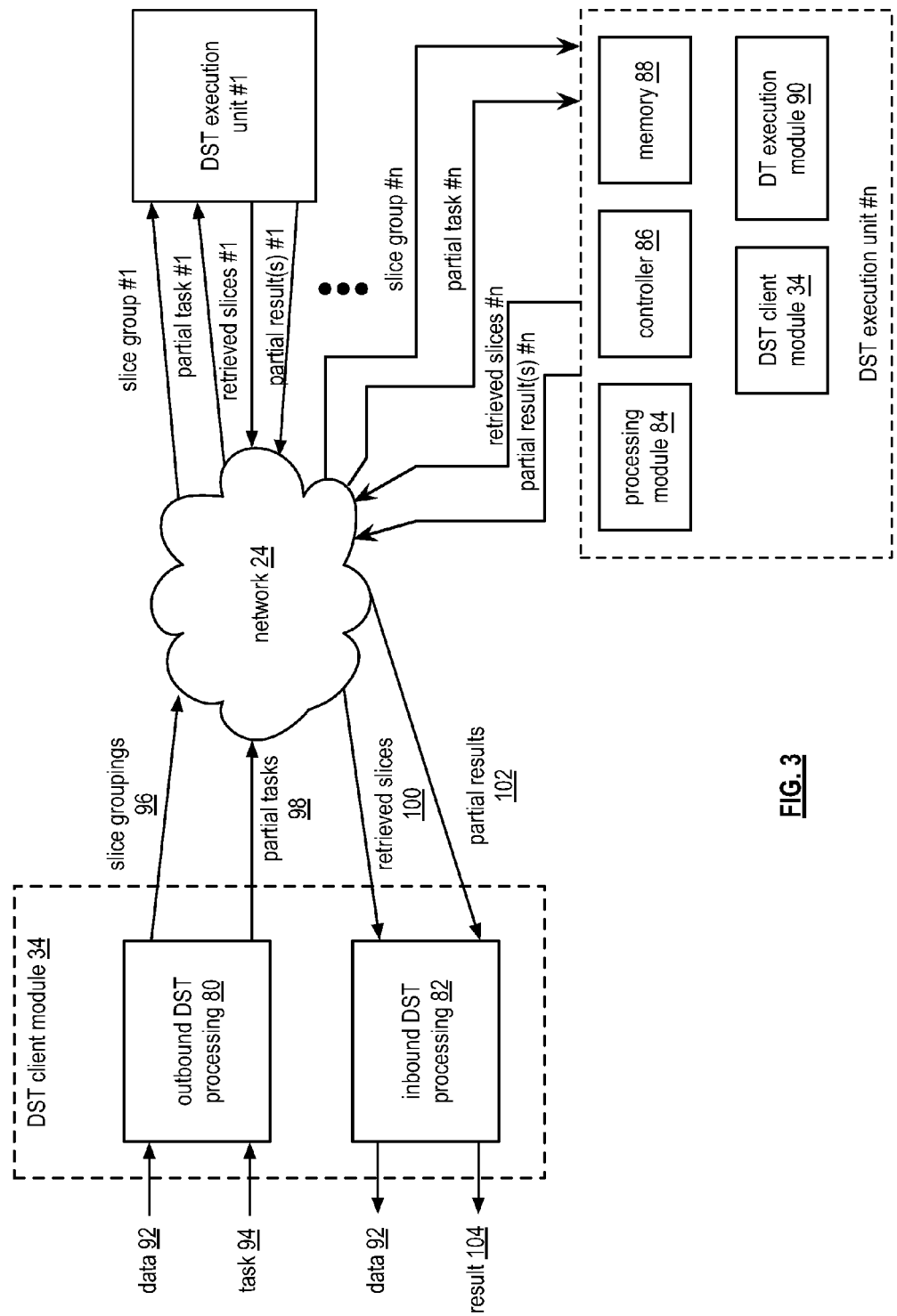
FIG. 3 is a diagram of an example of a distributed storage and task processing in accordance with the present invention.

FIG. 3 is a diagram of an example of the distributed computing system performing a distributed storage and task processing operation. The distributed computing system includes a DST (distributed storage and/or task) client module 34 (which may be in user device 14 and/or in DST processing unit 16 of FIG. 1), a network 24, a plurality of DST execution units 1-n that includes two or more DST execution units 36 of FIG. 1 (which form at least a portion of DSTN module 22 of FIG. 1), a DST managing module (not shown), and a DST integrity verification module (not shown). The DST client module 34 includes an outbound DST processing section 80 and an inbound DST processing section 82. Each of the DST execution units 1-n includes a controller 86, a processing module 84, memory 88, a DT (distributed task) execution module 90, and a DST client module 34.

In an example of operation, the DST client module 34 receives data 92 and one or more tasks 94 to be performed upon the data 92. The data 92 may be of any size and of any content, where, due to the size (e.g., greater than a few Terabytes), the content (e.g., secure data, etc.), and/or task(s) (e.g., MIPS intensive), distributed processing of the task(s) on the data is desired. For example, the data 92 may be one or more digital books, a copy of a company's emails, a large-scale Internet search, a video security file, one or more entertainment video files (e.g., television programs, movies, etc.), data files, and/or any other large amount of data (e.g., greater than a few Terabytes).

Within the DST client module 34, the outbound DST processing section 80 receives the data 92 and the task(s) 94. The outbound DST processing section 80 processes the data 92 to produce slice groupings 96. As an example of such processing, the outbound DST processing section 80 partitions the data 92 into a plurality of data partitions. For each data partition, the outbound DST processing section 80 dispersed storage (DS) error encodes the data partition to produce encoded data slices and groups the encoded data slices into a slice grouping 96. In addition, the outbound DST processing section 80 partitions the task 94 into partial tasks 98, where the number of partial tasks 98 may correspond to the number of slice groupings 96.

The outbound DST processing section 80 then sends, via the network 24, the slice groupings 96 and the partial tasks 98 to the DST execution units 1-n of the DSTN module 22 of FIG. 1. For example, the outbound DST processing section 80 sends slice group 1 and partial task 1 to DST execution unit 1. As another example, the outbound DST processing section 80 sends slice group #n and partial task #n to DST execution unit #n.

Each DST execution unit performs its partial task 98 upon its slice group 96 to produce partial results 102. For example, DST execution unit #1 performs partial task #1 on slice group #1 to produce a partial result #1, for results. As a more specific example, slice group #1 corresponds to a data partition of a series of digital books and the partial task #1 corresponds to searching for specific phrases, recording where the phrase is found, and establishing a phrase count. In this more specific example, the partial result #1 includes information as to where the phrase was found and includes the phrase count.

Upon completion of generating their respective partial results 102, the DST execution units send, via the network 24, their partial results 102 to the inbound DST processing section 82 of the DST client module 34. The inbound DST processing section 82 processes the received partial results 102 to produce a result 104. Continuing with the specific example of the preceding paragraph, the inbound DST processing section 82 combines the phrase count from each of the DST execution units 36 to produce a total phrase count. In addition, the inbound DST processing section 82 combines the 'where the phrase was found' information from each of the DST execution units 36 within their respective data partitions to produce 'where the phrase was found' information for the series of digital books.

In another example of operation, the DST client module 34 requests retrieval of stored data within the memory of the DST execution units 36 (e.g., memory of the DSTN module). In this example, the task 94 is retrieve data stored in the memory of the DSTN module. Accordingly, the outbound DST processing section 80 converts the task 94 into a plurality of partial tasks 98 and sends the partial tasks 98 to the respective DST execution units 1-n.

In response to the partial task 98 of retrieving stored data, a DST execution unit 36 identifies the corresponding encoded data slices 100 and retrieves them. For example, DST execution unit #1 receives partial task #1 and retrieves, in response thereto, retrieved slices #1. The DST execution units 36 send their respective retrieved slices 100 to the inbound DST processing section 82 via the network 24.

The inbound DST processing section 82 converts the retrieved slices 100 into data 92. For example, the inbound DST processing section 82 de-groups the retrieved slices 100 to produce encoded slices per data partition. The inbound DST processing section 82 then DS error decodes the encoded slices per data partition to produce data partitions. The inbound DST processing section 82 de-partitions the data partitions to recapture the data 92.

Figure 4:
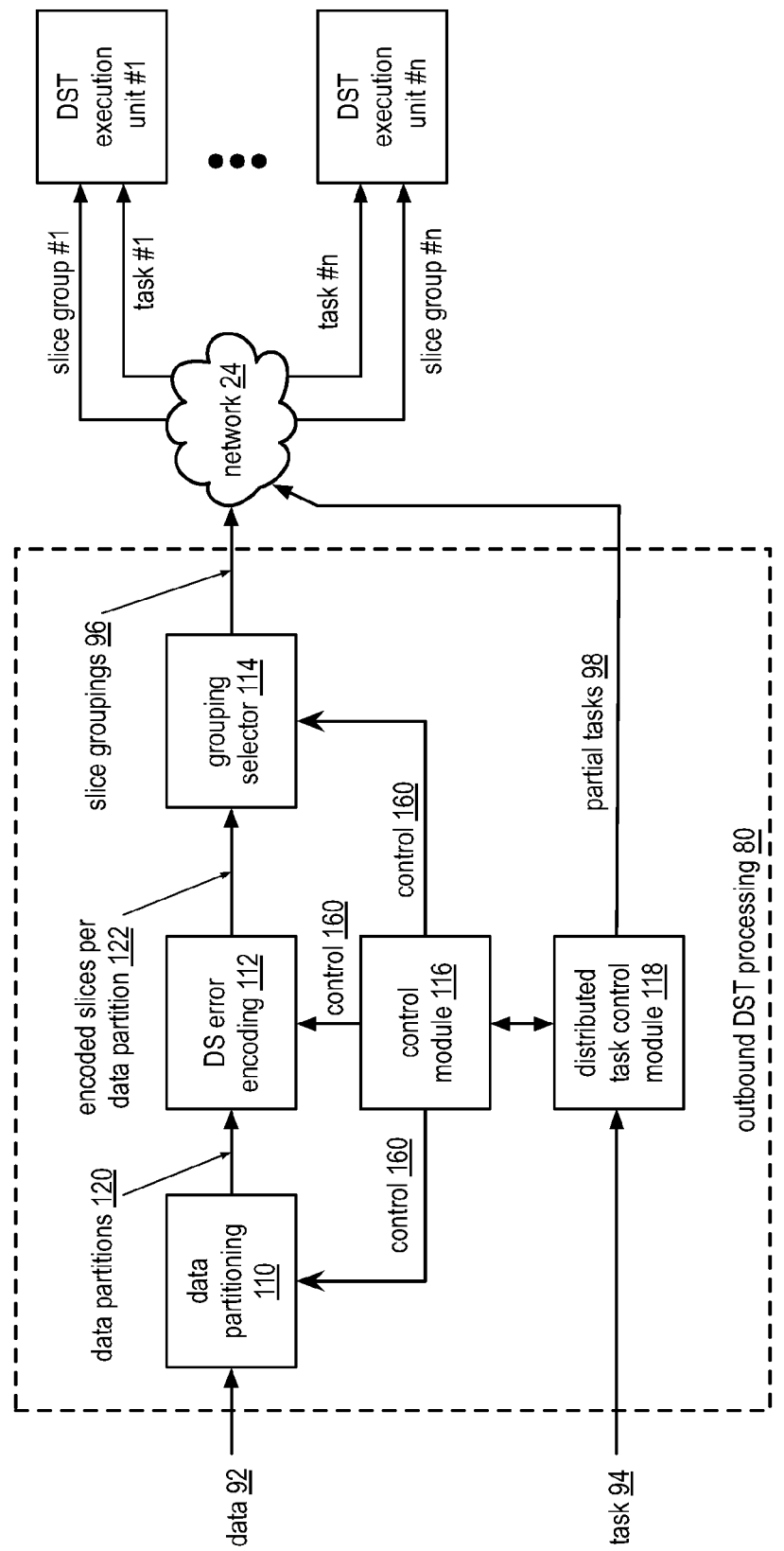
FIG. 4 is a schematic block diagram of an embodiment of an outbound distributed storage and/or task (DST) processing in accordance with the present invention.

FIG. 4 is a schematic block diagram of an embodiment of an outbound distributed storage and/or task (DST) processing section 80 of a DST client module 34 FIG. 1 coupled to a DSTN module 22 of a FIG. 1 (e.g., a plurality of n DST execution units 36) via a network 24. The outbound DST processing section 80 includes a data partitioning module 110, a dispersed storage (DS) error encoding module 112, a grouping selector module 114, a control module 116, and a distributed task control module 118.

In an example of operation, the data partitioning module 110 partitions data 92 into a plurality of data partitions 120. The number of partitions and the size of the partitions may be selected by the control module 116 via control 160 based on the data 92 (e.g., its size, its content, etc.), a corresponding task 94 to be performed (e.g., simple, complex, single step, multiple steps, etc.), DS encoding parameters (e.g., pillar width, decode threshold, write threshold, segment security parameters, slice security parameters, etc.), capabilities of the DST execution units 36 (e.g., processing resources, availability of processing recourses, etc.), and/or as may be inputted by a user, system administrator, or other operator (human or automated). For example, the data partitioning module 110 partitions the data 92 (e.g., 100 Terabytes) into 100,000 data segments, each being 1 Gigabyte in size. Alternatively, the data partitioning module 110 partitions the data 92 into a plurality of data segments, where some of data segments are of a different size, are of the same size, or a combination thereof.

The DS error encoding module 112 receives the data partitions 120 in a serial manner, a parallel manner, and/or a combination thereof. For each data partition 120, the DS error encoding module 112 DS error encodes the data partition 120 in accordance with control information 160 from the control module 116 to produce encoded data slices 122. The DS error encoding includes segmenting the data partition into data segments, segment security processing (e.g., encryption, compression, watermarking, integrity check (e.g., CRC), etc.), error encoding, slicing, and/or per slice security processing (e.g., encryption, compression, watermarking, integrity check (e.g., CRC), etc.). The control information 160 indicates which steps of the DS error encoding are active for a given data partition and, for active steps, indicates the parameters for the step. For example, the control information 160 indicates that the error encoding is active and includes error encoding parameters (e.g., pillar width, decode threshold, write threshold, read threshold, type of error encoding, etc.).

The grouping selector module 114 groups the encoded slices 122 of a data partition into a set of slice groupings 96. The number of slice groupings corresponds to the number of DST execution units 36 identified for a particular task 94. For example, if five DST execution units 36 are identified for the particular task 94, the grouping selector module groups the encoded slices 122 of a data partition into five slice groupings 96. The grouping selector module 114 outputs the slice groupings 96 to the corresponding DST execution units 36 via the network 24.

The distributed task control module 118 receives the task 94 and converts the task 94 into a set of partial tasks 98. For example, the distributed task control module 118 receives a task to find where in the data (e.g., a series of books) a phrase occurs and a total count of the phrase usage in the data. In this example, the distributed task control module 118 replicates the task 94 for each DST execution unit 36 to produce the partial tasks 98. In another example, the distributed task control module 118 receives a task to find where in the data a first phrase occurs, where in the data a second phrase occurs, and a total count for each phrase usage in the data. In this example, the distributed task control module 118 generates a first set of partial tasks 98 for finding and counting the first phrase and a second set of partial tasks for finding and counting the second phrase. The distributed task control module 118 sends respective first and/or second partial tasks 98 to each DST execution unit 36.

Figure 5:
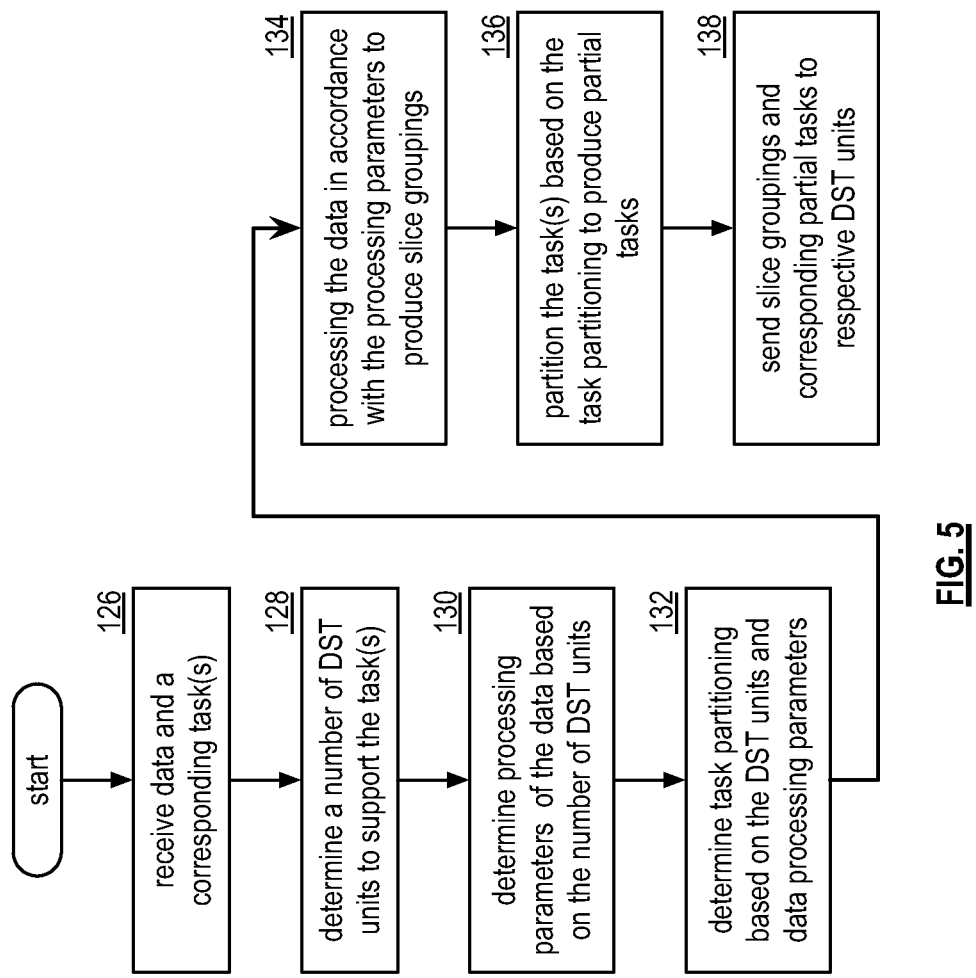
FIG. 5 is a logic diagram of an example of a method for outbound DST processing in accordance with the present invention.

FIG. 5 is a logic diagram of an example of a method for outbound distributed storage and task (DST) processing that begins at step 126 where a DST client module receives data and one or more corresponding tasks. The method continues at step 128 where the DST client module determines a number of DST units to support the task for one or more data partitions. For example, the DST client module may determine the number of DST units to support the task based on the size of the data, the requested task, the content of the data, a predetermined number (e.g., user indicated, system administrator determined, etc.), available DST units, capability of the DST units, and/or any other factor regarding distributed task processing of the data. The DST client module may select the same DST units for each data partition, may select different DST units for the data partitions, or a combination thereof.

The method continues at step 130 where the DST client module determines processing parameters of the data based on the number of DST units selected for distributed task processing. The processing parameters include data partitioning information, DS encoding parameters, and/or slice grouping information. The data partitioning information includes a number of data partitions, size of each data partition, and/or organization of the data partitions (e.g., number of data blocks in a partition, the size of the data blocks, and arrangement of the data blocks). The DS encoding parameters include segmenting information, segment security information, error encoding information (e.g., dispersed storage error encoding function parameters including one or more of pillar width, decode threshold, write threshold, read threshold, generator matrix), slicing information, and/or per slice security information. The slice grouping information includes information regarding how to arrange the encoded data slices into groups for the selected DST units. As a specific example, if the DST client module determines that five DST units are needed to support the task, then it determines that the error encoding parameters include a pillar width of five and a decode threshold of three.

The method continues at step 132 where the DST client module determines task partitioning information (e.g., how to partition the tasks) based on the selected DST units and data processing parameters. The data processing parameters include the processing parameters and DST unit capability information. The DST unit capability information includes the number of DT (distributed task) execution units, execution capabilities of each DT execution unit (e.g., MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, memory information (e.g., type, size, availability, etc.)), and/or any information germane to executing one or more tasks.

The method continues at step 134 where the DST client module processes the data in accordance with the processing parameters to produce slice groupings. The method continues at step 136 where the DST client module partitions the task based on the task partitioning information to produce a set of partial tasks. The method continues at step 138 where the DST client module sends the slice groupings and the corresponding partial tasks to respective DST units.

Figure 6:
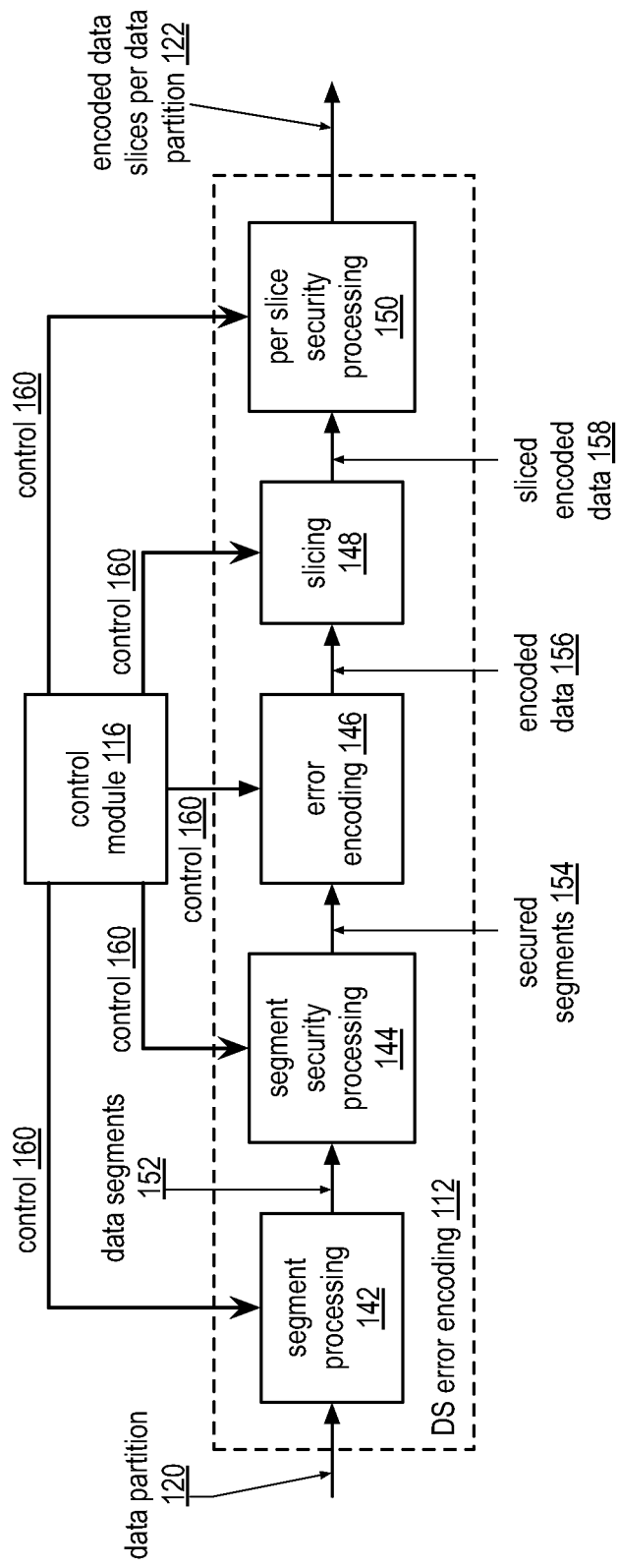
FIG. 6 is a schematic block diagram of an embodiment of a dispersed error encoding in accordance with the present invention.

FIG. 6 is a schematic block diagram of an embodiment of the dispersed storage (DS) error encoding module 112 of an outbound distributed storage and task (DST) processing section. The DS error encoding module 112 includes a segment processing module 142, a segment security processing module 144, an error encoding module 146, a slicing module 148, and a per slice security processing module 150. Each of these modules is coupled to a control module 116 to receive control information 160 therefrom.

In an example of operation, the segment processing module 142 receives a data partition 120 from a data partitioning module and receives segmenting information as the control information 160 from the control module 116. The segmenting information indicates how the segment processing module 142 is to segment the data partition 120. For example, the segmenting information indicates how many rows to segment the data based on a decode threshold of an error encoding scheme, indicates how many columns to segment the data into based on a number and size of data blocks within the data partition 120, and indicates how many columns to include in a data segment 152. The segment processing module 142 segments the data 120 into data segments 152 in accordance with the segmenting information.

The segment security processing module 144, when enabled by the control module 116, secures the data segments 152 based on segment security information received as control information 160 from the control module 116. The segment security information includes data compression, encryption, watermarking, integrity check (e.g., cyclic redundancy check (CRC), etc.), and/or any other type of digital security. For example, when the segment security processing module 144 is enabled, it may compress a data segment 152, encrypt the compressed data segment, and generate a CRC value for the encrypted data segment to produce a secure data segment 154. When the segment security processing module 144 is not enabled, it passes the data segments 152 to the error encoding module 146 or is bypassed such that the data segments 152 are provided to the error encoding module 146.

The error encoding module 146 encodes the secure data segments 154 in accordance with error correction encoding parameters received as control information 160 from the control module 116. The error correction encoding parameters (e.g., also referred to as dispersed storage error coding parameters) include identifying an error correction encoding scheme (e.g., forward error correction algorithm, a Reed-Solomon based algorithm, an online coding algorithm, an information dispersal algorithm, etc.), a pillar width, a decode threshold, a read threshold, a write threshold, etc. For example, the error correction encoding parameters identify a specific error correction encoding scheme, specifies a pillar width of five, and specifies a decode threshold of three. From these parameters, the error encoding module 146 encodes a data segment 154 to produce an encoded data segment 156.

The slicing module 148 slices the encoded data segment 156 in accordance with the pillar width of the error correction encoding parameters received as control information 160. For example, if the pillar width is five, the slicing module 148 slices an encoded data segment 156 into a set of five encoded data slices. As such, for a plurality of data segments 156 for a given data partition, the slicing module outputs a plurality of sets of encoded data slices 158.

The per slice security processing module 150, when enabled by the control module 116, secures each encoded data slice 158 based on slice security information received as control information 160 from the control module 116. The slice security information includes data compression, encryption, watermarking, integrity check (e.g., CRC, etc.), and/or any other type of digital security. For example, when the per slice security processing module 150 is enabled, it compresses an encoded data slice 158, encrypts the compressed encoded data slice, and generates a CRC value for the encrypted encoded data slice to produce a secure encoded data slice 122. When the per slice security processing module 150 is not enabled, it passes the encoded data slices 158 or is bypassed such that the encoded data slices 158 are the output of the DS error encoding module 112. Note that the control module 116 may be omitted and each module stores its own parameters.

Figure 7:
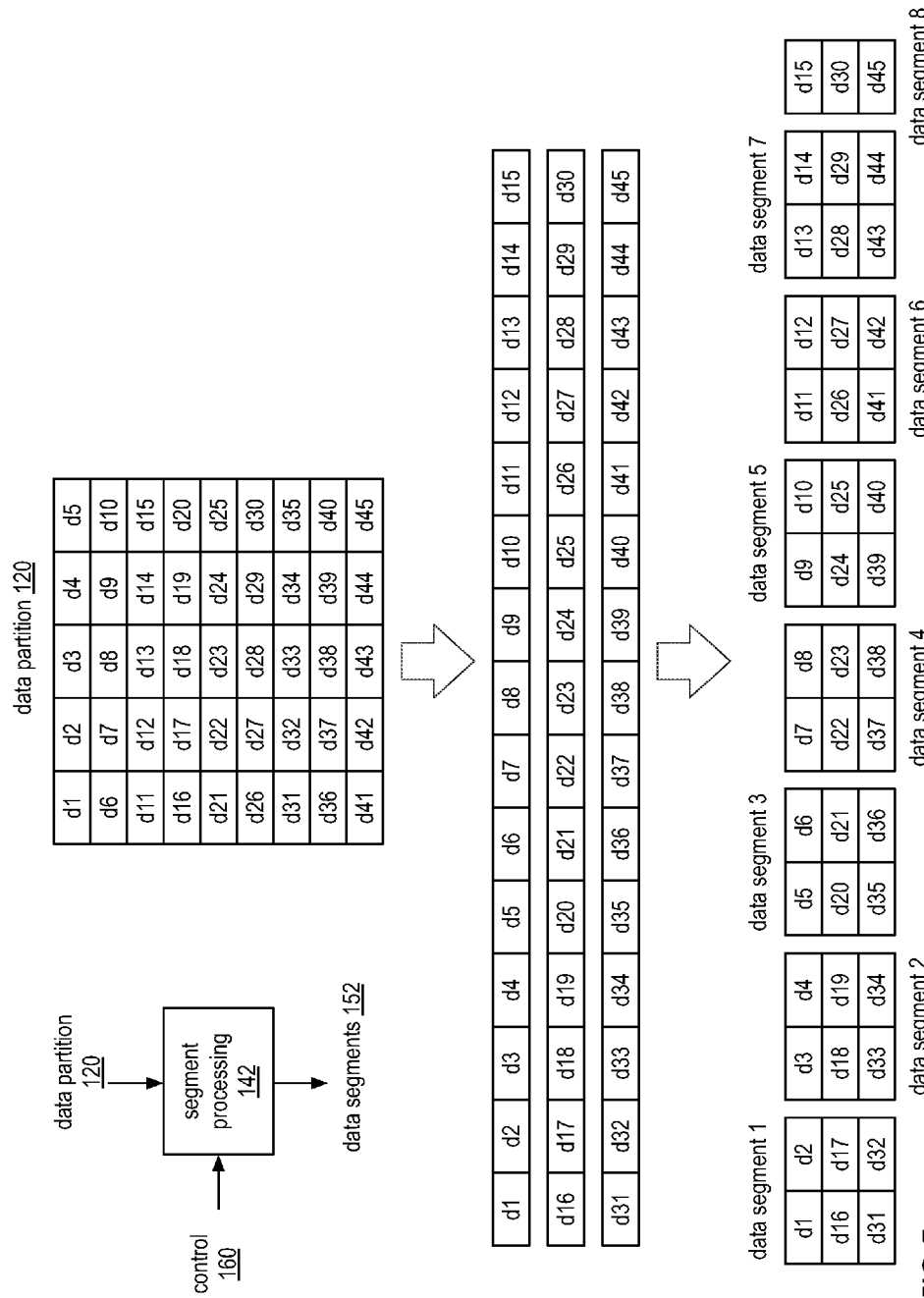
FIG. 7 is a diagram of an example of a segment processing of the dispersed error encoding in accordance with the present invention.

FIG. 7 is a diagram of an example of a segment processing of a dispersed storage (DS) error encoding module. In this example, a segment processing module 142 receives a data partition 120 that includes 45 data blocks (e.g., d1-d45), receives segmenting information (i.e., control information 160) from a control module, and segments the data partition 120 in accordance with the control information 160 to produce data segments 152. Each data block may be of the same size as other data blocks or of a different size. In addition, the size of each data block may be a few bytes to megabytes of data. As previously mentioned, the segmenting information indicates how many rows to segment the data partition into, indicates how many columns to segment the data partition into, and indicates how many columns to include in a data segment.

In this example, the decode threshold of the error encoding scheme is three; as such the number of rows to divide the data partition into is three. The number of columns for each row is set to 15, which is based on the number and size of data blocks. The data blocks of the data partition are arranged in rows and columns in a sequential order (i.e., the first row includes the first 15 data blocks; the second row includes the second 15 data blocks; and the third row includes the last 15 data blocks).

With the data blocks arranged into the desired sequential order, they are divided into data segments based on the segmenting information. In this example, the data partition is divided into 8 data segments; the first 7 include 2 columns of three rows and the last includes 1 column of three rows. Note that the first row of the 8 data segments is in sequential order of the first 15 data blocks; the second row of the 8 data segments in sequential order of the second 15 data blocks; and the third row of the 8 data segments in sequential order of the last 15 data blocks. Note that the number of data blocks, the grouping of the data blocks into segments, and size of the data blocks may vary to accommodate the desired distributed task processing function.

Figure 8:
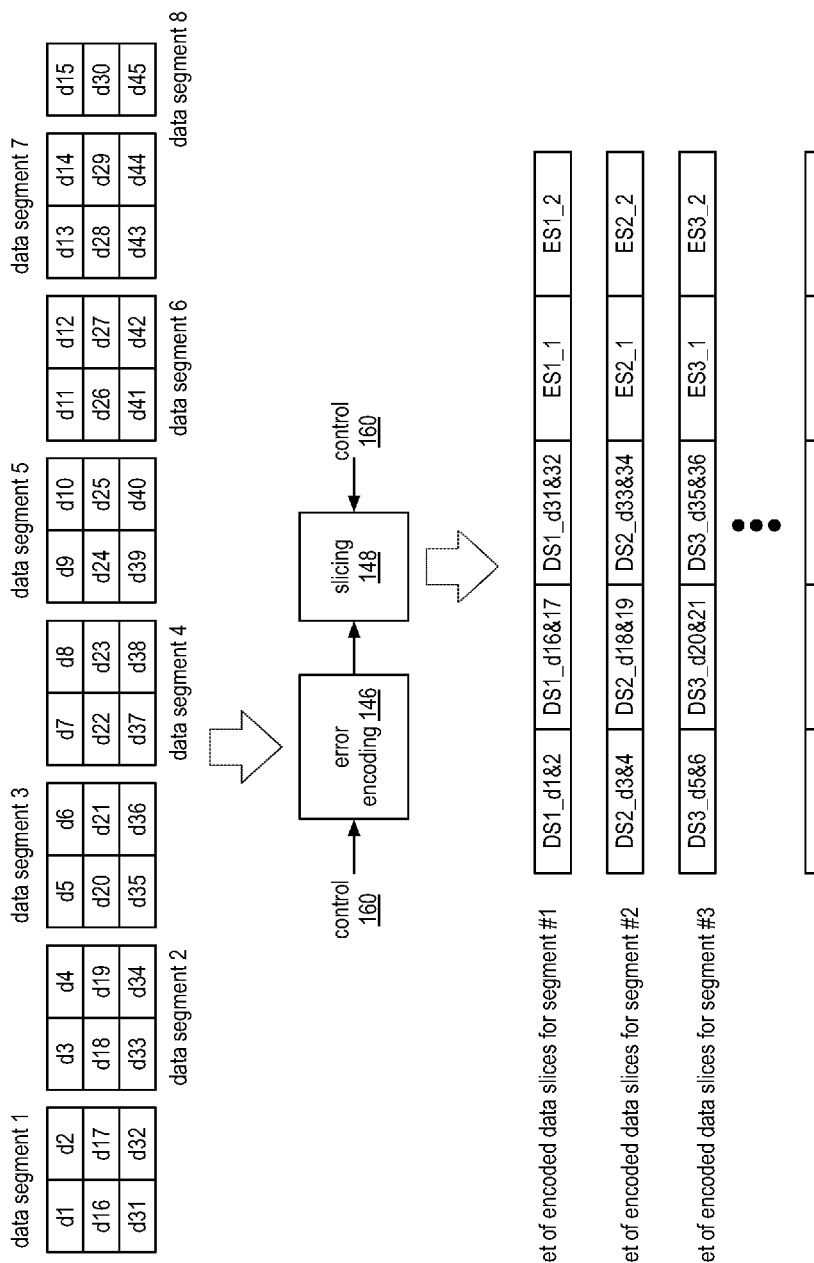
FIG. 8 is a diagram of an example of error encoding and slicing processing of the dispersed error encoding in accordance with the present invention.

FIG. 8 is a diagram of an example of error encoding and slicing processing of the dispersed error encoding processing the data segments of FIG. 7. In this example, data segment 1 includes 3 rows with each row being treated as one word for encoding. As such, data segment 1 includes three words for encoding: word 1 including data blocks d1 and d2, word 2 including data blocks d16 and d17, and word 3 including data blocks d31 and d32. Each of data segments 2-7 includes three words where each word includes two data blocks. Data segment 8 includes three words where each word includes a single data block (e.g., d15, d30, and d45).

In operation, an error encoding module 146 and a slicing module 148 convert each data segment into a set of encoded data slices in accordance with error correction encoding parameters as control information 160. More specifically, when the error correction encoding parameters indicate a unity matrix Reed-Solomon based encoding algorithm, 5 pillars, and decode threshold of 3, the first three encoded data slices of the set of encoded data slices for a data segment are substantially similar to the corresponding word of the data segment. For instance, when the unity matrix Reed-Solomon based encoding algorithm is applied to data segment 1, the content of the first encoded data slice (DS1_d1&2) of the first set of encoded data slices (e.g., corresponding to data segment 1) is substantially similar to content of the first word (e.g., d1 & d2); the content of the second encoded data slice (DS1_d16&17) of the first set of encoded data slices is substantially similar to content of the second word (e.g., d16 & d17); and the content of the third encoded data slice (DS1_d31&32) of the first set of encoded data slices is substantially similar to content of the third word (e.g., d31 & d32).

The content of the fourth and fifth encoded data slices (e.g., ES1_1 and ES1_2) of the first set of encoded data slices include error correction data based on the first-third words of the first data segment. With such an encoding and slicing scheme, retrieving any three of the five encoded data slices allows the data segment to be accurately reconstructed.

The encoding and slicing of data segments 2-7 yield sets of encoded data slices similar to the set of encoded data slices of data segment 1. For instance, the content of the first encoded data slice (DS2_d3&4) of the second set of encoded data slices (e.g., corresponding to data segment 2) is substantially similar to content of the first word (e.g., d3 & d4); the content of the second encoded data slice (DS2_d18&19) of the second set of encoded data slices is substantially similar to content of the second word (e.g., d18 & d19); and the content of the third encoded data slice (DS2_d33&34) of the second set of encoded data slices is substantially similar to content of the third word (e.g., d33 & d34). The content of the fourth and fifth encoded data slices (e.g., ES1_1 and ES1_2) of the second set of encoded data slices includes error correction data based on the first-third words of the second data segment.

Figure 9:
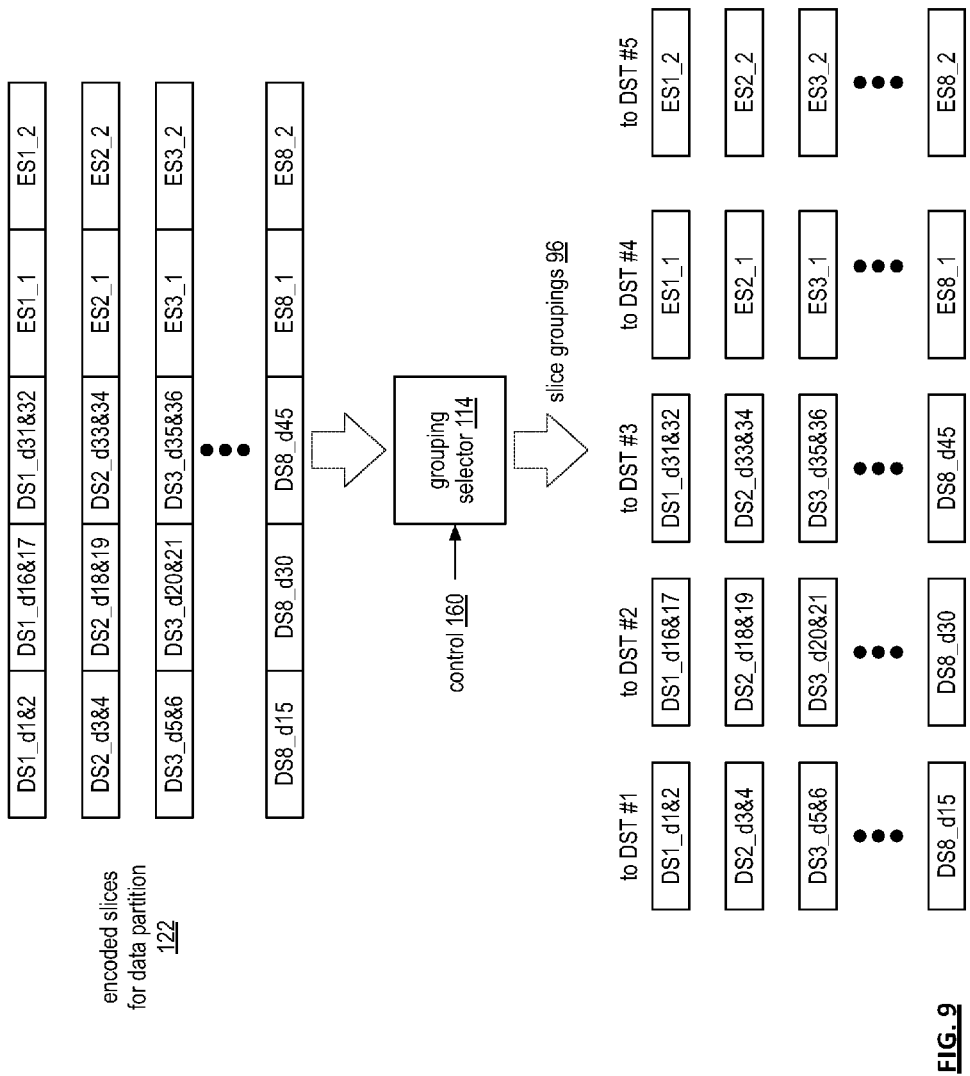
FIG. 9 is a diagram of an example of grouping selection processing of the outbound DST processing in accordance with the present invention.

FIG. 9 is a diagram of an example of grouping selection processing of an outbound distributed storage and task (DST) processing in accordance with group selection information as control information 160 from a control module. Encoded slices for data partition 122 are grouped in accordance with the control information 160 to produce slice groupings 96. In this example, a grouping selector module 114 organizes the encoded data slices into five slice groupings (e.g., one for each DST execution unit of a distributed storage and task network (DSTN) module). As a specific example, the grouping selector module 114 creates a first slice grouping for a DST execution unit #1, which includes first encoded slices of each of the sets of encoded slices. As such, the first DST execution unit receives encoded data slices corresponding to data blocks 1-15 (e.g., encoded data slices of contiguous data).

The grouping selector module 114 also creates a second slice grouping for a DST execution unit #2, which includes second encoded slices of each of the sets of encoded slices. As such, the second DST execution unit receives encoded data slices corresponding to data blocks 16-30. The grouping selector module 114 further creates a third slice grouping for DST execution unit #3, which includes third encoded slices of each of the sets of encoded slices. As such, the third DST execution unit receives encoded data slices corresponding to data blocks 31-45.

The grouping selector module 114 creates a fourth slice grouping for DST execution unit #4, which includes fourth encoded slices of each of the sets of encoded slices. As such, the fourth DST execution unit receives encoded data slices corresponding to first error encoding information (e.g., encoded data slices of error coding (EC) data). The grouping selector module 114 further creates a fifth slice grouping for DST execution unit #5, which includes fifth encoded slices of each of the sets of encoded slices. As such, the fifth DST execution unit receives encoded data slices corresponding to second error encoding information.

Figure 10:
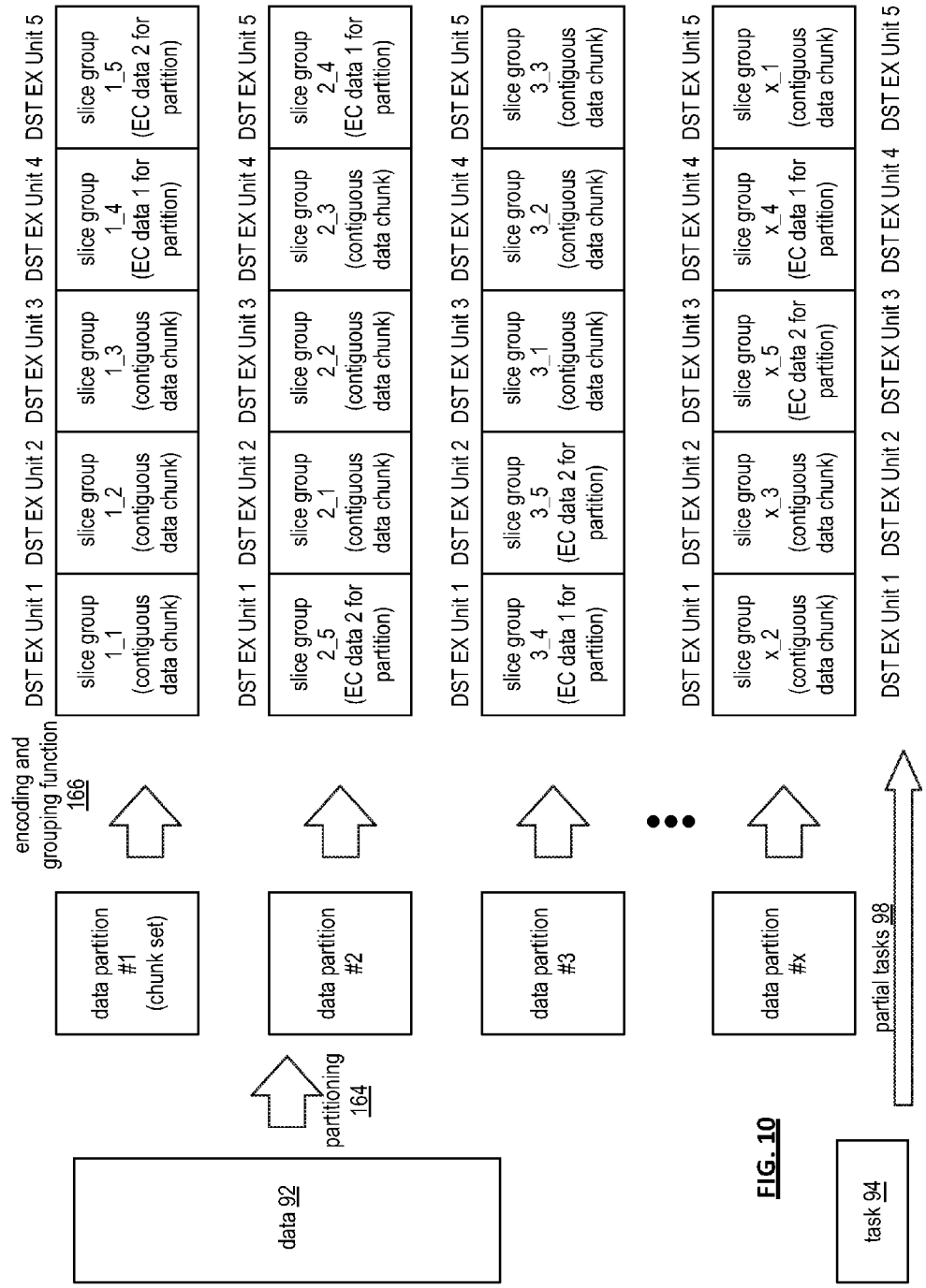
FIG. 10 is a diagram of an example of converting data into slice groups in accordance with the present invention.

FIG. 10 is a diagram of an example of converting data 92 into slice groups that expands on the preceding figures. As shown, the data 92 is partitioned in accordance with a partitioning function 164 into a plurality of data partitions (1-x, where x is an integer greater than 4). Each data partition (or chunkset of data) is encoded and grouped into slice groupings as previously discussed by an encoding and grouping function 166. For a given data partition, the slice groupings are sent to distributed storage and task (DST) execution units. From data partition to data partition, the ordering of the slice groupings to the DST execution units may vary.

For example, the slice groupings of data partition #1 is sent to the DST execution units such that the first DST execution receives first encoded data slices of each of the sets of encoded data slices, which corresponds to a first continuous data chunk of the first data partition (e.g., refer to FIG. 9), a second DST execution receives second encoded data slices of each of the sets of encoded data slices, which corresponds to a second continuous data chunk of the first data partition, etc.

For the second data partition, the slice groupings may be sent to the DST execution units in a different order than it was done for the first data partition. For instance, the first slice grouping of the second data partition (e.g., slice group 2_1) is sent to the second DST execution unit; the second slice grouping of the second data partition (e.g., slice group 2_2) is sent to the third DST execution unit; the third slice grouping of the second data partition (e.g., slice group 2_3) is sent to the fourth DST execution unit; the fourth slice grouping of the second data partition (e.g., slice group 2_4, which includes first error coding information) is sent to the fifth DST execution unit; and the fifth slice grouping of the second data partition (e.g., slice group 2_5, which includes second error coding information) is sent to the first DST execution unit.

The pattern of sending the slice groupings to the set of DST execution units may vary in a predicted pattern, a random pattern, and/or a combination thereof from data partition to data partition. In addition, from data partition to data partition, the set of DST execution units may change. For example, for the first data partition, DST execution units 1-5 may be used; for the second data partition, DST execution units 6-10 may be used; for the third data partition, DST execution units 3-7 may be used; etc. As is also shown, the task is divided into partial tasks that are sent to the DST execution units in conjunction with the slice groupings of the data partitions.

Figure 11:
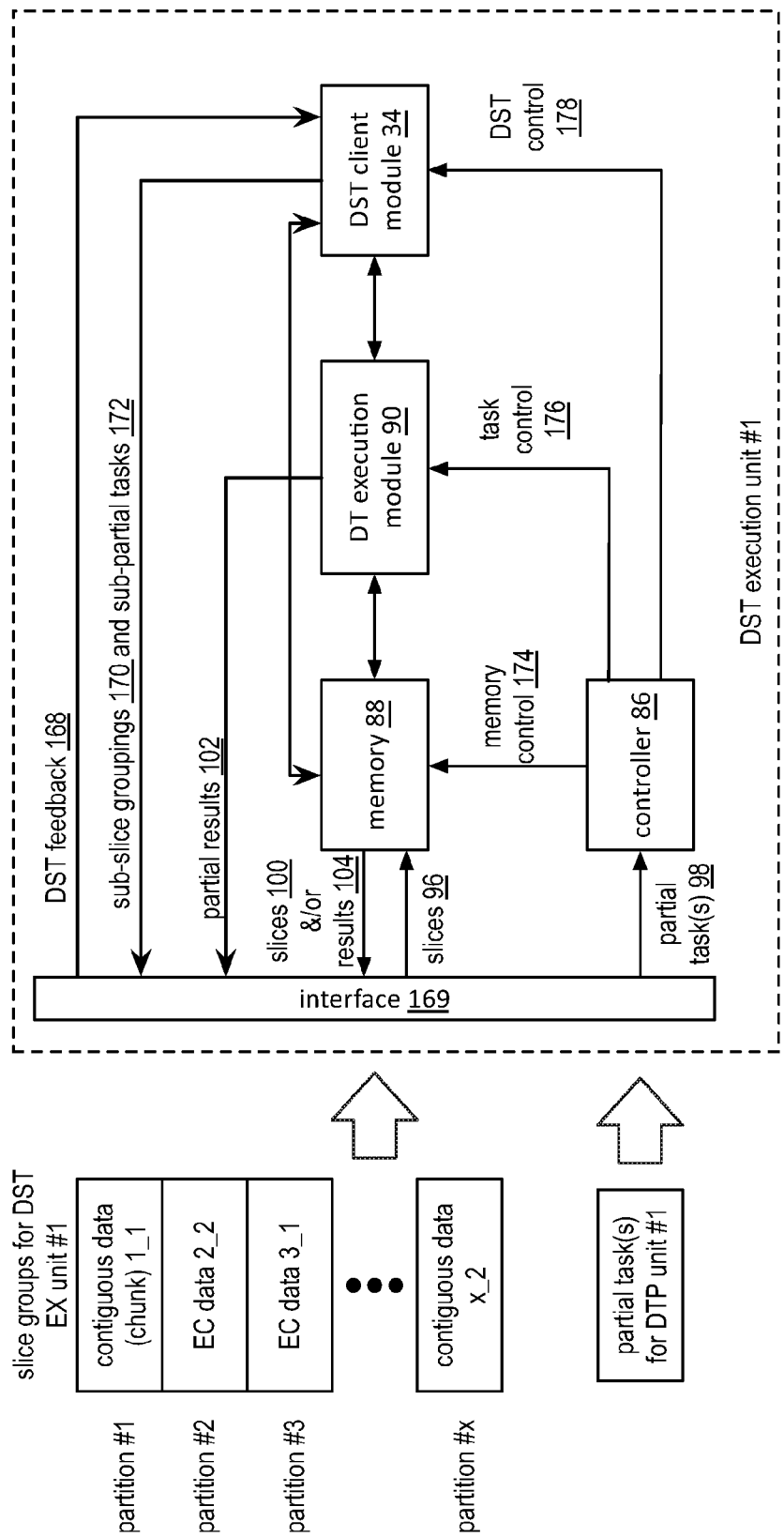
FIG. 11 is a schematic block diagram of an embodiment of a DST execution unit in accordance with the present invention.

FIG. 11 is a schematic block diagram of an embodiment of a DST (distributed storage and/or task) execution unit that includes an interface 169, a controller 86, memory 88, one or more DT (distributed task) execution modules 90, and a DST client module 34. The memory 88 is of sufficient size to store a significant number of encoded data slices (e.g., thousands of slices to hundreds-of-millions of slices) and may include one or more hard drives and/or one or more solid-state memory devices (e.g., flash memory, DRAM, etc.).

In an example of storing a slice group, the DST execution module receives a slice grouping 96 (e.g., slice group #1) via interface 169. The slice grouping 96 includes, per partition, encoded data slices of contiguous data or encoded data slices of error coding (EC) data. For slice group #1, the DST execution module receives encoded data slices of contiguous data for partitions #1 and #x (and potentially others between 3 and x) and receives encoded data slices of EC data for partitions #2 and #3 (and potentially others between 3 and x). Examples of encoded data slices of contiguous data and encoded data slices of error coding (EC) data are discussed with reference to FIG. 9. The memory 88 stores the encoded data slices of slice groupings 96 in accordance with memory control information 174 it receives from the controller 86.

The controller 86 (e.g., a processing module, a CPU, etc.) generates the memory control information 174 based on a partial task(s) 98 and distributed computing information (e.g., user information (e.g., user ID, distributed computing permissions, data access permission, etc.), vault information (e.g., virtual memory assigned to user, user group, temporary storage for task processing, etc.), task validation information, etc.). For example, the controller 86 interprets the partial task(s) 98 in light of the distributed computing information to determine whether a requestor is authorized to perform the task 98, is authorized to access the data, and/or is authorized to perform the task on this particular data. When the requestor is authorized, the controller 86 determines, based on the task 98 and/or another input, whether the encoded data slices of the slice grouping 96 are to be temporarily stored or permanently stored. Based on the foregoing, the controller 86 generates the memory control information 174 to write the encoded data slices of the slice grouping 96 into the memory 88 and to indicate whether the slice grouping 96 is permanently stored or temporarily stored.

With the slice grouping 96 stored in the memory 88, the controller 86 facilitates execution of the partial task(s) 98. In an example, the controller 86 interprets the partial task 98 in light of the capabilities of the DT execution module(s) 90. The capabilities include one or more of MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, etc. If the controller 86 determines that the DT execution module(s) 90 have sufficient capabilities, it generates task control information 176.

The task control information 176 may be a generic instruction (e.g., perform the task on the stored slice grouping) or a series of operational codes. In the former instance, the DT execution module 90 includes a co-processor function specifically configured (fixed or programmed) to perform the desired task 98. In the latter instance, the DT execution module 90 includes a general processor topology where the controller stores an algorithm corresponding to the particular task 98. In this instance, the controller 86 provides the operational codes (e.g., assembly language, source code of a programming language, object code, etc.) of the algorithm to the DT execution module 90 for execution.

Depending on the nature of the task 98, the DT execution module 90 may generate intermediate partial results 102 that are stored in the memory 88 or in a cache memory (not shown) within the DT execution module 90. In either case, when the DT execution module 90 completes execution of the partial task 98, it outputs one or more partial results 102. The partial results 102 may also be stored in memory 88.

If, when the controller 86 is interpreting whether capabilities of the DT execution module(s) 90 can support the partial task 98, the controller 86 determines that the DT execution module(s) 90 cannot adequately support the task 98 (e.g., does not have the right resources, does not have sufficient available resources, available resources would be too slow, etc.), it then determines whether the partial task 98 should be fully offloaded or partially offloaded.

If the controller 86 determines that the partial task 98 should be fully offloaded, it generates DST control information 178 and provides it to the DST client module 34. The DST control information 178 includes the partial task 98, memory storage information regarding the slice grouping 96, and distribution instructions. The distribution instructions instruct the DST client module 34 to divide the partial task 98 into sub-partial tasks 172, to divide the slice grouping 96 into sub-slice groupings 170, and identify other DST execution units. The DST client module 34 functions in a similar manner as the DST client module 34 of FIGS. 3-10 to produce the sub-partial tasks 172 and the sub-slice groupings 170 in accordance with the distribution instructions.

The DST client module 34 receives DST feedback 168 (e.g., sub-partial results), via the interface 169, from the DST execution units to which the task was offloaded. The DST client module 34 provides the sub-partial results to the DST execution unit, which processes the sub-partial results to produce the partial result(s) 102.

If the controller 86 determines that the partial task 98 should be partially offloaded, it determines what portion of the task 98 and/or slice grouping 96 should be processed locally and what should be offloaded. For the portion that is being locally processed, the controller 86 generates task control information 176 as previously discussed. For the portion that is being offloaded, the controller 86 generates DST control information 178 as previously discussed.

When the DST client module 34 receives DST feedback 168 (e.g., sub-partial results) from the DST executions units to which a portion of the task was offloaded, it provides the sub-partial results to the DT execution module 90. The DT execution module 90 processes the sub-partial results with the sub-partial results it created to produce the partial result(s) 102.

The memory 88 may be further utilized to retrieve one or more of stored slices 100, stored results 104, partial results 102 when the DT execution module 90 stores partial results 102 and/or results 104 in the memory 88. For example, when the partial task 98 includes a retrieval request, the controller 86 outputs the memory control 174 to the memory 88 to facilitate retrieval of slices 100 and/or results 104.

Figure 12:
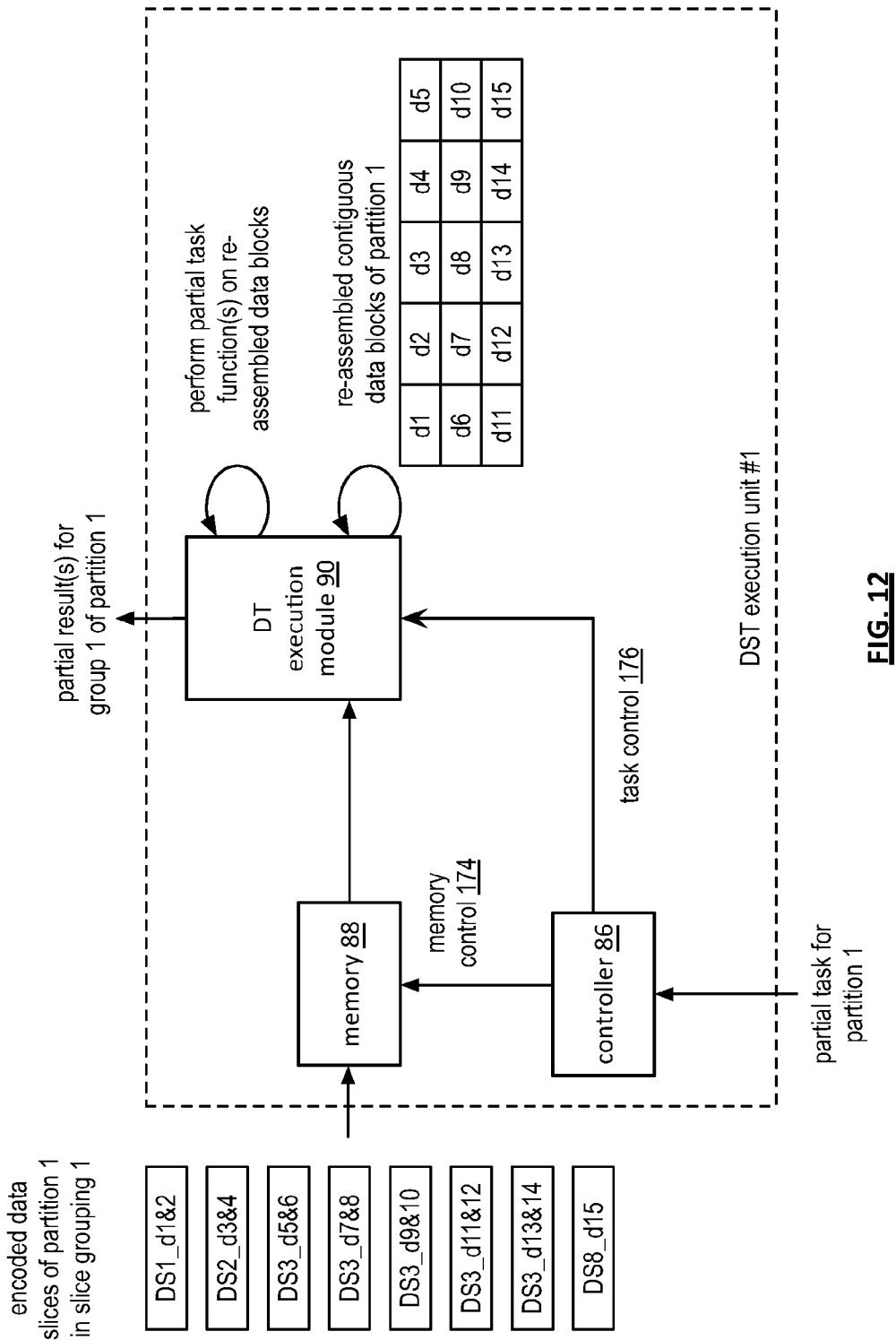
FIG. 12 is a schematic block diagram of an example of operation of a DST execution unit in accordance with the present invention.

FIG. 12 is a schematic block diagram of an example of operation of a distributed storage and task (DST) execution unit storing encoded data slices and executing a task thereon. To store the encoded data slices of a partition 1 of slice grouping 1, a controller 86 generates write commands as memory control information 174 such that the encoded slices are stored in desired locations (e.g., permanent or temporary) within memory 88.

Once the encoded slices are stored, the controller 86 provides task control information 176 to a distributed task (DT) execution module 90. As a first step of executing the task in accordance with the task control information 176, the DT execution module 90 retrieves the encoded slices from memory 88. The DT execution module 90 then reconstructs contiguous data blocks of a data partition. As shown for this example, reconstructed contiguous data blocks of data partition 1 include data blocks 1-15 (e.g., d1-d15).

With the contiguous data blocks reconstructed, the DT execution module 90 performs the task on the reconstructed contiguous data blocks. For example, the task may be to search the reconstructed contiguous data blocks for a particular word or phrase, identify where in the reconstructed contiguous data blocks the particular word or phrase occurred, and/or count the occurrences of the particular word or phrase on the reconstructed contiguous data blocks. The DST execution unit continues in a similar manner for the encoded data slices of other partitions in slice grouping 1. Note that with using the unity matrix error encoding scheme previously discussed, if the encoded data slices of contiguous data are uncorrupted, the decoding of them is a relatively straightforward process of extracting the data.

If, however, an encoded data slice of contiguous data is corrupted (or missing), it can be rebuilt by accessing other DST execution units that are storing the other encoded data slices of the set of encoded data slices of the corrupted encoded data slice. In this instance, the DST execution unit having the corrupted encoded data slices retrieves at least three encoded data slices (of contiguous data and of error coding data) in the set from the other DST execution units (recall for this example, the pillar width is 5 and the decode threshold is 3). The DST execution unit decodes the retrieved data slices using the DS error encoding parameters to recapture the corresponding data segment. The DST execution unit then re-encodes the data segment using the DS error encoding parameters to rebuild the corrupted encoded data slice. Once the encoded data slice is rebuilt, the DST execution unit functions as previously described.

Figure 13:
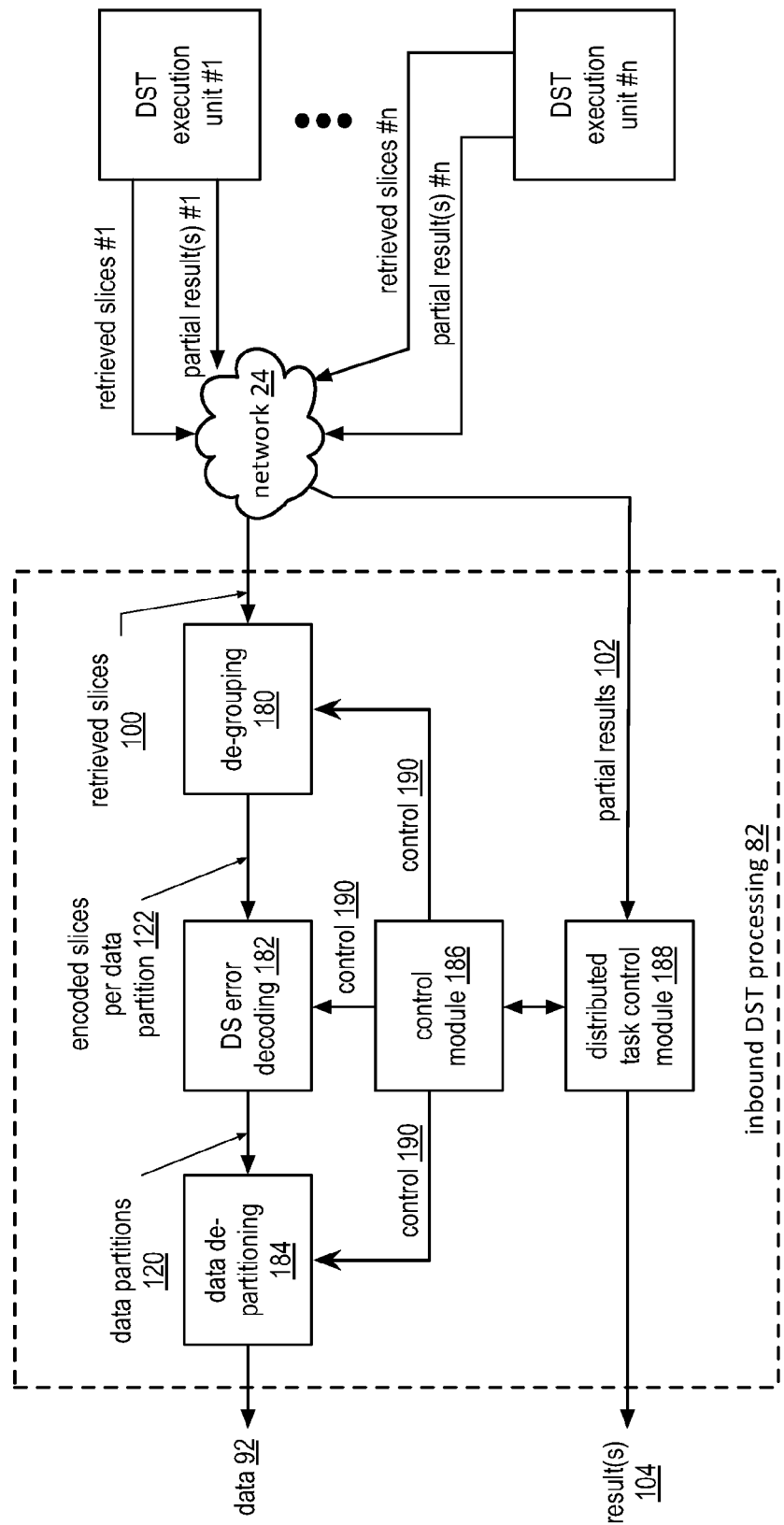
FIG. 13 is a schematic block diagram of an embodiment of an inbound distributed storage and/or task (DST) processing in accordance with the present invention.

FIG. 13 is a schematic block diagram of an embodiment of an inbound distributed storage and/or task (DST) processing section 82 of a DST client module coupled to DST execution units of a distributed storage and task network (DSTN) module via a network 24. The inbound DST processing section 82 includes a de-grouping module 180, a DS (dispersed storage) error decoding module 182, a data de-partitioning module 184, a control module 186, and a distributed task control module 188. Note that the control module 186 and/or the distributed task control module 188 may be separate modules from corresponding ones of outbound DST processing section or may be the same modules.

In an example of operation, the DST execution units have completed execution of corresponding partial tasks on the corresponding slice groupings to produce partial results 102. The inbound DST processing section 82 receives the partial results 102 via the distributed task control module 188. The inbound DST processing section 82 then processes the partial results 102 to produce a final result, or results 104. For example, if the task was to find a specific word or phrase within data, the partial results 102 indicate where in each of the prescribed portions of the data the corresponding DST execution units found the specific word or phrase. The distributed task control module 188 combines the individual partial results 102 for the corresponding portions of the data into a final result 104 for the data as a whole.

In another example of operation, the inbound DST processing section 82 is retrieving stored data from the DST execution units (i.e., the DSTN module). In this example, the DST execution units output encoded data slices 100 corresponding to the data retrieval requests. The de-grouping module 180 receives retrieved slices 100 and de-groups them to produce encoded data slices per data partition 122. The DS error decoding module 182 decodes, in accordance with DS error encoding parameters, the encoded data slices per data partition 122 to produce data partitions 120.

The data de-partitioning module 184 combines the data partitions 120 into the data 92. The control module 186 controls the conversion of retrieved slices 100 into the data 92 using control signals 190 to each of the modules. For instance, the control module 186 provides de-grouping information to the de-grouping module 180, provides the DS error encoding parameters to the DS error decoding module 182, and provides de-partitioning information to the data de-partitioning module 184.

Figure 14:
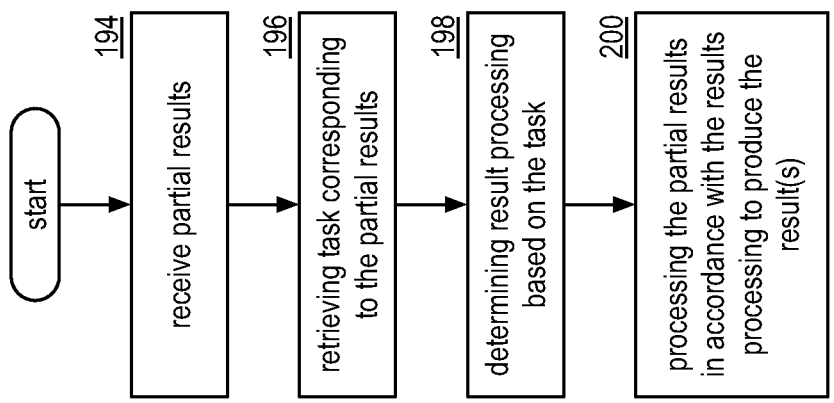
FIG. 14 is a logic diagram of an example of a method for inbound DST processing in accordance with the present invention.

FIG. 14 is a logic diagram of an example of a method that is executable by distributed storage and task (DST) client module regarding inbound DST processing. The method begins at step 194 where the DST client module receives partial results. The method continues at step 196 where the DST client module retrieves the task corresponding to the partial results. For example, the partial results include header information that identifies the requesting entity, which correlates to the requested task.

The method continues at step 198 where the DST client module determines result processing information based on the task. For example, if the task were to identify a particular word or phrase within the data, the result processing information would indicate to aggregate the partial results for the corresponding portions of the data to produce the final result. As another example, if the task were to count the occurrences of a particular word or phrase within the data, results of processing the information would indicate to add the partial results to produce the final results. The method continues at step 200 where the DST client module processes the partial results in accordance with the result processing information to produce the final result or results.

Figure 15:
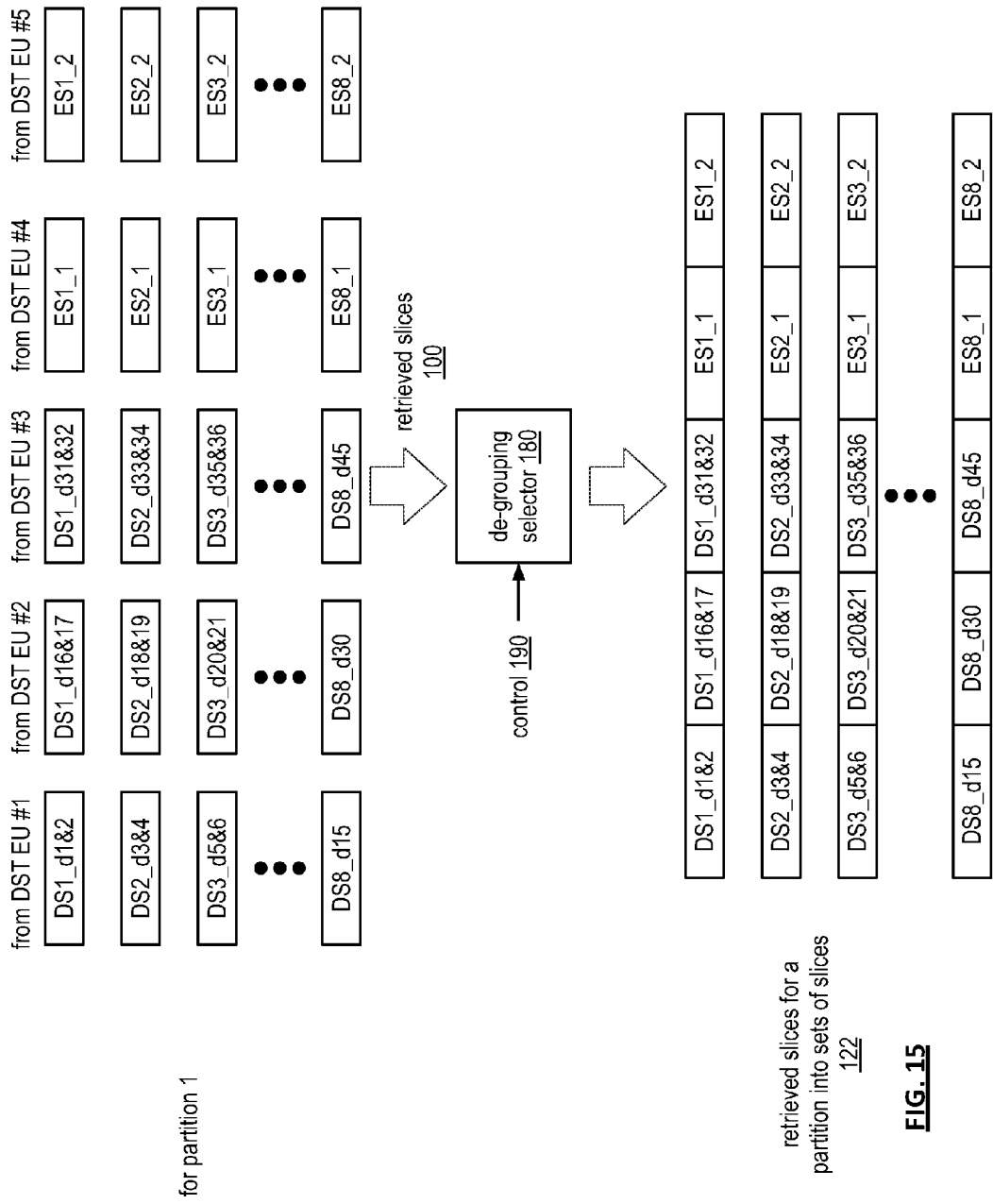
FIG. 15 is a diagram of an example of de-grouping selection processing of the inbound DST processing in accordance with the present invention.

FIG. 15 is a diagram of an example of de-grouping selection processing of an inbound distributed storage and task (DST) processing section of a DST client module. In general, this is an inverse process of the grouping module of the outbound DST processing section of FIG. 9. Accordingly, for each data partition (e.g., partition #1), the de-grouping module retrieves the corresponding slice grouping from the DST execution units (EU) (e.g., DST 1-5).

As shown, DST execution unit #1 provides a first slice grouping, which includes the first encoded slices of each of the sets of encoded slices (e.g., encoded data slices of contiguous data of data blocks 1-15); DST execution unit #2 provides a second slice grouping, which includes the second encoded slices of each of the sets of encoded slices (e.g., encoded data slices of contiguous data of data blocks 16-30); DST execution unit #3 provides a third slice grouping, which includes the third encoded slices of each of the sets of encoded slices (e.g., encoded data slices of contiguous data of data blocks 31-45); DST execution unit #4 provides a fourth slice grouping, which includes the fourth encoded slices of each of the sets of encoded slices (e.g., first encoded data slices of error coding (EC) data); and DST execution unit #5 provides a fifth slice grouping, which includes the fifth encoded slices of each of the sets of encoded slices (e.g., first encoded data slices of error coding (EC) data).

The de-grouping module de-groups the slice groupings (e.g., received slices 100) using a de-grouping selector 180 controlled by a control signal 190 as shown in the example to produce a plurality of sets of encoded data slices (e.g., retrieved slices for a partition into sets of slices 122). Each set corresponding to a data segment of the data partition.

Figure 16:
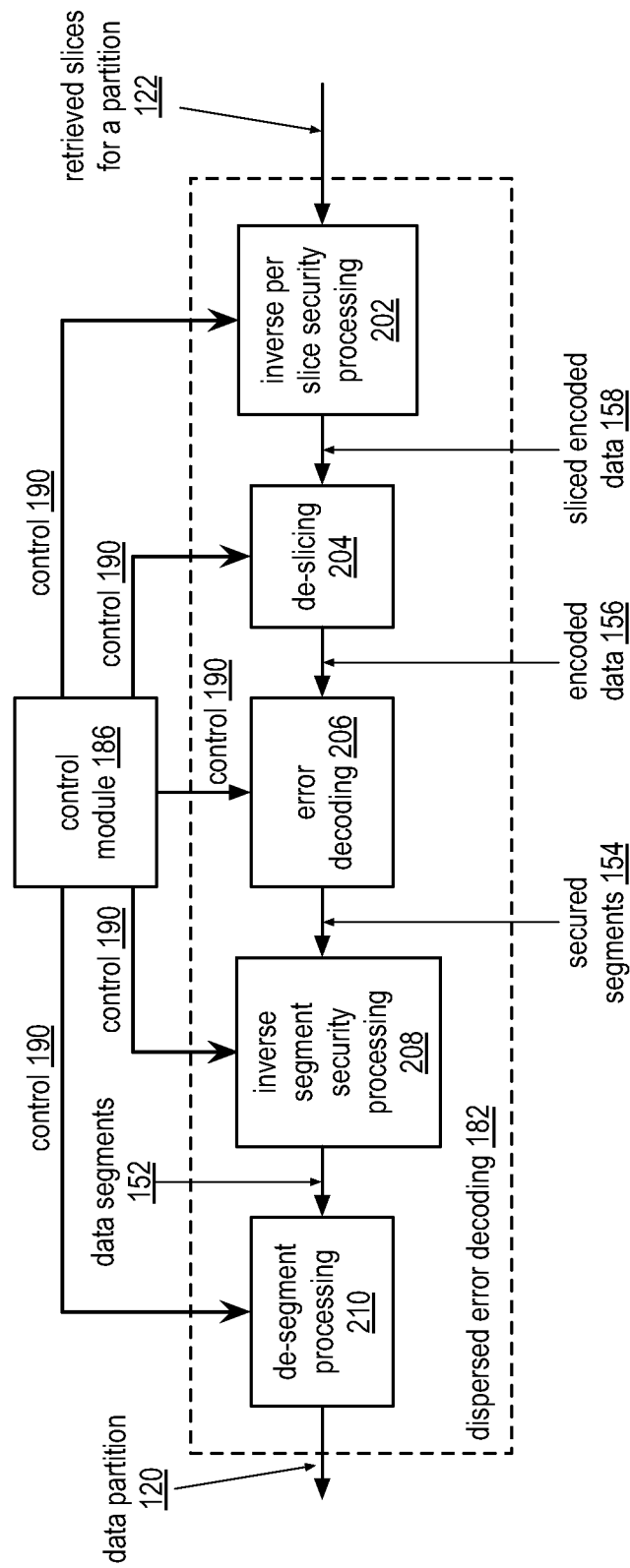
FIG. 16 is a schematic block diagram of an embodiment of a dispersed error decoding in accordance with the present invention.

FIG. 16 is a schematic block diagram of an embodiment of a dispersed storage (DS) error decoding module 182 of an inbound distributed storage and task (DST) processing section. The DS error decoding module 182 includes an inverse per slice security processing module 202, a de-slicing module 204, an error decoding module 206, an inverse segment security module 208, a de-segmenting processing module 210, and a control module 186.

In an example of operation, the inverse per slice security processing module 202, when enabled by the control module 186, unsecures each encoded data slice 122 based on slice de-security information received as control information 190 (e.g., the compliment of the slice security information discussed with reference to FIG. 6) received from the control module 186. The slice security information includes data decompression, decryption, de-watermarking, integrity check (e.g., CRC verification, etc.), and/or any other type of digital security. For example, when the inverse per slice security processing module 202 is enabled, it verifies integrity information (e.g., a CRC value) of each encoded data slice 122, it decrypts each verified encoded data slice, and decompresses each decrypted encoded data slice to produce slice encoded data 158. When the inverse per slice security processing module 202 is not enabled, it passes the encoded data slices 122 as the sliced encoded data 158 or is bypassed such that the retrieved encoded data slices 122 are provided as the sliced encoded data 158.

The de-slicing module 204 de-slices the sliced encoded data 158 into encoded data segments 156 in accordance with a pillar width of the error correction encoding parameters received as control information 190 from the control module 186. For example, if the pillar width is five, the de-slicing module 204 de-slices a set of five encoded data slices into an encoded data segment 156. The error decoding module 206 decodes the encoded data segments 156 in accordance with error correction decoding parameters received as control information 190 from the control module 186 to produce secure data segments 154. The error correction decoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction decoding parameters identify a specific error correction encoding scheme, specify a pillar width of five, and specify a decode threshold of three.

The inverse segment security processing module 208, when enabled by the control module 186, unsecures the secured data segments 154 based on segment security information received as control information 190 from the control module 186. The segment security information includes data decompression, decryption, de-watermarking, integrity check (e.g., CRC, etc.) verification, and/or any other type of digital security. For example, when the inverse segment security processing module 208 is enabled, it verifies integrity information (e.g., a CRC value) of each secure data segment 154, it decrypts each verified secured data segment, and decompresses each decrypted secure data segment to produce a data segment 152. When the inverse segment security processing module 208 is not enabled, it passes the decoded data segment 154 as the data segment 152 or is bypassed.

The de-segment processing module 210 receives the data segments 152 and receives de-segmenting information as control information 190 from the control module 186. The de-segmenting information indicates how the de-segment processing module 210 is to de-segment the data segments 152 into a data partition 120. For example, the de-segmenting information indicates how the rows and columns of data segments are to be rearranged to yield the data partition 120.

Figure 17:
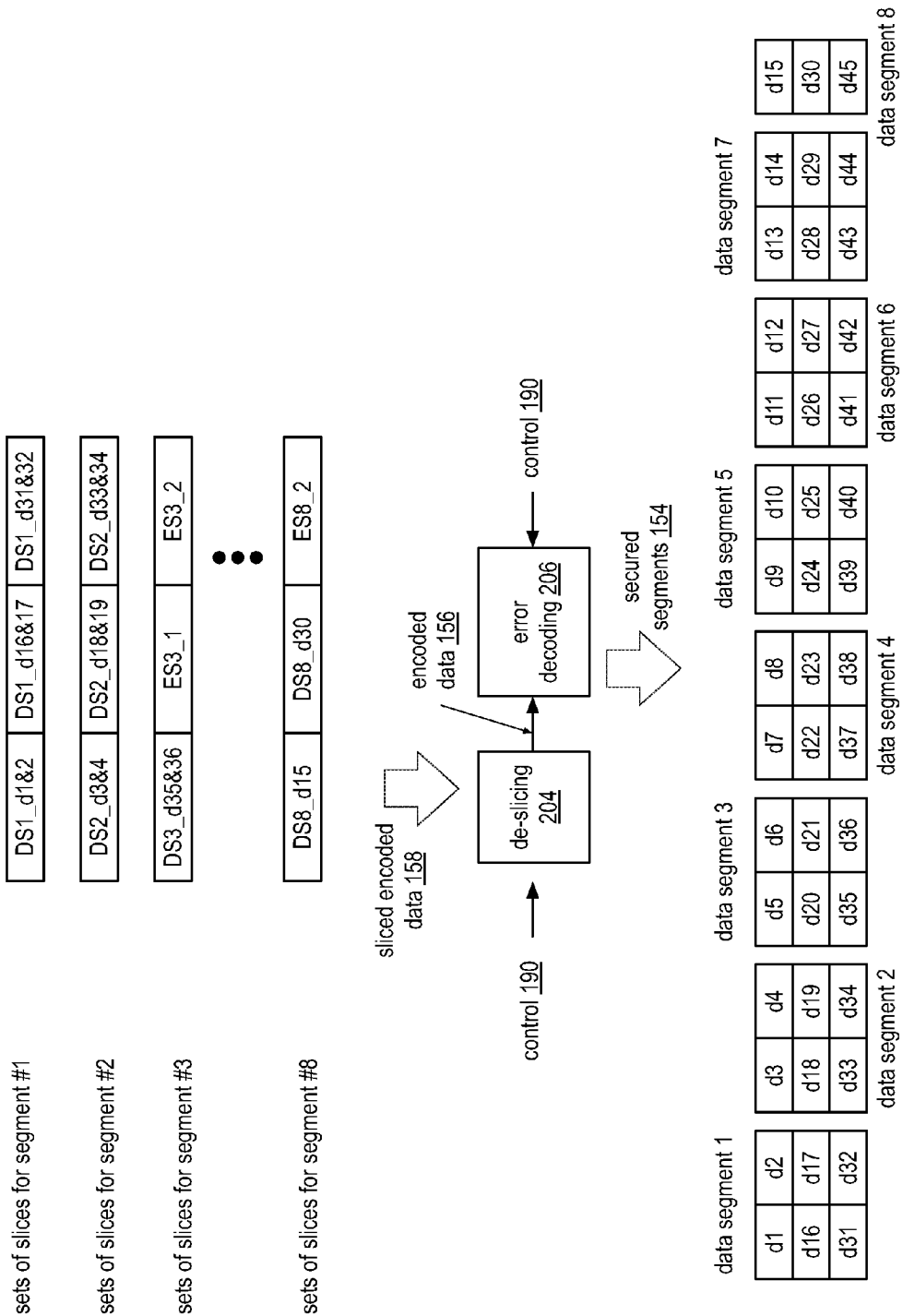
FIG. 17 is a diagram of an example of de-slicing and error decoding processing of the dispersed error decoding in accordance with the present invention.

FIG. 17 is a diagram of an example of de-slicing and error decoding processing of a dispersed error decoding module. A de-slicing module 204 receives at least a decode threshold number of encoded data slices 158 for each data segment in accordance with control information 190 and provides encoded data 156. In this example, a decode threshold is three. As such, each set of encoded data slices 158 is shown to have three encoded data slices per data segment. The de-slicing module 204 may receive three encoded data slices per data segment because an associated distributed storage and task (DST) client module requested retrieving only three encoded data slices per segment or selected three of the retrieved encoded data slices per data segment. As shown, which is based on the unity matrix encoding previously discussed with reference to FIG. 8, an encoded data slice may be a data-based encoded data slice (e.g., DS1_d1&d2) or an error code based encoded data slice (e.g., ES3_1).

An error decoding module 206 decodes the encoded data 156 of each data segment in accordance with the error correction decoding parameters of control information 190 to produce secured segments 154. In this example, data segment 1 includes 3 rows with each row being treated as one word for encoding. As such, data segment 1 includes three words: word 1 including data blocks d1 and d2, word 2 including data blocks d16 and d17, and word 3 including data blocks d31 and d32. Each of data segments 2-7 includes three words where each word includes two data blocks. Data segment 8 includes three words where each word includes a single data block (e.g., d15, d30, and d45).

Figure 18:
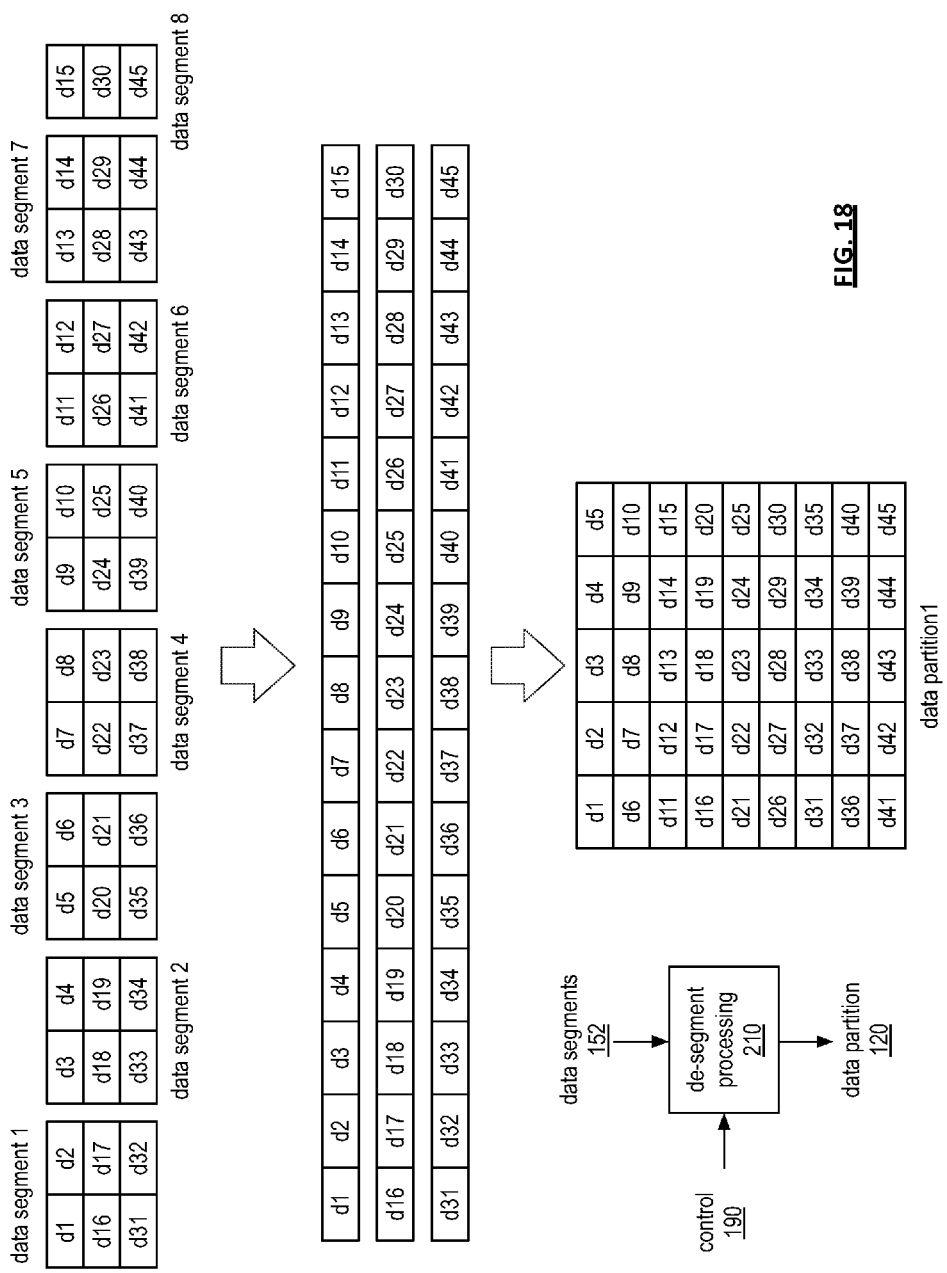
FIG. 18 is a diagram of an example of a de-segment processing of the dispersed error decoding in accordance with the present invention.

FIG. 18 is a diagram of an example of a de-segment processing of an inbound distributed storage and task (DST) processing. In this example, a de-segment processing module 210 receives data segments 152 (e.g., 1-8) and rearranges the data blocks of the data segments into rows and columns in accordance with de-segmenting information of control information 190 to produce a data partition 120. Note that the number of rows is based on the decode threshold (e.g., 3 in this specific example) and the number of columns is based on the number and size of the data blocks.

The de-segmenting module 210 converts the rows and columns of data blocks into the data partition 120. Note that each data block may be of the same size as other data blocks or of a different size. In addition, the size of each data block may be a few bytes to megabytes of data.

Figure 19:
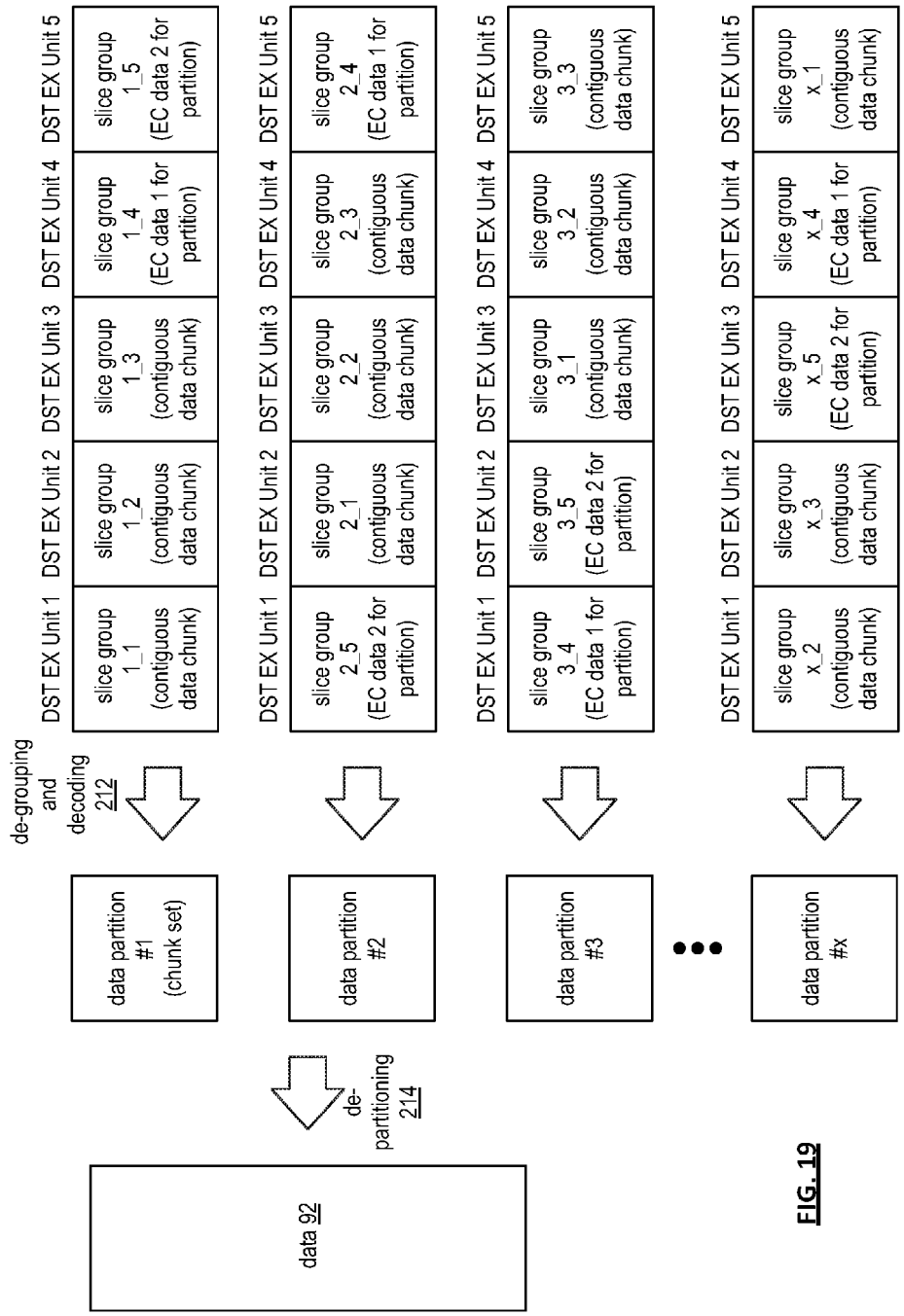
FIG. 19 is a diagram of an example of converting slice groups into data in accordance with the present invention.

FIG. 19 is a diagram of an example of converting slice groups into data 92 within an inbound distributed storage and task (DST) processing section. As shown, the data 92 is reconstructed from a plurality of data partitions (1-x, where x is an integer greater than 4). Each data partition (or chunk set of data) is decoded and re-grouped using a de-grouping and decoding function 212 and a de-partition function 214 from slice groupings as previously discussed. For a given data partition, the slice groupings (e.g., at least a decode threshold per data segment of encoded data slices) are received from DST execution units. From data partition to data partition, the ordering of the slice groupings received from the DST execution units may vary as discussed with reference to FIG. 10.

Figure 20:
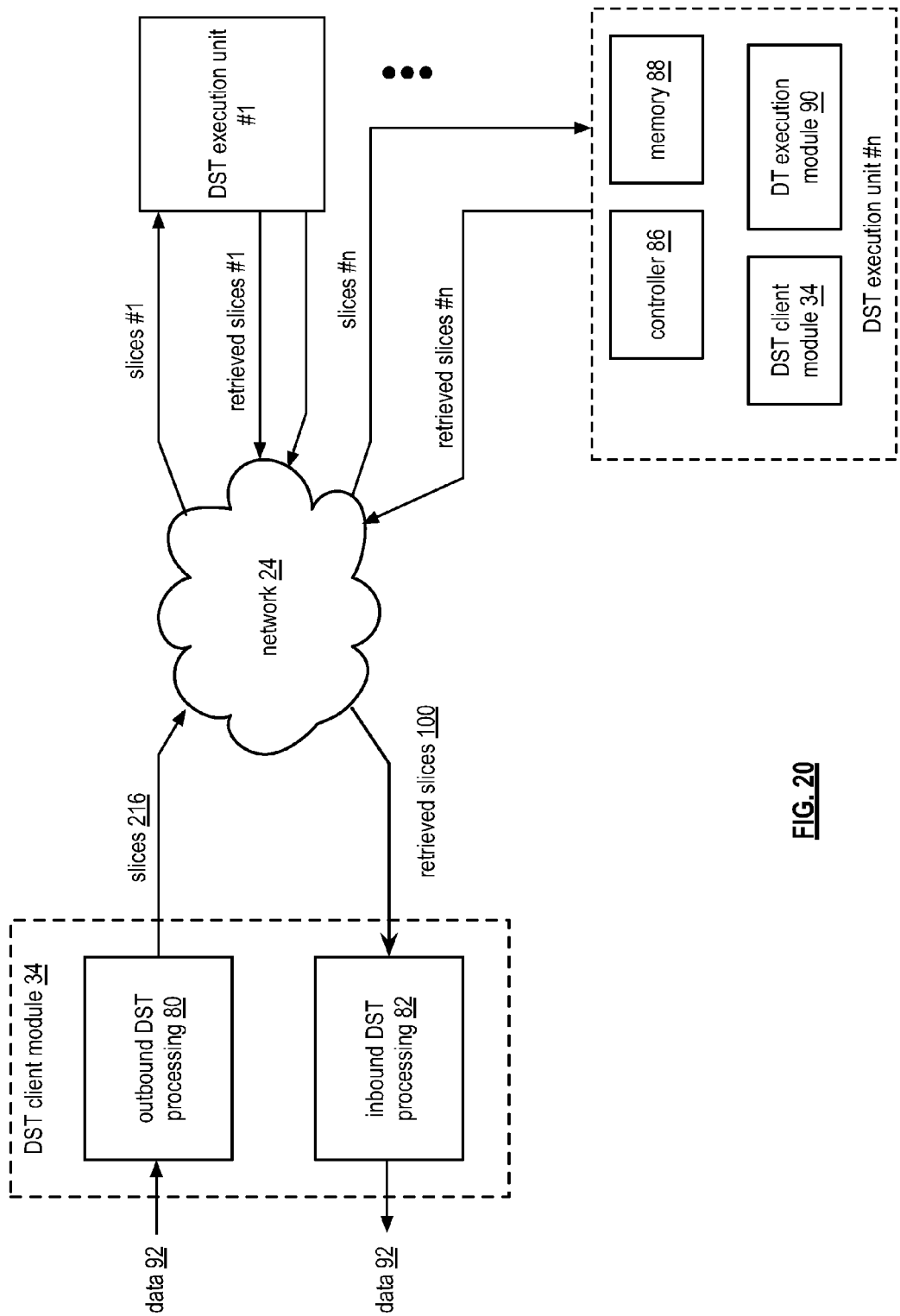
FIG. 20 is a diagram of an example of a distributed storage within the distributed computing system in accordance with the present invention.

FIG. 20 is a diagram of an example of a distributed storage and/or retrieval within the distributed computing system. The distributed computing system includes a plurality of distributed storage and/or task (DST) processing client modules 34 (one shown) coupled to a distributed storage and/or task processing network (DSTN) module, or multiple DSTN modules, via a network 24. The DST client module 34 includes an outbound DST processing section 80 and an inbound DST processing section 82. The DSTN module includes a plurality of DST execution units. Each DST execution unit includes a controller 86, memory 88, one or more distributed task (DT) execution modules 90, and a DST client module 34.

In an example of data storage, the DST client module 34 has data 92 that it desires to store in the DSTN module. The data 92 may be a file (e.g., video, audio, text, graphics, etc.), a data object, a data block, an update to a file, an update to a data block, etc. In this instance, the outbound DST processing module 80 converts the data 92 into encoded data slices 216 as will be further described with reference to FIGS. 21-23. The outbound DST processing module 80 sends, via the network 24, to the DST execution units for storage as further described with reference to FIG. 24.

In an example of data retrieval, the DST client module 34 issues a retrieve request to the DST execution units for the desired data 92. The retrieve request may address each DST executions units storing encoded data slices of the desired data, address a decode threshold number of DST execution units, address a read threshold number of DST execution units, or address some other number of DST execution units. In response to the request, each addressed DST execution unit retrieves its encoded data slices 100 of the desired data and sends them to the inbound DST processing section 82, via the network 24.

When, for each data segment, the inbound DST processing section 82 receives at least a decode threshold number of encoded data slices 100, it converts the encoded data slices 100 into a data segment. The inbound DST processing section 82 aggregates the data segments to produce the retrieved data 92.

Figure 21:
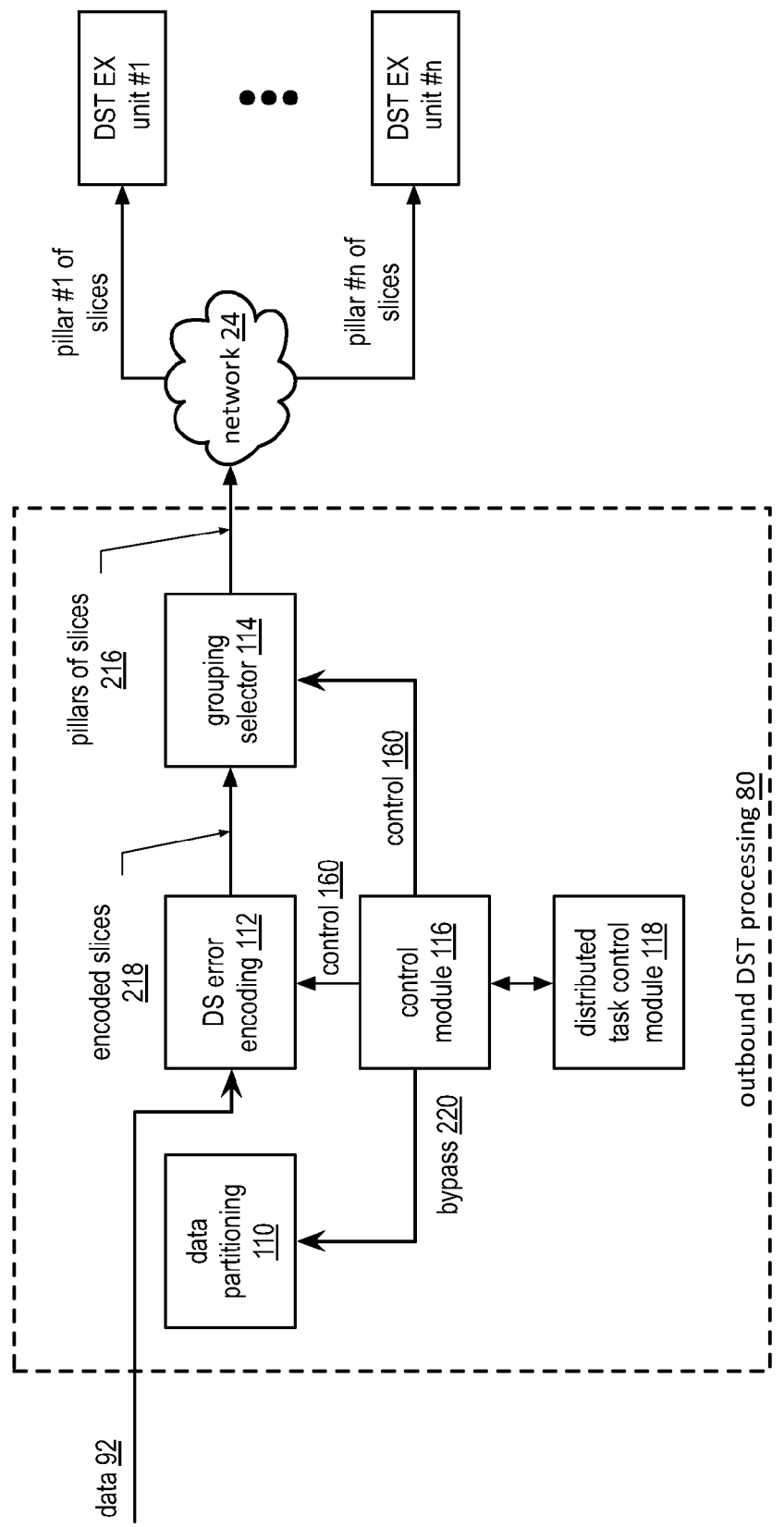
FIG. 21 is a schematic block diagram of an example of operation of outbound distributed storage and/or task (DST) processing for storing data in accordance with the present invention.

FIG. 21 is a schematic block diagram of an embodiment of an outbound distributed storage and/or task (DST) processing section 80 of a DST client module coupled to a distributed storage and task network (DSTN) module (e.g., a plurality of DST execution units) via a network 24. The outbound DST processing section 80 includes a data partitioning module 110, a dispersed storage (DS) error encoding module 112, a grouping selector module 114, a control module 116, and a distributed task control module 118.

In an example of operation, the data partitioning module 110 is by-passed such that data 92 is provided directly to the DS error encoding module 112. The control module 116 coordinates the by-passing of the data partitioning module 110 by outputting a bypass 220 message to the data partitioning module 110.

The DS error encoding module 112 receives the data 92 in a serial manner, a parallel manner, and/or a combination thereof. The DS error encoding module 112 DS error encodes the data in accordance with control information 160 from the control module 116 to produce encoded data slices 218. The DS error encoding includes segmenting the data 92 into data segments, segment security processing (e.g., encryption, compression, watermarking, integrity check (e.g., CRC, etc.)), error encoding, slicing, and/or per slice security processing (e.g., encryption, compression, watermarking, integrity check (e.g., CRC, etc.)). The control information 160 indicates which steps of the DS error encoding are active for the data 92 and, for active steps, indicates the parameters for the step. For example, the control information 160 indicates that the error encoding is active and includes error encoding parameters (e.g., pillar width, decode threshold, write threshold, read threshold, type of error encoding, etc.).

The grouping selector module 114 groups the encoded slices 218 of the data segments into pillars of slices 216. The number of pillars corresponds to the pillar width of the DS error encoding parameters. In this example, the distributed task control module 118 facilitates the storage request.

Figure 22:
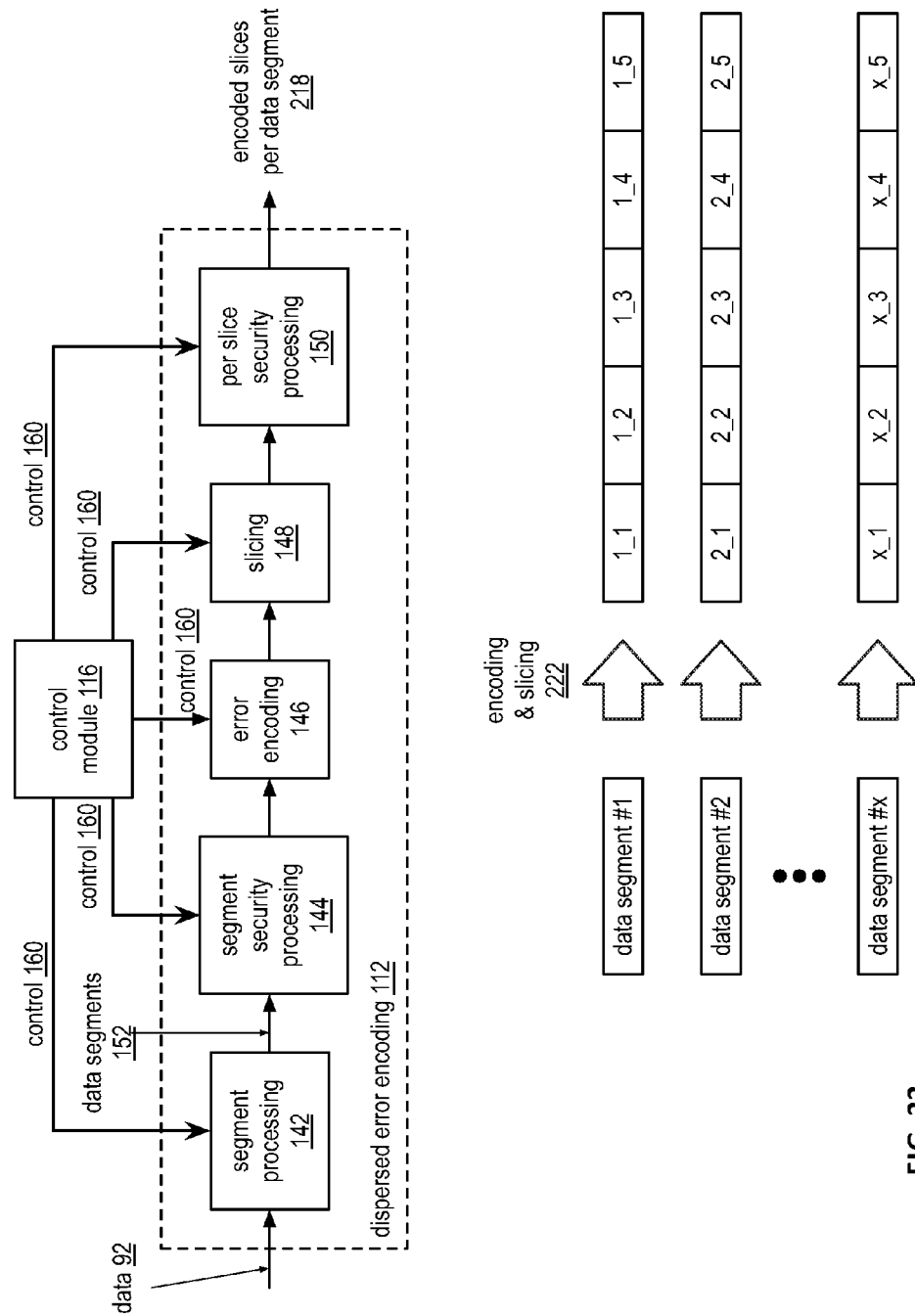
FIG. 22 is a schematic block diagram of an example of a dispersed error encoding for the example of FIG. 21 in accordance with the present invention.

FIG. 22 is a schematic block diagram of an example of a dispersed storage (DS) error encoding module 112 for the example of FIG. 21. The DS error encoding module 112 includes a segment processing module 142, a segment security processing module 144, an error encoding module 146, a slicing module 148, and a per slice security processing module 150. Each of these modules is coupled to a control module 116 to receive control information 160 therefrom.

In an example of operation, the segment processing module 142 receives data 92 and receives segmenting information as control information 160 from the control module 116. The segmenting information indicates how the segment processing module is to segment the data. For example, the segmenting information indicates the size of each data segment. The segment processing module 142 segments the data 92 into data segments 152 in accordance with the segmenting information.

The segment security processing module 144, when enabled by the control module 116, secures the data segments 152 based on segment security information received as control information 160 from the control module 116. The segment security information includes data compression, encryption, watermarking, integrity check (e.g., CRC, etc.), and/or any other type of digital security. For example, when the segment security processing module 144 is enabled, it compresses a data segment 152, encrypts the compressed data segment, and generates a CRC value for the encrypted data segment to produce a secure data segment. When the segment security processing module 144 is not enabled, it passes the data segments 152 to the error encoding module 146 or is bypassed such that the data segments 152 are provided to the error encoding module 146.

The error encoding module 146 encodes the secure data segments in accordance with error correction encoding parameters received as control information 160 from the control module 116. The error correction encoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction encoding parameters identify a specific error correction encoding scheme, specifies a pillar width of five, and specifies a decode threshold of three. From these parameters, the error encoding module 146 encodes a data segment to produce an encoded data segment.

The slicing module 148 slices the encoded data segment in accordance with a pillar width of the error correction encoding parameters. For example, if the pillar width is five, the slicing module slices an encoded data segment into a set of five encoded data slices. As such, for a plurality of data segments, the slicing module 148 outputs a plurality of sets of encoded data slices as shown within encoding and slicing function 222 as described.

The per slice security processing module 150, when enabled by the control module 116, secures each encoded data slice based on slice security information received as control information 160 from the control module 116. The slice security information includes data compression, encryption, watermarking, integrity check (e.g., CRC, etc.), and/or any other type of digital security. For example, when the per slice security processing module 150 is enabled, it may compress an encoded data slice, encrypt the compressed encoded data slice, and generate a CRC value for the encrypted encoded data slice to produce a secure encoded data slice tweaking. When the per slice security processing module 150 is not enabled, it passes the encoded data slices or is bypassed such that the encoded data slices 218 are the output of the DS error encoding module 112.

Figure 23:
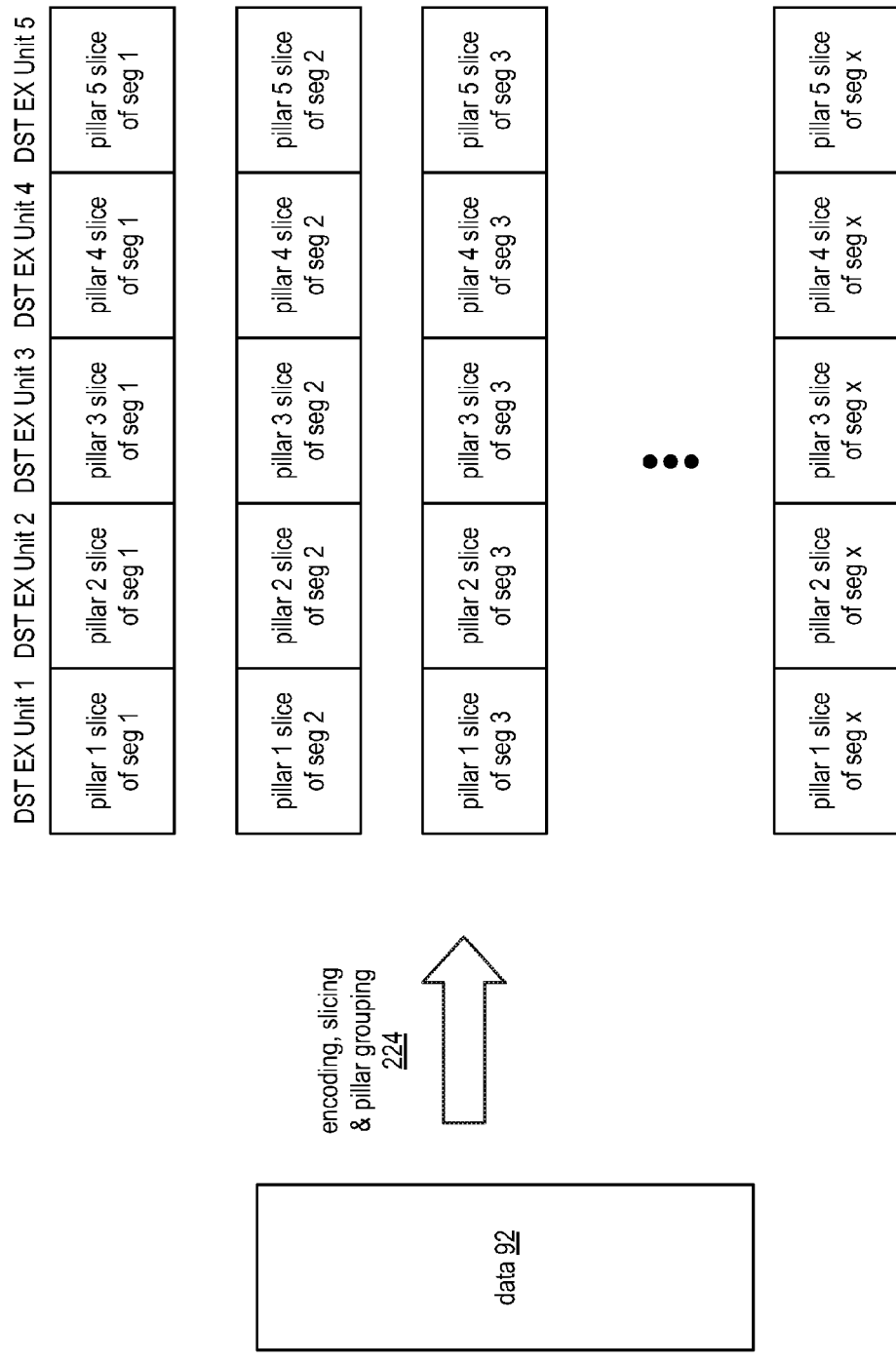
FIG. 23 is a diagram of an example of converting data into pillar slice groups for storage in accordance with the present invention.

FIG. 23 is a diagram of an example of converting data 92 into pillar slice groups utilizing encoding, slicing and pillar grouping function 224 for storage in memory of a distributed storage and task network (DSTN) module. As previously discussed the data 92 is encoded and sliced into a plurality of sets of encoded data slices; one set per data segment. The grouping selector module organizes the sets of encoded data slices into pillars of data slices. In this example, the DS error encoding parameters include a pillar width of 5 and a decode threshold of 3. As such, for each data segment, 5 encoded data slices are created.

The grouping selector module takes the first encoded data slice of each of the sets and forms a first pillar, which may be sent to the first DST execution unit. Similarly, the grouping selector module creates the second pillar from the second slices of the sets; the third pillar from the third slices of the sets; the fourth pillar from the fourth slices of the sets; and the fifth pillar from the fifth slices of the set.

FIG. 24 is a schematic block diagram of an embodiment of a distributed storage and/or task (DST) execution unit that includes an interface 169, a controller 86, memory 88, one or more distributed task (DT) execution modules 90, and a DST client module 34. A computing core 26 may be utilized to implement the one or more DT execution modules 90 and the DST client module 34. The memory 88 is of sufficient size to store a significant number of encoded data slices (e.g., thousands of slices to hundreds-of-millions of slices) and may include one or more hard drives and/or one or more solid-state memory devices (e.g., flash memory, DRAM, etc.).

In an example of storing a pillar of slices 216, the DST execution unit receives, via interface 169, a pillar of slices 216 (e.g., pillar #1 slices). The memory 88 stores the encoded data slices 216 of the pillar of slices in accordance with memory control information 174 it receives from the controller 86. The controller 86 (e.g., a processing module, a CPU, etc.) generates the memory control information 174 based on distributed storage information (e.g., user information (e.g., user ID, distributed storage permissions, data access permission, etc.), vault information (e.g., virtual memory assigned to user, user group, etc.), etc.). Similarly, when retrieving slices, the DST execution unit receives, via interface 169, a slice retrieval request. The memory 88 retrieves the slice in accordance with memory control information 174 it receives from the controller 86. The memory 88 outputs the slice 100, via the interface 169, to a requesting entity.

Figure 25:
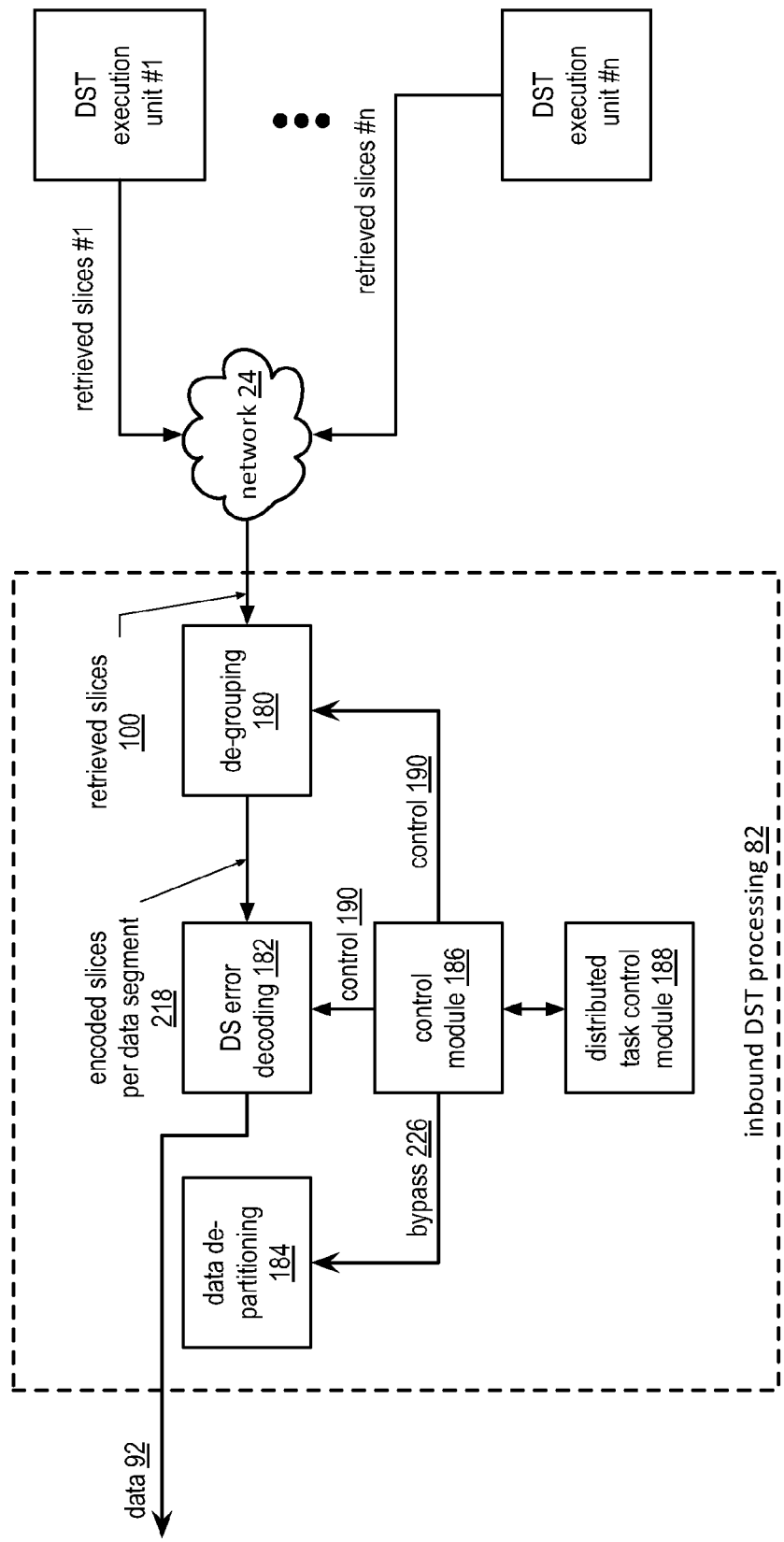
FIG. 25 is a schematic block diagram of an example of operation of inbound distributed storage and/or task (DST) processing for retrieving dispersed error encoded data in accordance with the present invention.

FIG. 25 is a schematic block diagram of an example of operation of an inbound distributed storage and/or task (DST) processing section 82 for retrieving dispersed error encoded data 92. The inbound DST processing section 82 includes a de-grouping module 180, a dispersed storage (DS) error decoding module 182, a data de-partitioning module 184, a control module 186, and a distributed task control module 188. Note that the control module 186 and/or the distributed task control module 188 may be separate modules from corresponding ones of an outbound DST processing section or may be the same modules.

In an example of operation, the inbound DST processing section 82 is retrieving stored data 92 from the DST execution units (i.e., the DSTN module). In this example, the DST execution units output encoded data slices corresponding to data retrieval requests from the distributed task control module 188. The de-grouping module 180 receives pillars of slices 100 and de-groups them in accordance with control information 190 from the control module 186 to produce sets of encoded data slices 218. The DS error decoding module 182 decodes, in accordance with the DS error encoding parameters received as control information 190 from the control module 186, each set of encoded data slices 218 to produce data segments, which are aggregated into retrieved data 92. The data de-partitioning module 184 is by-passed in this operational mode via a bypass signal 226 of control information 190 from the control module 186.

Figure 26:
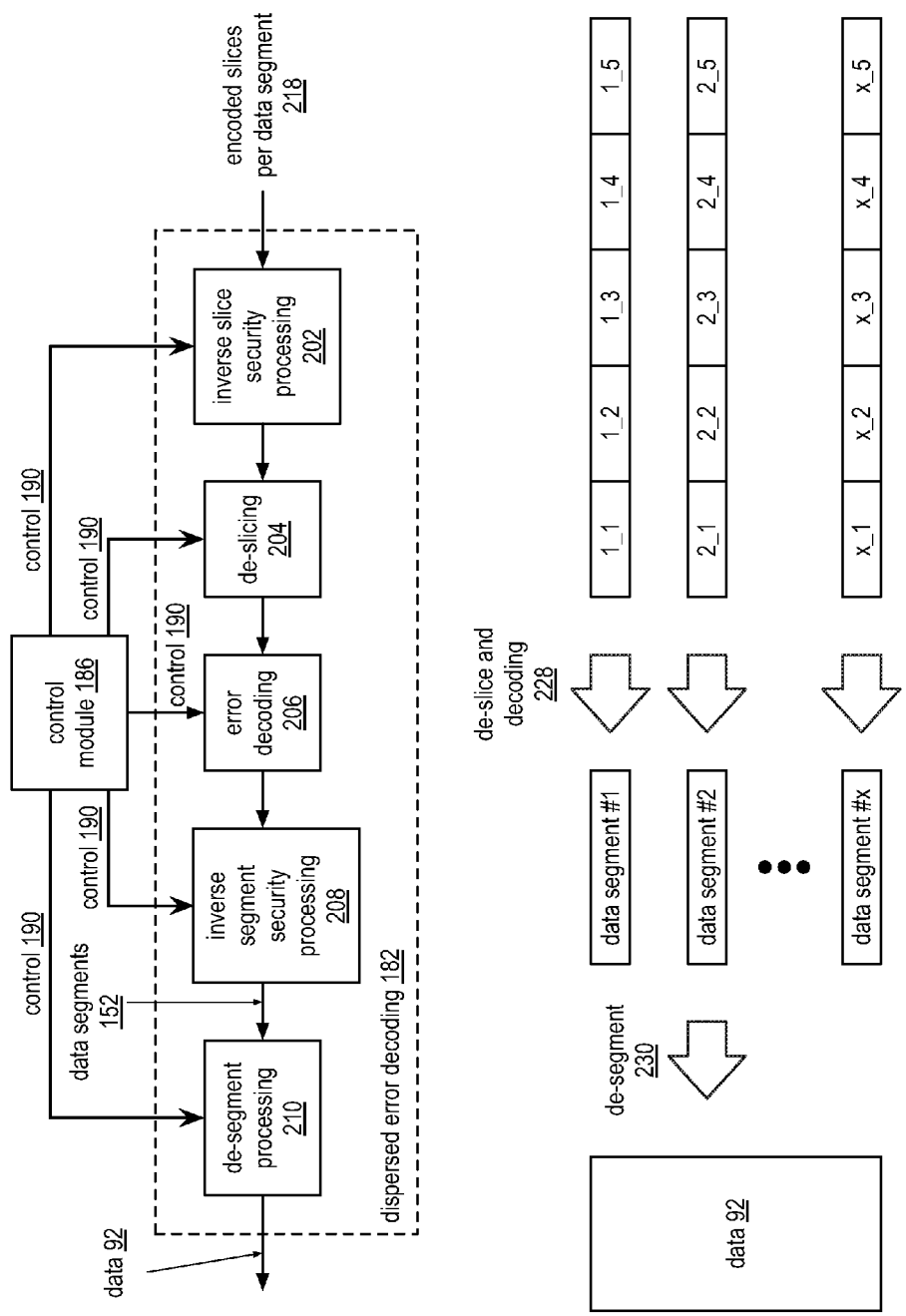
FIG. 26 is a schematic block diagram of an example of a dispersed error decoding for the example of FIG. 25 in accordance with the present invention.

FIG. 26 is a schematic block diagram of an embodiment of a dispersed storage (DS) error decoding module 182 of an inbound distributed storage and task (DST) processing section. The DS error decoding module 182 includes an inverse per slice security processing module 202, a de-slicing module 204, an error decoding module 206, an inverse segment security module 208, and a de-segmenting processing module 210. The dispersed error decoding module 182 is operable to de-slice and decode encoded slices per data segment 218 utilizing a de-slicing and decoding function 228 to produce a plurality of data segments that are de-segmented utilizing a de-segment function 230 to recover data 92.

In an example of operation, the inverse per slice security processing module 202, when enabled by the control module 186 via control information 190, unsecures each encoded data slice 218 based on slice de-security information (e.g., the compliment of the slice security information discussed with reference to FIG. 6) received as control information 190 from the control module 186. The slice de-security information includes data decompression, decryption, de-watermarking, integrity check (e.g., CRC verification, etc.), and/or any other type of digital security. For example, when the inverse per slice security processing module 202 is enabled, it verifies integrity information (e.g., a CRC value) of each encoded data slice 218, it decrypts each verified encoded data slice, and decompresses each decrypted encoded data slice to produce slice encoded data. When the inverse per slice security processing module 202 is not enabled, it passes the encoded data slices 218 as the sliced encoded data or is bypassed such that the retrieved encoded data slices 218 are provided as the sliced encoded data.

The de-slicing module 204 de-slices the sliced encoded data into encoded data segments in accordance with a pillar width of the error correction encoding parameters received as control information 190 from a control module 186. For example, if the pillar width is five, the de-slicing module de-slices a set of five encoded data slices into an encoded data segment. Alternatively, the encoded data segment may include just three encoded data slices (e.g., when the decode threshold is 3).

The error decoding module 206 decodes the encoded data segments in accordance with error correction decoding parameters received as control information 190 from the control module 186 to produce secure data segments. The error correction decoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction decoding parameters identify a specific error correction encoding scheme, specify a pillar width of five, and specify a decode threshold of three.

The inverse segment security processing module 208, when enabled by the control module 186, unsecures the secured data segments based on segment security information received as control information 190 from the control module 186. The segment security information includes data decompression, decryption, de-watermarking, integrity check (e.g., CRC, etc.) verification, and/or any other type of digital security. For example, when the inverse segment security processing module is enabled, it verifies integrity information (e.g., a CRC value) of each secure data segment, it decrypts each verified secured data segment, and decompresses each decrypted secure data segment to produce a data segment 152. When the inverse segment security processing module 208 is not enabled, it passes the decoded data segment 152 as the data segment or is bypassed. The de-segmenting processing module 210 aggregates the data segments 152 into the data 92 in accordance with control information 190 from the control module 186.

Figure 27:
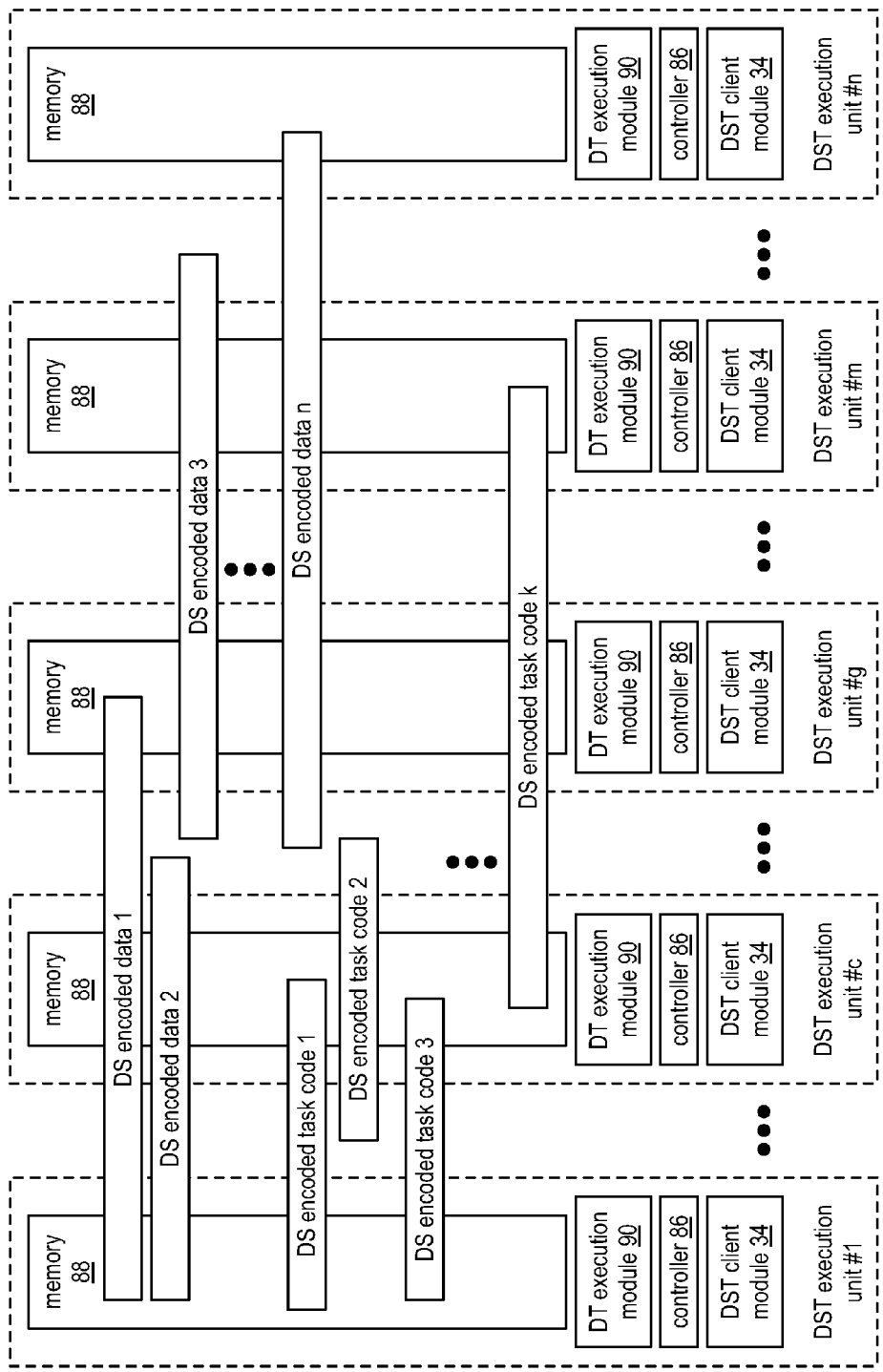
FIG. 27 is a schematic block diagram of an example of a distributed storage and task processing network (DSTN) module storing a plurality of data and a plurality of task codes in accordance with the present invention.

FIG. 27 is a schematic block diagram of an example of a distributed storage and task processing network (DSTN) module that includes a plurality of distributed storage and task (DST) execution units (#1 through #n, where, for example, n is an integer greater than or equal to three). Each of the DST execution units includes a DST client module 34, a controller 86, one or more DT (distributed task) execution modules 90, and memory 88.

In this example, the DSTN module stores, in the memory of the DST execution units, a plurality of DS (dispersed storage) encoded data (e.g., 1 through n, where n is an integer greater than or equal to two) and stores a plurality of DS encoded task codes (e.g., 1 through k, where k is an integer greater than or equal to two). The DS encoded data may be encoded in accordance with one or more examples described with reference to FIGS. 3-19 (e.g., organized in slice groupings) or encoded in accordance with one or more examples described with reference to FIGS. 20-26 (e.g., organized in pillar groups). The data that is encoded into the DS encoded data may be of any size and/or of any content. For example, the data may be one or more digital books, a copy of a company's emails, a large-scale Internet search, a video security file, one or more entertainment video files (e.g., television programs, movies, etc.), data files, and/or any other large amount of data (e.g., greater than a few Terabytes).

The tasks that are encoded into the DS encoded task code may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc. The tasks may be encoded into the DS encoded task code in accordance with one or more examples described with reference to FIGS. 3-19 (e.g., organized in slice groupings) or encoded in accordance with one or more examples described with reference to FIGS. 20-26 (e.g., organized in pillar groups).

In an example of operation, a DST client module of a user device or of a DST processing unit issues a DST request to the DSTN module. The DST request may include a request to retrieve stored data, or a portion thereof, may include a request to store data that is included with the DST request, may include a request to perform one or more tasks on stored data, may include a request to perform one or more tasks on data included with the DST request, etc. In the cases where the DST request includes a request to store data or to retrieve data, the client module and/or the DSTN module processes the request as previously discussed with reference to one or more of FIGS. 3-19 (e.g., slice groupings) and/or 20-26 (e.g., pillar groupings). In the case where the DST request includes a request to perform one or more tasks on data included with the DST request, the DST client module and/or the DSTN module process the DST request as previously discussed with reference to one or more of FIGS. 3-19.

In the case where the DST request includes a request to perform one or more tasks on stored data, the DST client module and/or the DSTN module processes the DST request as will be described with reference to one or more of FIGS. 28-39. In general, the DST client module identifies data and one or more tasks for the DSTN module to execute upon the identified data. The DST request may be for a one-time execution of the task or for an on-going execution of the task. As an example of the latter, as a company generates daily emails, the DST request may be to daily search new emails for inappropriate content and, if found, record the content, the email sender(s), the email recipient(s), email routing information, notify human resources of the identified email, etc.

Figure 28:
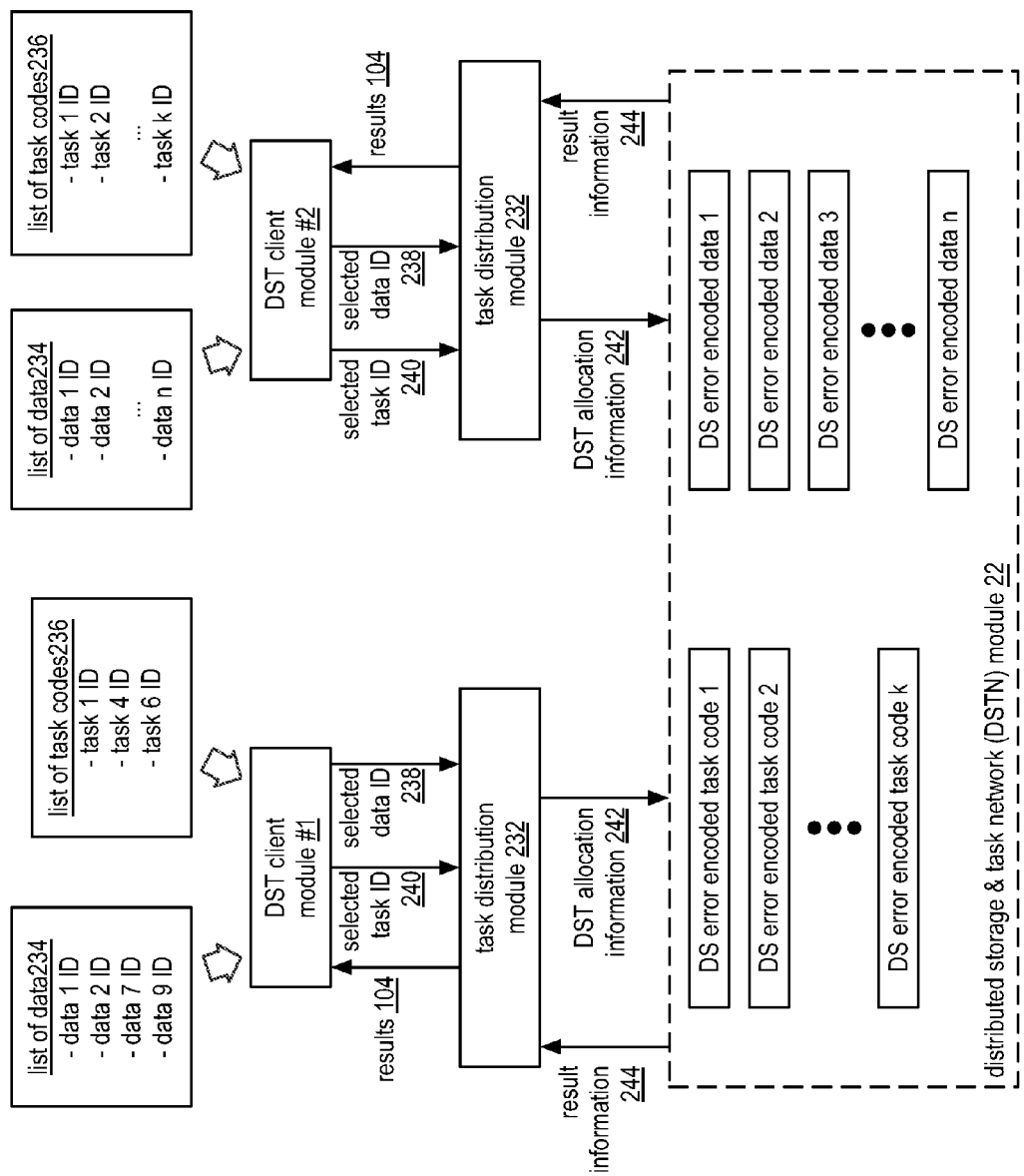
FIG. 28 is a schematic block diagram of an example of the distributed computing system performing tasks on stored data in accordance with the present invention.

FIG. 28 is a schematic block diagram of an example of a distributed computing system performing tasks on stored data. In this example, two distributed storage and task (DST) client modules 1-2 are shown: the first may be associated with a user device and the second may be associated with a DST processing unit or a high priority user device (e.g., high priority clearance user, system administrator, etc.). Each DST client module includes a list of stored data 234 and a list of tasks codes 236. The list of stored data 234 includes one or more entries of data identifying information, where each entry identifies data stored in the DSTN module 22. The data identifying information (e.g., data ID) includes one or more of a data file name, a data file directory listing, DSTN addressing information of the data, a data object identifier, etc. The list of tasks 236 includes one or more entries of task code identifying information, when each entry identifies task codes stored in the DSTN module 22. The task code identifying information (e.g., task ID) includes one or more of a task file name, a task file directory listing, DSTN addressing information of the task, another type of identifier to identify the task, etc.

As shown, the list of data 234 and the list of tasks 236 are each smaller in number of entries for the first DST client module than the corresponding lists of the second DST client module. This may occur because the user device associated with the first DST client module has fewer privileges in the distributed computing system than the device associated with the second DST client module. Alternatively, this may occur because the user device associated with the first DST client module serves fewer users than the device associated with the second DST client module and is restricted by the distributed computing system accordingly. As yet another alternative, this may occur through no restraints by the distributed computing system, it just occurred because the operator of the user device associated with the first DST client module has selected fewer data and/or fewer tasks than the operator of the device associated with the second DST client module.

In an example of operation, the first DST client module selects one or more data entries 238 and one or more tasks 240 from its respective lists (e.g., selected data ID and selected task ID). The first DST client module sends its selections to a task distribution module 232. The task distribution module 232 may be within a stand-alone device of the distributed computing system, may be within the user device that contains the first DST client module, or may be within the DSTN module 22.

Regardless of the task distribution module's location, it generates DST allocation information 242 from the selected task ID 240 and the selected data ID 238. The DST allocation information 242 includes data partitioning information, task execution information, and/or intermediate result information. The task distribution module 232 sends the DST allocation information 242 to the DSTN module 22. Note that one or more examples of the DST allocation information will be discussed with reference to one or more of FIGS. 29-39.

The DSTN module 22 interprets the DST allocation information 242 to identify the stored DS encoded data (e.g., DS error encoded data 2) and to identify the stored DS error encoded task code (e.g., DS error encoded task code 1). In addition, the DSTN module 22 interprets the DST allocation information 242 to determine how the data is to be partitioned and how the task is to be partitioned. The DSTN module 22 also determines whether the selected DS error encoded data 238 needs to be converted from pillar grouping to slice grouping. If so, the DSTN module 22 converts the selected DS error encoded data into slice groupings and stores the slice grouping DS error encoded data by overwriting the pillar grouping DS error encoded data or by storing it in a different location in the memory of the DSTN module 22 (i.e., does not overwrite the pillar grouping DS encoded data).

The DSTN module 22 partitions the data and the task as indicated in the DST allocation information 242 and sends the portions to selected DST execution units of the DSTN module 22. Each of the selected DST execution units performs its partial task(s) on its slice groupings to produce partial results. The DSTN module 22 collects the partial results from the selected DST execution units and provides them, as result information 244, to the task distribution module. The result information 244 may be the collected partial results, one or more final results as produced by the DSTN module 22 from processing the partial results in accordance with the DST allocation information 242, or one or more intermediate results as produced by the DSTN module 22 from processing the partial results in accordance with the DST allocation information 242.

The task distribution module 232 receives the result information 244 and provides one or more final results 104 therefrom to the first DST client module. The final result(s) 104 may be result information 244 or a result(s) of the task distribution module's processing of the result information 244.

In concurrence with processing the selected task of the first DST client module, the distributed computing system may process the selected task(s) of the second DST client module on the selected data(s) of the second DST client module. Alternatively, the distributed computing system may process the second DST client module's request subsequent to, or preceding, that of the first DST client module. Regardless of the ordering and/or parallel processing of the DST client module requests, the second DST client module provides its selected data 238 and selected task 240 to a task distribution module 232. If the task distribution module 232 is a separate device of the distributed computing system or within the DSTN module, the task distribution modules 232 coupled to the first and second DST client modules may be the same module. The task distribution module 232 processes the request of the second DST client module in a similar manner as it processed the request of the first DST client module.

Figure 29:
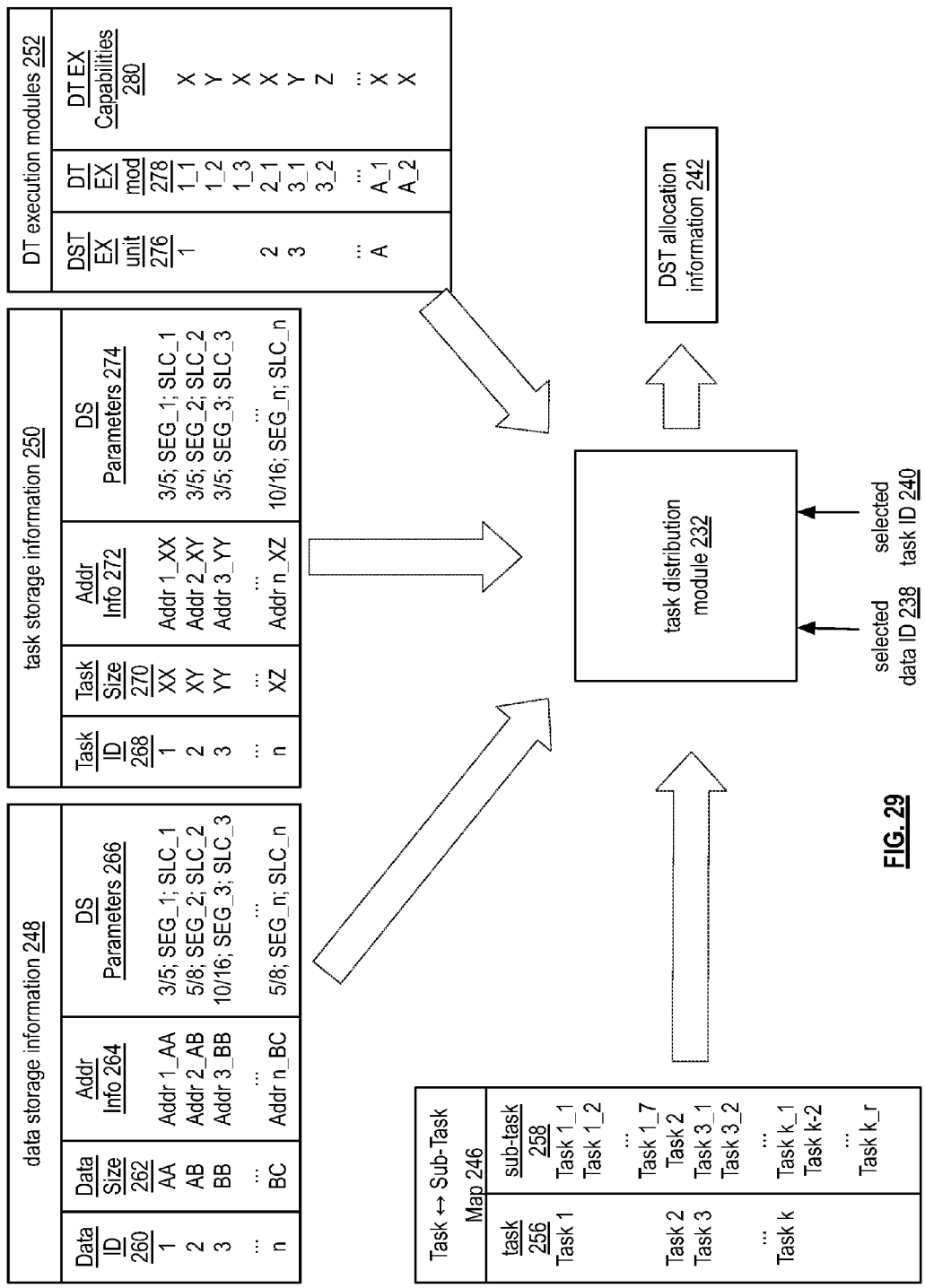
FIG. 29 is a schematic block diagram of an embodiment of a task distribution module facilitating the example of FIG. 28 in accordance with the present invention.

FIG. 29 is a schematic block diagram of an embodiment of a task distribution module 232 facilitating the example of FIG. 28. The task distribution module 232 includes a plurality of tables it uses to generate distributed storage and task (DST) allocation information 242 for selected data and selected tasks received from a DST client module. The tables include data storage information 248, task storage information 250, distributed task (DT) execution module information 252, and task ⇔ sub-task mapping information 246.

The data storage information table 248 includes a data identification (ID) field 260, a data size field 262, an addressing information field 264, distributed storage (DS) information 266, and may further include other information regarding the data, how it is stored, and/or how it can be processed. For example, DS encoded data #1 has a data ID of 1, a data size of AA (e.g., a byte size of a few Terabytes or more), addressing information of Addr_1_AA, and DS parameters of 3/5; SEG_1; and SLC_1. In this example, the addressing information may be a virtual address corresponding to the virtual address of the first storage word (e.g., one or more bytes) of the data and information on how to calculate the other addresses, may be a range of virtual addresses for the storage words of the data, physical addresses of the first storage word or the storage words of the data, may be a list of slices names of the encoded data slices of the data, etc. The DS parameters may include identity of an error encoding scheme, decode threshold/pillar width (e.g., 3/5 for the first data entry), segment security information (e.g., SEG_1), per slice security information (e.g., SLC_1), and/or any other information regarding how the data was encoded into data slices.

The task storage information table 250 includes a task identification (ID) field 268, a task size field 270, an addressing information field 272, distributed storage (DS) information 274, and may further include other information regarding the task, how it is stored, and/or how it can be used to process data. For example, DS encoded task #2 has a task ID of 2, a task size of XY, addressing information of Addr_2_XY, and DS parameters of 3/5; SEG_2; and SLC_2. In this example, the addressing information may be a virtual address corresponding to the virtual address of the first storage word (e.g., one or more bytes) of the task and information on how to calculate the other addresses, may be a range of virtual addresses for the storage words of the task, physical addresses of the first storage word or the storage words of the task, may be a list of slices names of the encoded slices of the task code, etc. The DS parameters may include identity of an error encoding scheme, decode threshold/pillar width (e.g., 3/5 for the first data entry), segment security information (e.g., SEG_2), per slice security information (e.g., SLC_2), and/or any other information regarding how the task was encoded into encoded task slices. Note that the segment and/or the per-slice security information include a type of encryption (if enabled), a type of compression (if enabled), watermarking information (if enabled), and/or an integrity check scheme (if enabled).

The task ⇔ sub-task mapping information table 246 includes a task field 256 and a sub-task field 258. The task field 256 identifies a task stored in the memory of a distributed storage and task network (DSTN) module and the corresponding sub-task fields 258 indicates whether the task includes sub-tasks and, if so, how many and if any of the sub-tasks are ordered. In this example, the task ⇔ sub-task mapping information table 246 includes an entry for each task stored in memory of the DSTN module (e.g., task 1 through task k). In particular, this example indicates that task 1 includes 7 sub-tasks; task 2 does not include sub-tasks, and task k includes r number of sub-tasks (where r is an integer greater than or equal to two).

The DT execution module table 252 includes a DST execution unit ID field 276, a DT execution module ID field 278, and a DT execution module capabilities field 280. The DST execution unit ID field 276 includes the identity of DST units in the DSTN module. The DT execution module ID field 278 includes the identity of each DT execution unit in each DST unit. For example, DST unit 1 includes three DT executions modules (e.g., 1_1, 1_2, and 1_3). The DT execution capabilities field 280 includes identity of the capabilities of the corresponding DT execution unit. For example, DT execution module 1_1 includes capabilities X, where X includes one or more of MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, memory information (e.g., type, size, availability, etc.), and/or any information germane to executing one or more tasks.

From these tables, the task distribution module 232 generates the DST allocation information 242 to indicate where the data is stored, how to partition the data, where the task is stored, how to partition the task, which DT execution units should perform which partial task on which data partitions, where and how intermediate results are to be stored, etc. If multiple tasks are being performed on the same data or different data, the task distribution module factors such information into its generation of the DST allocation information.

Figure 30:
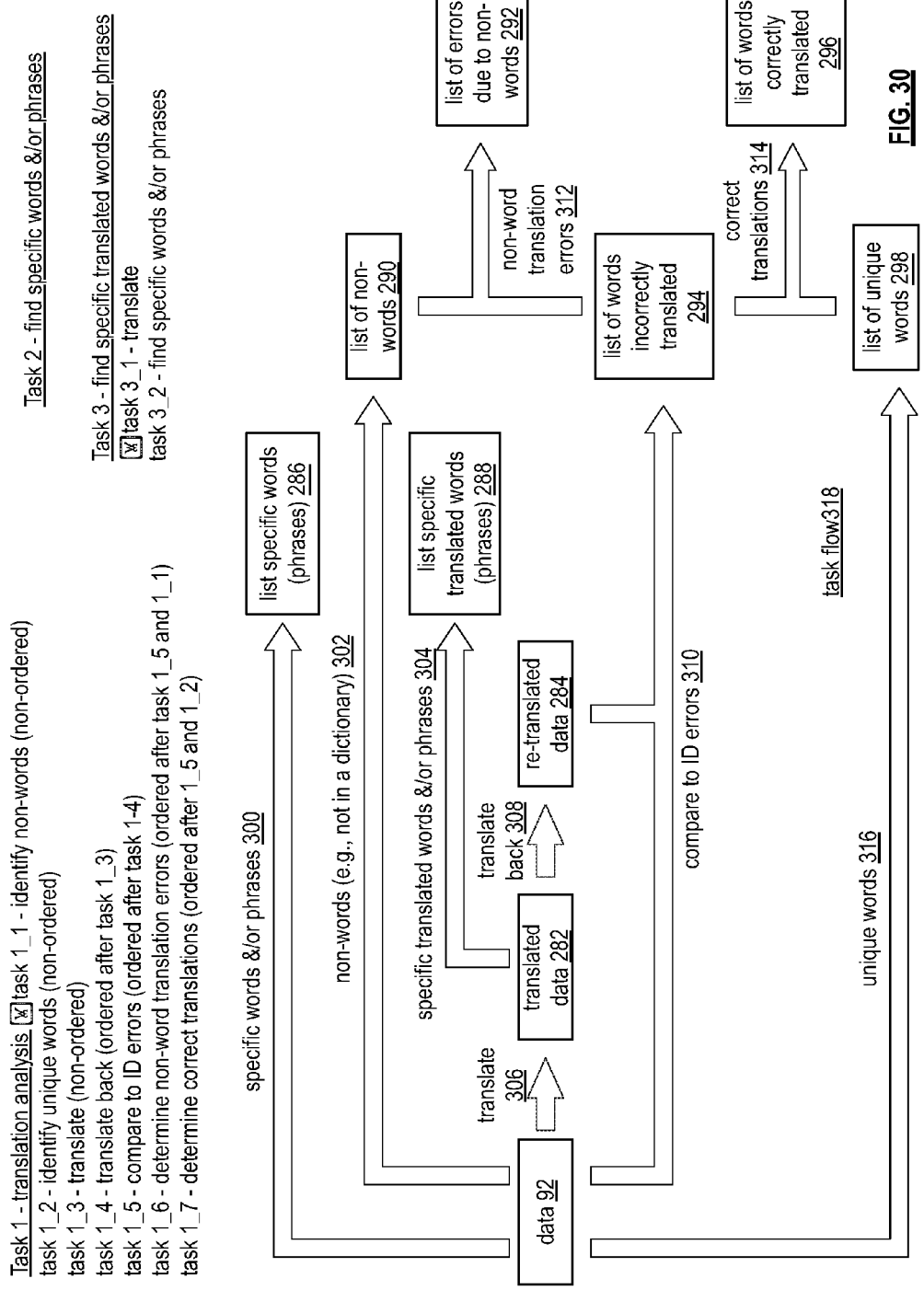
FIG. 30 is a diagram of a specific example of the distributed computing system performing tasks on stored data in accordance with the present invention.

FIG. 30 is a diagram of a specific example of a distributed computing system performing tasks on stored data as a task flow 318. In this example, selected data 92 is data 2 and selected tasks are tasks 1, 2, and 3. Task 1 corresponds to analyzing translation of data from one language to another (e.g., human language or computer language); task 2 corresponds to finding specific words and/or phrases in the data; and task 3 corresponds to finding specific translated words and/or phrases in translated data.

In this example, task 1 includes 7 sub-tasks: task 1_1—identify non-words (non-ordered); task 1_2—identify unique words (non-ordered); task 1_3—translate (non-ordered); task 1_4—translate back (ordered after task 1_3); task 1_5—compare to ID errors (ordered after task 1-4); task 1_6—determine non-word translation errors (ordered after task 1_5 and 1_1); and task 1_7—determine correct translations (ordered after 1_5 and 1_2). The sub-task further indicates whether they are an ordered task (i.e., are dependent on the outcome of another task) or non-order (i.e., are independent of the outcome of another task). Task 2 does not include sub-tasks and task 3 includes two sub-tasks: task 3_1 translate; and task 3_2 find specific word or phrase in translated data.

In general, the three tasks collectively are selected to analyze data for translation accuracies, translation errors, translation anomalies, occurrence of specific words or phrases in the data, and occurrence of specific words or phrases on the translated data. Graphically, the data 92 is translated 306 into translated data 282; is analyzed for specific words and/or phrases 300 to produce a list of specific words and/or phrases 286; is analyzed for non-words 302 (e.g., not in a reference dictionary) to produce a list of non-words 290; and is analyzed for unique words 316 included in the data 92 (i.e., how many different words are included in the data) to produce a list of unique words 298. Each of these tasks is independent of each other and can therefore be processed in parallel if desired.

The translated data 282 is analyzed (e.g., sub-task 3_2) for specific translated words and/or phrases 304 to produce a list of specific translated words and/or phrases 288. The translated data 282 is translated back 308 (e.g., sub-task 1_4) into the language of the original data to produce re-translated data 284. These two tasks are dependent on the translate task (e.g., task 1_3) and thus must be ordered after the translation task, which may be in a pipelined ordering or a serial ordering. The re-translated data 284 is then compared 310 with the original data 92 to find words and/or phrases that did not translate (one way and/or the other) properly to produce a list of incorrectly translated words 294. As such, the comparing task (e.g., sub-task 1_5) 310 is ordered after the translation 306 and re-translation tasks 308 (e.g., sub-tasks 1_3 and 1_4).

The list of words incorrectly translated 294 is compared 312 to the list of non-words 290 to identify words that were not properly translated because the words are non-words to produce a list of errors due to non-words 292. In addition, the list of words incorrectly translated 294 is compared 314 to the list of unique words 298 to identify unique words that were properly translated to produce a list of correctly translated words 296. The comparison may also identify unique words that were not properly translated to produce a list of unique words that were not properly translated. Note that each list of words (e.g., specific words and/or phrases, non-words, unique words, translated words and/or phrases, etc.,) may include the word and/or phrase, how many times it is used, where in the data it is used, and/or any other information requested regarding a word and/or phrase.

Figure 31:
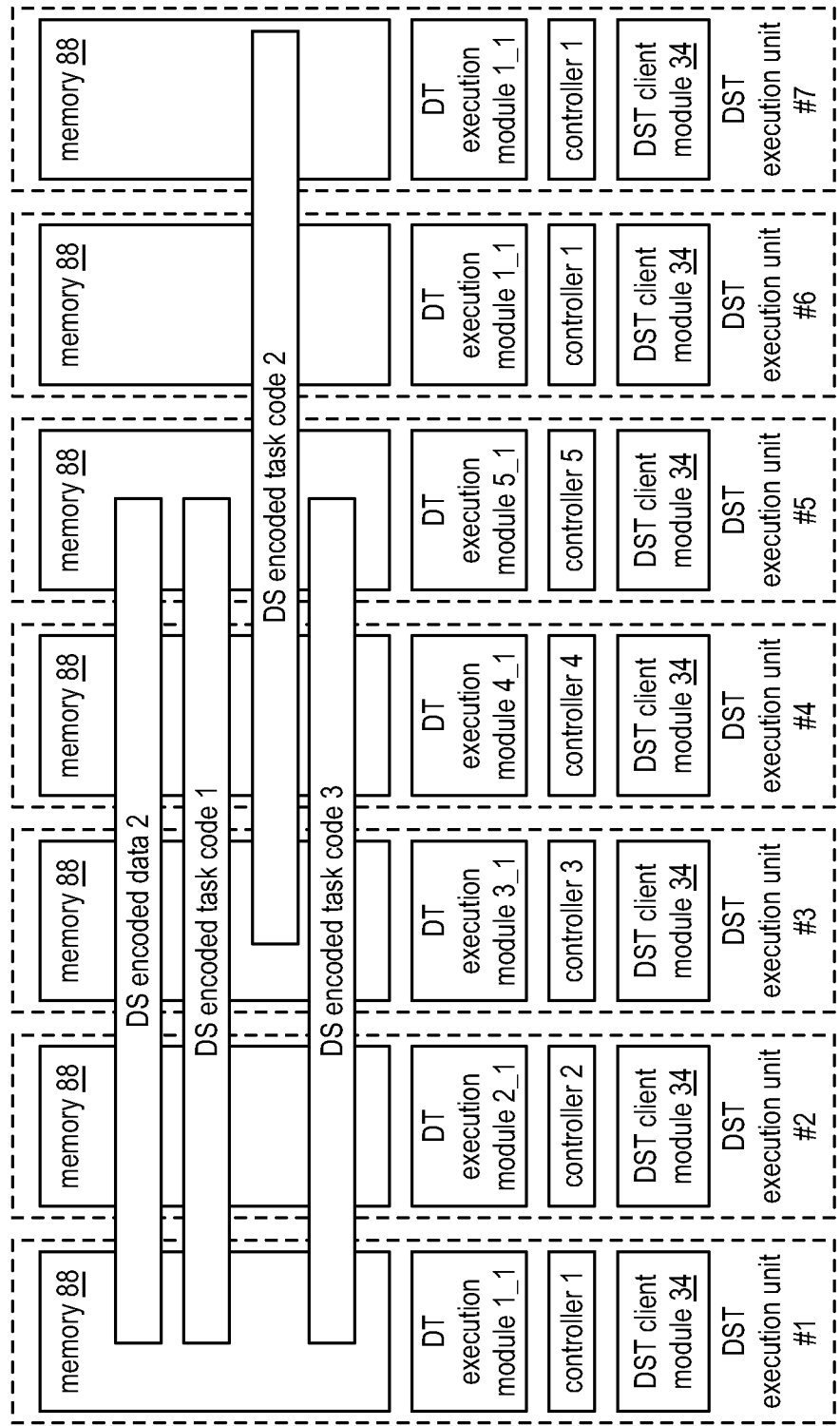
FIG. 31 is a schematic block diagram of an example of a distributed storage and task processing network (DSTN) module storing data and task codes for the example of FIG. 30 in accordance with the present invention.

FIG. 31 is a schematic block diagram of an example of a distributed storage and task processing network (DSTN) module storing data and task codes for the example of FIG. 30. As shown, DS encoded data 2 is stored as encoded data slices across the memory (e.g., stored in memories 88) of DST execution units 1-5; the DS encoded task code 1 (of task 1) and DS encoded task 3 are stored as encoded task slices across the memory of DST execution units 1-5; and DS encoded task code 2 (of task 2) is stored as encoded task slices across the memory of DST execution units 3-7. As indicated in the data storage information table and the task storage information table of FIG. 29, the respective data/task has DS parameters of 3/5 for their decode threshold/pillar width; hence spanning the memory of five DST execution units.

FIG. 32 is a diagram of an example of distributed storage and task (DST) allocation information 242 for the example of FIG. 30. The DST allocation information 242 includes data partitioning information 320, task execution information 322, and intermediate result information 324. The data partitioning information 320 includes the data identifier (ID), the number of partitions to split the data into, address information for each data partition, and whether the DS encoded data has to be transformed from pillar grouping to slice grouping. The task execution information 322 includes tabular information having a task identification field 326, a task ordering field 328, a data partition field ID 330, and a set of DT execution modules 332 to use for the distributed task processing per data partition. The intermediate result information 324 includes tabular information having a name ID field 334, an ID of the DST execution unit assigned to process the corresponding intermediate result 336, a scratch pad storage field 338, and an intermediate result storage field 340.

Continuing with the example of FIG. 30, where tasks 1-3 are to be distributedly performed on data 2, the data partitioning information includes the ID of data 2. In addition, the task distribution module determines whether the DS encoded data 2 is in the proper format for distributed computing (e.g., was stored as slice groupings). If not, the task distribution module indicates that the DS encoded data 2 format needs to be changed from the pillar grouping format to the slice grouping format, which will be done by the DSTN module. In addition, the task distribution module determines the number of partitions to divide the data into (e.g., 2_1 through 2_z) and addressing information for each partition.

The task distribution module generates an entry in the task execution information section for each sub-task to be performed. For example, task 1_1 (e.g., identify non-words on the data) has no task ordering (i.e., is independent of the results of other sub-tasks), is to be performed on data partitions 2_1 through 2_z by DT execution modules 1_1, 2_1, 3_1, 4_1, and 5_1. For instance, DT execution modules 1_1, 2_1, 3_1, 4_1, and 5_1 search for non-words in data partitions 2_1 through 2_z to produce task 1_1 intermediate results (R1-1, which is a list of non-words). Task 1_2 (e.g., identify unique words) has similar task execution information as task 1_1 to produce task 1_2 intermediate results (R1-2, which is the list of unique words).

Task 1_3 (e.g., translate) includes task execution information as being non-ordered (i.e., is independent), having DT execution modules 1_1, 2_1, 3_1, 4_1, and 5_1 translate data partitions 2_1 through 2_4 and having DT execution modules 1_2, 2_2, 3_2, 4_2, and 5_2 translate data partitions 2_5 through 2_z to produce task 1_3 intermediate results (R1-3, which is the translated data). In this example, the data partitions are grouped, where different sets of DT execution modules perform a distributed sub-task (or task) on each data partition group, which allows for further parallel processing.

Task 1_4 (e.g., translate back) is ordered after task 1_3 and is to be executed on task 1_3's intermediate result (e.g., R1-3_1) (e.g., the translated data). DT execution modules 1_1, 2_1, 3_1, 4_1, and 5_1 are allocated to translate back task 1_3 intermediate result partitions R1-3_1 through R1-3_4 and DT execution modules 1_2, 2_2, 6_1, 7_1, and 7_2 are allocated to translate back task 1_3 intermediate result partitions R1-3_5 through R1-3_z to produce task 1-4 intermediate results (R1-4, which is the translated back data).

Task 1_5 (e.g., compare data and translated data to identify translation errors) is ordered after task 1_4 and is to be executed on task 1_4's intermediate results (R4-1) and on the data. DT execution modules 1_1, 2_1, 3_1, 4_1, and 5_1 are allocated to compare the data partitions (2_1 through 2_z) with partitions of task 1-4 intermediate results partitions R1-4_1 through R1-4_z to produce task 1_5 intermediate results (R1-5, which is the list words translated incorrectly).

Task 1_6 (e.g., determine non-word translation errors) is ordered after tasks 1_1 and 1_5 and is to be executed on tasks 1_1's and 1_5's intermediate results (R1-1 and R1-5). DT execution modules 1_1, 2_1, 3_1, 4_1, and 5_1 are allocated to compare the partitions of task 1_1 intermediate results (R1-1_1 through R1-1_z) with partitions of task 1-5 intermediate results partitions (R1-5_1 through R1-5_z) to produce task 1_6 intermediate results (R1-6, which is the list translation errors due to non-words).

Task 1_7 (e.g., determine words correctly translated) is ordered after tasks 1_2 and 1_5 and is to be executed on tasks 1_2's and 1_5's intermediate results (R1-1 and R1-5). DT execution modules 1_2, 2_2, 3_2, 4_2, and 5_2 are allocated to compare the partitions of task 1_2 intermediate results (R1-2_1 through R1-2_z) with partitions of task 1-5 intermediate results partitions (R1-5_1 through R1-5_z) to produce task 1_7 intermediate results (R1-7, which is the list of correctly translated words).

Task 2 (e.g., find specific words and/or phrases) has no task ordering (i.e., is independent of the results of other sub-tasks), is to be performed on data partitions 2_1 through 2_z by DT execution modules 3_1, 4_1, 5_1, 6_1, and 7_1. For instance, DT execution modules 3_1, 4_1, 5_1, 6_1, and 7_1 search for specific words and/or phrases in data partitions 2_1 through 2_z to produce task 2 intermediate results (R2, which is a list of specific words and/or phrases).

Task 3_2 (e.g., find specific translated words and/or phrases) is ordered after task 1_3 (e.g., translate) is to be performed on partitions R1-3_1 through R1-3_z by DT execution modules 1_2, 2_2, 3_2, 4_2, and 5_2. For instance, DT execution modules 1_2, 2_2, 3_2, 4_2, and 5_2 search for specific translated words and/or phrases in the partitions of the translated data (R1-3_1 through R1-3_z) to produce task 3_2 intermediate results (R3-2, which is a list of specific translated words and/or phrases).

For each task, the intermediate result information indicates which DST unit is responsible for overseeing execution of the task and, if needed, processing the partial results generated by the set of allocated DT execution units. In addition, the intermediate result information indicates a scratch pad memory for the task and where the corresponding intermediate results are to be stored. For example, for intermediate result R1-1 (the intermediate result of task 1_1), DST unit 1 is responsible for overseeing execution of the task 1_1 and coordinates storage of the intermediate result as encoded intermediate result slices stored in memory of DST execution units 1-5. In general, the scratch pad is for storing non-DS encoded intermediate results and the intermediate result storage is for storing DS encoded intermediate results.

FIGS. 33-38 are schematic block diagrams of the distributed storage and task network (DSTN) module performing the example of FIG. 30. In FIG. 33, the DSTN module accesses the data 92 and partitions it into a plurality of partitions 1-z in accordance with distributed storage and task network (DST) allocation information. For each data partition, the DSTN identifies a set of its DT (distributed task) execution modules 90 to perform the task (e.g., identify non-words (i.e., not in a reference dictionary) within the data partition) in accordance with the DST allocation information. From data partition to data partition, the set of DT execution modules 90 may be the same, different, or a combination thereof (e.g., some data partitions use the same set while other data partitions use different sets).

For the first data partition, the first set of DT execution modules (e.g., 1_1, 2_1, 3_1, 4_1, and 5_1 per the DST allocation information of FIG. 32) executes task 1_1 to produce a first partial result 102 of non-words found in the first data partition. The second set of DT execution modules (e.g., 1_1, 2_1, 3_1, 4_1, and 5_1 per the DST allocation information of FIG. 32) executes task 1_1 to produce a second partial result 102 of non-words found in the second data partition. The sets of DT execution modules (as per the DST allocation information) perform task 1_1 on the data partitions until the "z" set of DT execution modules performs task 1_1 on the "zth" data partition to produce a "zth" partial result 102 of non-words found in the "zth" data partition.

As indicated in the DST allocation information of FIG. 32, DST execution unit 1 is assigned to process the first through "zth" partial results to produce the first intermediate result (R1-1), which is a list of non-words found in the data. For instance, each set of DT execution modules 90 stores its respective partial result in the scratchpad memory of DST execution unit 1 (which is identified in the DST allocation or may be determined by DST execution unit 1). A processing module of DST execution 1 is engaged to aggregate the first through "zth" partial results to produce the first intermediate result (e.g., R1_1). The processing module stores the first intermediate result as non-DS error encoded data in the scratchpad memory or in another section of memory of DST execution unit 1.

DST execution unit 1 engages its DST client module to slice grouping based DS error encode the first intermediate result (e.g., the list of non-words). To begin the encoding, the DST client module determines whether the list of non-words is of a sufficient size to partition (e.g., greater than a Terra-Byte). If yes, it partitions the first intermediate result (R1-1) into a plurality of partitions (e.g., R1-1_1 through R1-1_m). If the first intermediate result is not of sufficient size to partition, it is not partitioned.

For each partition of the first intermediate result, or for the first intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5).

In FIG. 34, the DSTN module is performing task 1_2 (e.g., find unique words) on the data 92. To begin, the DSTN module accesses the data 92 and partitions it into a plurality of partitions 1-z in accordance with the DST allocation information or it may use the data partitions of task 1_1 if the partitioning is the same. For each data partition, the DSTN identifies a set of its DT execution modules to perform task 1_2 in accordance with the DST allocation information. From data partition to data partition, the set of DT execution modules may be the same, different, or a combination thereof. For the data partitions, the allocated set of DT execution modules executes task 1_2 to produce a partial results (e.g., 1$^{st}$ through "zth") of unique words found in the data partitions.

As indicated in the DST allocation information of FIG. 32, DST execution unit 1 is assigned to process the first through "zth" partial results 102 of task 1_2 to produce the second intermediate result (R1-2), which is a list of unique words found in the data 92. The processing module of DST execution 1 is engaged to aggregate the first through "zth" partial results of unique words to produce the second intermediate result. The processing module stores the second intermediate result as non-DS error encoded data in the scratchpad memory or in another section of memory of DST execution unit 1.

DST execution unit 1 engages its DST client module to slice grouping based DS error encode the second intermediate result (e.g., the list of non-words). To begin the encoding, the DST client module determines whether the list of unique words is of a sufficient size to partition (e.g., greater than a Terra-Byte). If yes, it partitions the second intermediate result (R1-2) into a plurality of partitions (e.g., R1-2_1 through R1-2_m). If the second intermediate result is not of sufficient size to partition, it is not partitioned.

For each partition of the second intermediate result, or for the second intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5).

In FIG. 35, the DSTN module is performing task 1_3 (e.g., translate) on the data 92. To begin, the DSTN module accesses the data 92 and partitions it into a plurality of partitions 1-z in accordance with the DST allocation information or it may use the data partitions of task 1_1 if the partitioning is the same. For each data partition, the DSTN identifies a set of its DT execution modules to perform task 1_3 in accordance with the DST allocation information (e.g., DT execution modules 1_1, 2_1, 3_1, 4_1, and 5_1 translate data partitions 2_1 through 2_4 and DT execution modules 1_2, 2_2, 3_2, 4_2, and 5_2 translate data partitions 2_5 through 2_z). For the data partitions, the allocated set of DT execution modules 90 executes task 1_3 to produce partial results 102 (e.g., $1^{st}$ through "zth") of translated data.

As indicated in the DST allocation information of FIG. 32, DST execution unit 2 is assigned to process the first through "zth" partial results of task 1_3 to produce the third intermediate result (R1-3), which is translated data. The processing module of DST execution 2 is engaged to aggregate the first through "zth" partial results of translated data to produce the third intermediate result. The processing module stores the third intermediate result as non-DS error encoded data in the scratchpad memory or in another section of memory of DST execution unit 2.

DST execution unit 2 engages its DST client module to slice grouping based DS error encode the third intermediate result (e.g., translated data). To begin the encoding, the DST client module partitions the third intermediate result (R1-3) into a plurality of partitions (e.g., R1-3_1 through R1-3_y). For each partition of the third intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 2-6 per the DST allocation information).

As is further shown in FIG. 35, the DSTN module is performing task 1_4 (e.g., retranslate) on the translated data of the third intermediate result. To begin, the DSTN module accesses the translated data (from the scratchpad memory or from the intermediate result memory and decodes it) and partitions it into a plurality of partitions in accordance with the DST allocation information. For each partition of the third intermediate result, the DSTN identifies a set of its DT execution modules 90 to perform task 1_4 in accordance with the DST allocation information (e.g., DT execution modules 1_1, 2_1, 3_1, 4_1, and 5_1 are allocated to translate back partitions R1-3_1 through R1-3_4 and DT execution modules 1_2, 2_2, 6_1, 7_1, and 7_2 are allocated to translate back partitions R1-3_5 through R1-3_z). For the partitions, the allocated set of DT execution modules executes task 1_4 to produce partial results 102 (e.g., 1' through "zth") of re-translated data.

As indicated in the DST allocation information of FIG. 32, DST execution unit 3 is assigned to process the first through "zth" partial results of task 1_4 to produce the fourth intermediate result (R1-4), which is retranslated data. The processing module of DST execution 3 is engaged to aggregate the first through "zth" partial results of retranslated data to produce the fourth intermediate result. The processing module stores the fourth intermediate result as non-DS error encoded data in the scratchpad memory or in another section of memory of DST execution unit 3.

DST execution unit 3 engages its DST client module to slice grouping based DS error encode the fourth intermediate result (e.g., retranslated data). To begin the encoding, the DST client module partitions the fourth intermediate result (R1-4) into a plurality of partitions (e.g., R1-4_1 through R1-4_z). For each partition of the fourth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 3-7 per the DST allocation information).

Figure 36:
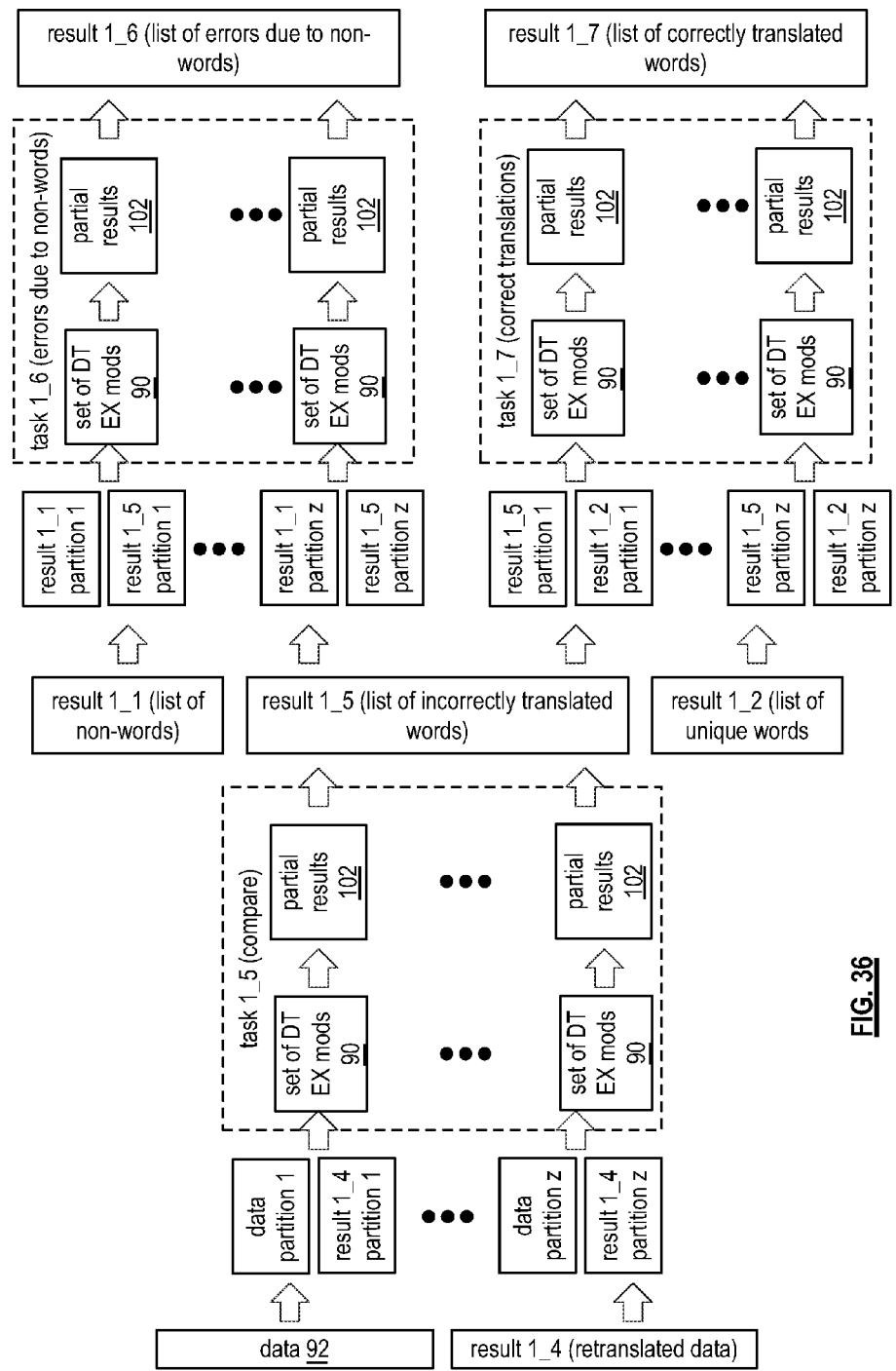

In FIG. 36, a distributed storage and task network (DSTN) module is performing task 1_5 (e.g., compare) on data 92 and retranslated data of FIG. 35. To begin, the DSTN module accesses the data 92 and partitions it into a plurality of partitions in accordance with the DST allocation information or it may use the data partitions of task 1_1 if the partitioning is the same. The DSTN module also accesses the retranslated data from the scratchpad memory, or from the intermediate result memory and decodes it, and partitions it into a plurality of partitions in accordance with the DST allocation information. The number of partitions of the retranslated data corresponds to the number of partitions of the data.

For each pair of partitions (e.g., data partition 1 and retranslated data partition 1), the DSTN identifies a set of its DT execution modules 90 to perform task 1_5 in accordance with the DST allocation information (e.g., DT execution modules 1_1, 2_1, 3_1, 4_1, and 5_1). For each pair of partitions, the allocated set of DT execution modules executes task 1_5 to produce partial results 102 (e.g., $1^{st}$ through "zth") of a list of incorrectly translated words and/or phrases.

As indicated in the DST allocation information of FIG. 32, DST execution unit 1 is assigned to process the first through "zth" partial results of task 1_5 to produce the fifth intermediate result (R1-5), which is the list of incorrectly translated words and/or phrases. In particular, the processing module of DST execution 1 is engaged to aggregate the first through "zth" partial results of the list of incorrectly translated words and/or phrases to produce the fifth intermediate result. The processing module stores the fifth intermediate result as non-DS error encoded data in the scratchpad memory or in another section of memory of DST execution unit 1.

DST execution unit 1 engages its DST client module to slice grouping based DS error encode the fifth intermediate result. To begin the encoding, the DST client module partitions the fifth intermediate result (R1-5) into a plurality of partitions (e.g., R1-5_1 through R1-5_z). For each partition of the fifth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5 per the DST allocation information).

As is further shown in FIG. 36, the DSTN module is performing task 1_6 (e.g., translation errors due to non-words) on the list of incorrectly translated words and/or phrases (e.g., the fifth intermediate result R1-5) and the list of non-words (e.g., the first intermediate result R1-1). To begin, the DSTN module accesses the lists and partitions them into a corresponding number of partitions.

For each pair of partitions (e.g., partition R1-1_1 and partition R1-5_1), the DSTN identifies a set of its DT execution modules 90 to perform task 1_6 in accordance with the DST allocation information (e.g., DT execution modules 1_1, 2_1, 3_1, 4_1, and 5_1). For each pair of partitions, the allocated set of DT execution modules executes task 1_6 to produce partial results 102 (e.g., $1^{st}$ through "zth") of a list of incorrectly translated words and/or phrases due to non-words.

As indicated in the DST allocation information of FIG. 32, DST execution unit 2 is assigned to process the first through "zth" partial results of task 1_6 to produce the sixth intermediate result (R1-6), which is the list of incorrectly translated words and/or phrases due to non-words. In particular, the processing module of DST execution 2 is engaged to aggregate the first through "zth" partial results of the list of incorrectly translated words and/or phrases due to non-words to produce the sixth intermediate result. The processing module stores the sixth intermediate result as non-DS error encoded data in the scratchpad memory or in another section of memory of DST execution unit 2.

DST execution unit 2 engages its DST client module to slice grouping based DS error encode the sixth intermediate result. To begin the encoding, the DST client module partitions the sixth intermediate result (R1-6) into a plurality of partitions (e.g., R1-6_1 through R1-6_z). For each partition of the sixth intermediate result, the DST client module uses the DS error encoding parameters of the data (e.g., DS parameters of data 2, which includes 3/5 decode threshold/ pillar width ratio) to produce slice groupings. The slice groupings are stored in the intermediate result memory (e.g., allocated memory in the memories of DST execution units 2-6 per the DST allocation information).

As is still further shown in FIG. 36, the DSTN module is performing task 1_7 (e.g., correctly translated words and/or phrases) on the list of incorrectly translated words and/or phrases (e.g., the fifth intermediate result R1-5) and the list of unique words (e.g., the second intermediate result R1-2). To begin, the DSTN module accesses the lists and partitions them into a corresponding number of partitions.

For each pair of partitions (e.g., partition R1-2_1 and partition R1-5_1), the DSTN identifies a set of its DT execution modules 90 to perform task 1_7 in accordance with the DST allocation information (e.g., DT execution modules 1_2, 2_2, 3_2, 4_2, and 5_2). For each pair of partitions, the allocated set of DT execution modules executes task 1_7 to produce partial results 102 (e.g., $1^{st}$ through "zth") of a list of correctly translated words and/or phrases.

As indicated in the DST allocation information of FIG. 32, DST execution unit 3 is assigned to process the first through "zth" partial results of task 1_7 to produce the seventh intermediate result (R1-7), which is the list of correctly translated words and/or phrases. In particular, the processing module of DST execution 3 is engaged to aggregate the first through "zth" partial results of the list of correctly translated words and/or phrases to produce the seventh intermediate result. The processing module stores the seventh intermediate result as non-DS error encoded data in the scratchpad memory or in another section of memory of DST execution unit 3.

DST execution unit 3 engages its DST client module to slice grouping based DS error encode the seventh intermediate result. To begin the encoding, the DST client module partitions the seventh intermediate result (R1-7) into a plurality of partitions (e.g., R1-7_1 through R1-7_z). For each partition of the seventh intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 3-7 per the DST allocation information).

In FIG. 37, the distributed storage and task network (DSTN) module is performing task 2 (e.g., find specific words and/or phrases) on the data 92. To begin, the DSTN module accesses the data and partitions it into a plurality of partitions 1-z in accordance with the DST allocation information or it may use the data partitions of task 1_1 if the partitioning is the same. For each data partition, the DSTN identifies a set of its DT execution modules 90 to perform task 2 in accordance with the DST allocation information. From data partition to data partition, the set of DT execution modules may be the same, different, or a combination thereof. For the data partitions, the allocated set of DT execution modules executes task 2 to produce partial results 102 (e.g., $1^{st}$ through "zth") of specific words and/or phrases found in the data partitions.

As indicated in the DST allocation information of FIG. 32, DST execution unit 7 is assigned to process the first through "zth" partial results of task 2 to produce task 2 intermediate result (R2), which is a list of specific words and/or phrases found in the data. The processing module of DST execution 7 is engaged to aggregate the first through "zth" partial results of specific words and/or phrases to produce the task 2 intermediate result. The processing module stores the task 2 intermediate result as non-DS error encoded data in the scratchpad memory or in another section of memory of DST execution unit 7.

DST execution unit 7 engages its DST client module to slice grouping based DS error encode the task 2 intermediate result. To begin the encoding, the DST client module determines whether the list of specific words and/or phrases is of a sufficient size to partition (e.g., greater than a Terra-Byte). If yes, it partitions the task 2 intermediate result (R2) into a plurality of partitions (e.g., R2_1 through R2_m). If the task 2 intermediate result is not of sufficient size to partition, it is not partitioned.

For each partition of the task 2 intermediate result, or for the task 2 intermediate results, the DST client module uses the DS error encoding parameters of the data (e.g., DS parameters of data 2, which includes 3/5 decode threshold/ pillar width ratio) to produce slice groupings. The slice groupings are stored in the intermediate result memory (e.g., allocated memory in the memories of DST execution units 1-4, and 7).

In FIG. 38, the distributed storage and task network (DSTN) module is performing task 3 (e.g., find specific translated words and/or phrases) on the translated data (R1-3). To begin, the DSTN module accesses the translated data (from the scratchpad memory or from the intermediate result memory and decodes it) and partitions it into a plurality of partitions in accordance with the DST allocation information. For each partition, the DSTN identifies a set of its DT execution modules to perform task 3 in accordance with the DST allocation information. From partition to partition, the set of DT execution modules may be the same, different, or a combination thereof. For the partitions, the allocated set of DT execution modules 90 executes task 3 to produce partial results 102 (e.g., 1$^{st}$ through "zth") of specific translated words and/or phrases found in the data partitions.

As indicated in the DST allocation information of FIG. 32, DST execution unit 5 is assigned to process the first through "zth" partial results of task 3 to produce task 3 intermediate result (R3), which is a list of specific translated words and/or phrases found in the translated data. In particular, the processing module of DST execution 5 is engaged to aggregate the first through "zth" partial results of specific translated words and/or phrases to produce the task 3 intermediate result. The processing module stores the task 3 intermediate result as non-DS error encoded data in the scratchpad memory or in another section of memory of DST execution unit 7.

DST execution unit 5 engages its DST client module to slice grouping based DS error encode the task 3 intermediate result. To begin the encoding, the DST client module determines whether the list of specific translated words and/or phrases is of a sufficient size to partition (e.g., greater than a Terra-Byte). If yes, it partitions the task 3 intermediate result (R3) into a plurality of partitions (e.g., R3_1 through R3_m). If the task 3 intermediate result is not of sufficient size to partition, it is not partitioned.

For each partition of the task 3 intermediate result, or for the task 3 intermediate results, the DST client module uses the DS error encoding parameters of the data (e.g., DS parameters of data 2, which includes 3/5 decode threshold/ pillar width ratio) to produce slice groupings. The slice groupings are stored in the intermediate result memory (e.g., allocated memory in the memories of DST execution units 1-4, 5, and 7).

FIG. 39 is a diagram of an example of combining result information into final results 104 for the example of FIG. 30. In this example, the result information includes the list of specific words and/or phrases found in the data (task 2 intermediate result), the list of specific translated words and/or phrases found in the data (task 3 intermediate result), the list of non-words found in the data (task 1 first intermediate result R1-1), the list of unique words found in the data (task 1 second intermediate result R1-2), the list of translation errors due to non-words (task 1 sixth intermediate result R1-6), and the list of correctly translated words and/or phrases (task 1 seventh intermediate result R1-7). The task distribution module provides the result information to the requesting DST client module as the results 104.

Figure 40A:
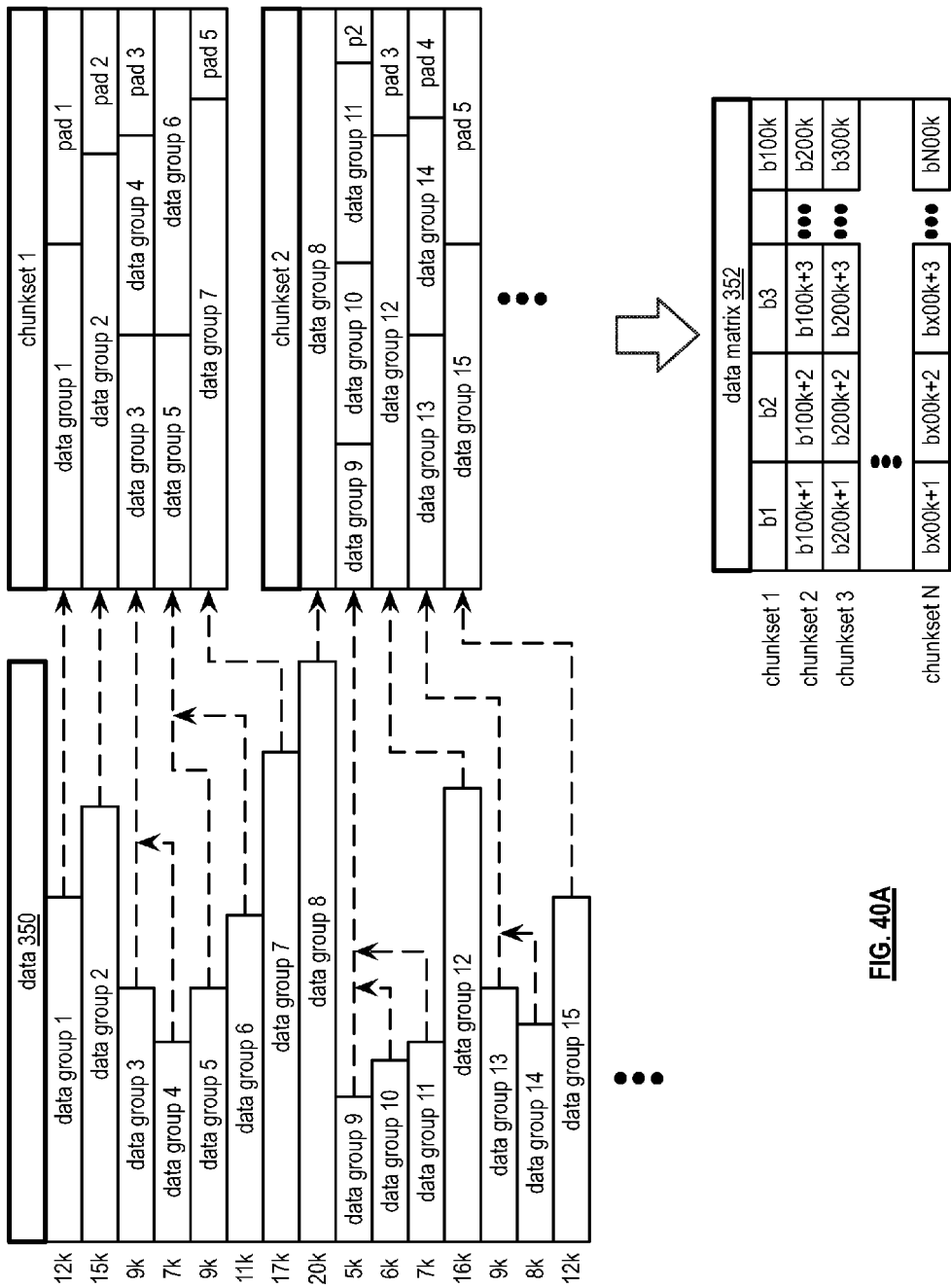
FIG. 40A is a diagram illustrating manipulation of data in accordance with the present invention.

FIG. 40A is a diagram illustrating manipulation of data 350. The manipulation includes manipulating data 350 into one or more chunksets 1-N that form a data matrix 352. The data 350 includes a plurality of data groups 1-15. Each data group of the plurality of data groups includes one or more associated bytes sharing a commonality, wherein the commonality includes at least one of a text line, a text page, a text document, a video clip, a video file, an audio segment, an audio file, context, a data type, a time relationship, and a spatial relationship. For example, a data group 1 includes 12,000 bytes of a video clip. As another example, a data group 2 includes 15,000 bytes of a text document.

Each chunkset of the one or more chunksets 1-N includes a decode threshold number of chunks such that each chunk is substantially identical in size. A number of bytes per chunk may be selected in accordance with the chunk size selection scheme. For example, the chunk size is selected to be greater than or equal to a largest data group size such that a largest data group associated with the largest data group size may fit within any chunk when the chunk size selection scheme indicates to fit any data group into any chunk. For instance, the chunk size is selected as 20 kB when a largest data group size (e.g., of data group 8) is 20 kB. The chunk size selection scheme enables subsequent processing of a partial task on any data group by processing the partial task on a corresponding single chunk (e.g., stored in a distributed storage and task (DST) execution unit).

The decode threshold number (e.g., number of chunks per chunkset) may be determined based on at least one of a desired reliability performance level, a predetermination, a pillar width number, the chunk size, a data pattern of the data, aligning similar data types with similar chunk numbers of resulting two or more chunksets resulting from manipulation of the data, and a request. For example, the decode threshold number is determined to be 5 when the pillar width number is 8 in accordance with a desired level of reliability performance. As another example, the decode threshold number is determined to be 5 when the chunk size is 20 kB and a data pattern of the data repeats every 100 kB.

One or more data groups of the plurality of data groups is packed into each chunk such that a size of the one or more data groups is less than or equal to the chunk size. As such, a data group is not split by a boundary between two chunks. Unused capacity within each chunk may be padded with pad bytes, wherein each pad byte includes at least one of a predetermined value, a random value, a value associated with a chunk number, a value associated with a chunkset, a value associated with at least one data group packed into the chunk, and at least one partial task associated with the chunk. For example, a first chunk of a first chunkset is packed with 12 kB of data group 1 and 8 kB of a predetermined pad byte value. As another example, a third chunk of the first chunkset is packed with 9 kB of data group 3, 7 kB of data group 4, and 4 kB of pad bytes that identify chunk 3. As another example, a fourth chunk of the first chunkset is packed with 9 kB of data group 5 and 11 kB of data group 6 to completely fill the 20 kB chunk size.

The data matrix 352 includes the one or more chunksets 1-N, wherein each row of the data matrix includes a chunkset of the one or more chunksets 1-N. For example, a first row of the data matrix includes the first chunkset, wherein the first row is filled with the first chunk followed by the second chunk followed by the third chunk followed by the fourth chunk followed by the fifth chunk. The data matrix 352 may be further processed to form slice groupings as is discussed in greater detail with reference to FIG. 40B.

Figure 40B:
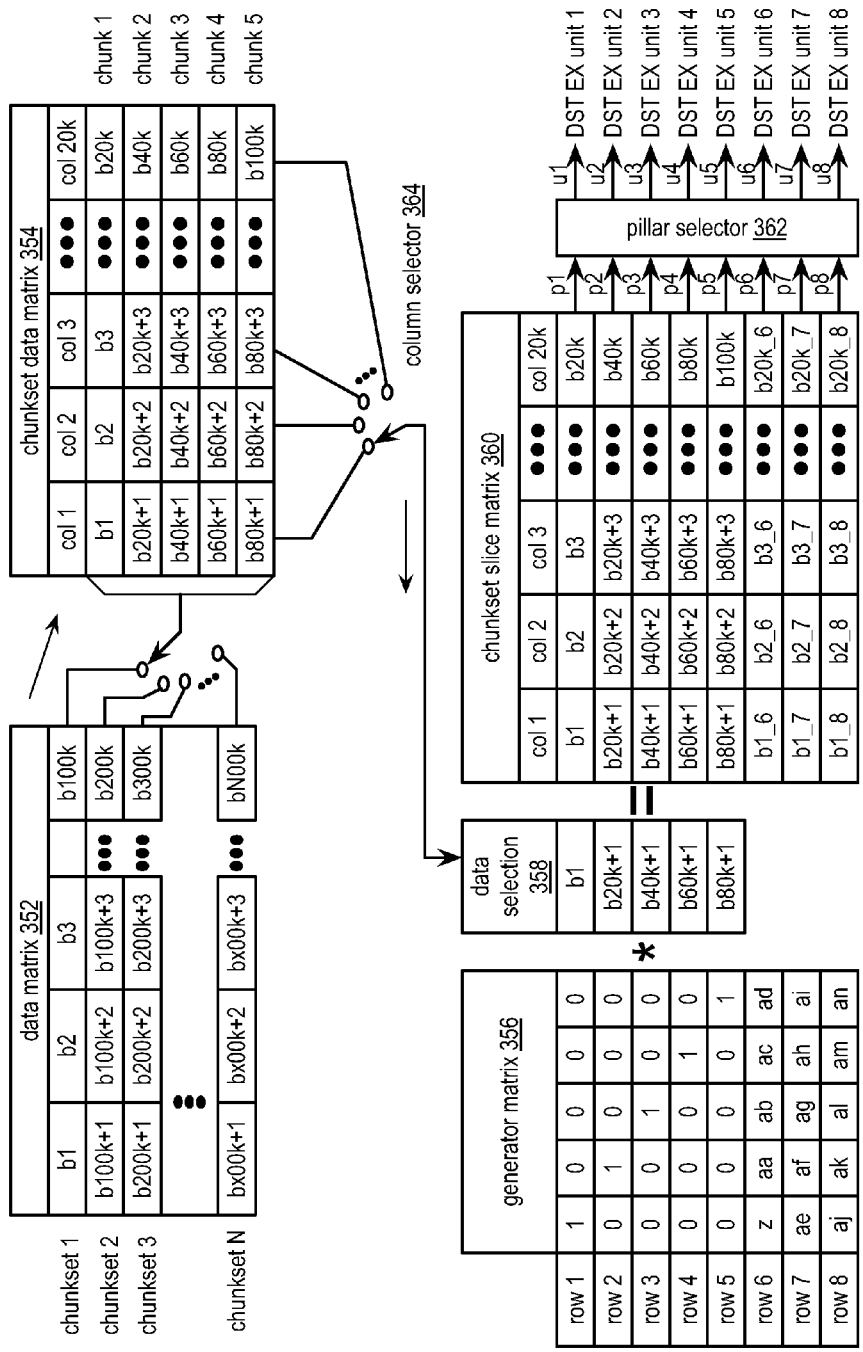
FIG. 40B is a diagram illustrating encoding of data in accordance with the present invention.

FIG. 40B is a diagram illustrating encoding of data that includes manipulated data organized into a data matrix 352 as a plurality of chunksets 1-N, a chunkset data matrix 354 for each of the plurality of chunksets 1-N that includes a row for each chunk, a column selector 364 to select a column of the chunkset data matrix 354, a data selection matrix 358 to hold a column of the chunkset data matrix 354, a generator matrix 356 to encode each data selection of each chunkset to produce a corresponding chunkset slice matrix 360 of slices, and a pillar selector 362 to route slices of each chunkset to a corresponding distributed storage and task execution (DST EX) unit for task processing. A number of chunks per chunkset is obtained from a previous data manipulation process. A decode threshold of an information dispersal algorithm (IDA) is determined as the number of chunks per chunkset. A pillar width number of the IDA is determined based on or more of the previous data manipulation process, the decode threshold, a number of available DST EX units, an availability requirement, and a reliability requirement. For example, the pillar width is set at 8 when the decode threshold is 5 and in accordance with a reliability requirement.

A chunk size of each chunkset is obtained from the previous data manipulation process. A chunkset size is the number of chunks per chunkset multiplied by the chunk size. For example, the chunkset size is 100 k bytes when the chunk size is 20 k bytes and the number of chunks per chunkset is 5. A number of chunksets N is determined as a size of the data divided by the size of the chunkset.

The generator matrix 356 is determined in accordance with the IDA and includes a decode threshold number of columns and a pillar width number of rows. A unity matrix is utilized in a top square matrix to facilitate generation of contiguous slices that match contiguous data of chunks. Other rows of the encoding matrix 356 facilitate generating error coded slices for remaining rows of the chunkset slice matrix 360.

For each chunkset, the generator matrix 356 is matrix multiplied by a column of the corresponding chunkset data matrix 354 (e.g., the data selection 358 as selected by the column selector 364) to generate a column of the chunkset slice matrix 360 for the corresponding chunkset. For example, row 1 of the generator matrix 356 is multiplied by column 1 of the chunkset data matrix 354 to produce a row 1 byte of column 1 of the chunkset slice matrix 360, row 2 of the generator matrix 356 is multiplied by column 1 of the chunkset data matrix 354 to produce a row 2 byte of column 1 of the chunkset slice matrix 360, etc. As another example, row 1 of the generator matrix 356 is multiplied by column 2 of the chunkset data matrix 354 to produce a row 1 byte of column 2 of the chunkset slice matrix 360, row 2 of the generator matrix 356 is multiplied by column 2 of the chunkset data matrix 354 to produce a row 2 byte of column 2 of the chunkset slice matrix 360, etc.

A segment may be considered as one or more columns of the chunkset data matrix 354 and slices that correspond to the segment are the rows of the chunkset slice matrix 360 that correspond to the one or more columns of the chunkset data matrix 354. For example, row 1 columns 1 and 2 of the chunkset slice matrix 360 form slice 1 when columns 1 and 2 of the chunkset data matrix 354 are considered as a corresponding segment. Slices of a common row of the chunkset slice matrix 360 are of a chunk of contiguous data of the data and share a common pillar number and may typically be stored in a common DST EX unit to facilitate a distributed task.

The pillar selector 362 routes slices and error coded slices of each pillar to a DST EX unit in accordance with a pillar selection scheme. For example, two slices of row 1 (e.g., slice comprising bytes from columns 1 through 10$k$ and slice 2 comprising bytes from columns 10$k$+1 through 20$k$) of the chunkset slice matrix 360 are sent to DST EX unit 1 as a contiguous chunk of data that includes 20 k bytes when the pillar selection scheme maps pillars 1-5 (e.g., associated with slices of contiguous data), to DST EX units 1-5 and maps pillars 6-8 (e.g., associated with error coded slices) to DST EX units 6-8 for a first chunkset.

To facilitate load leveling of tasks executed by the DST EX units, the pillar selection scheme may include rotating assignments of pillars to different DST EX units for each chunkset. For example, two slices of row 8 (e.g., slice comprising bytes from columns 1 through 10$k$ and slice 2 comprising bytes from columns 10$k$+1 through 20$k$) of the chunkset slice matrix 360 are sent to DST EX unit 1 as error coded data slices that includes 20 k bytes when the pillar selection scheme maps pillar 8 (e.g., associated with error coded slices), to DST EX units 1 and maps pillars 1 (e.g., associated with slices of contiguous data) to DST EX units 8 for another chunkset.

Figure 40C:
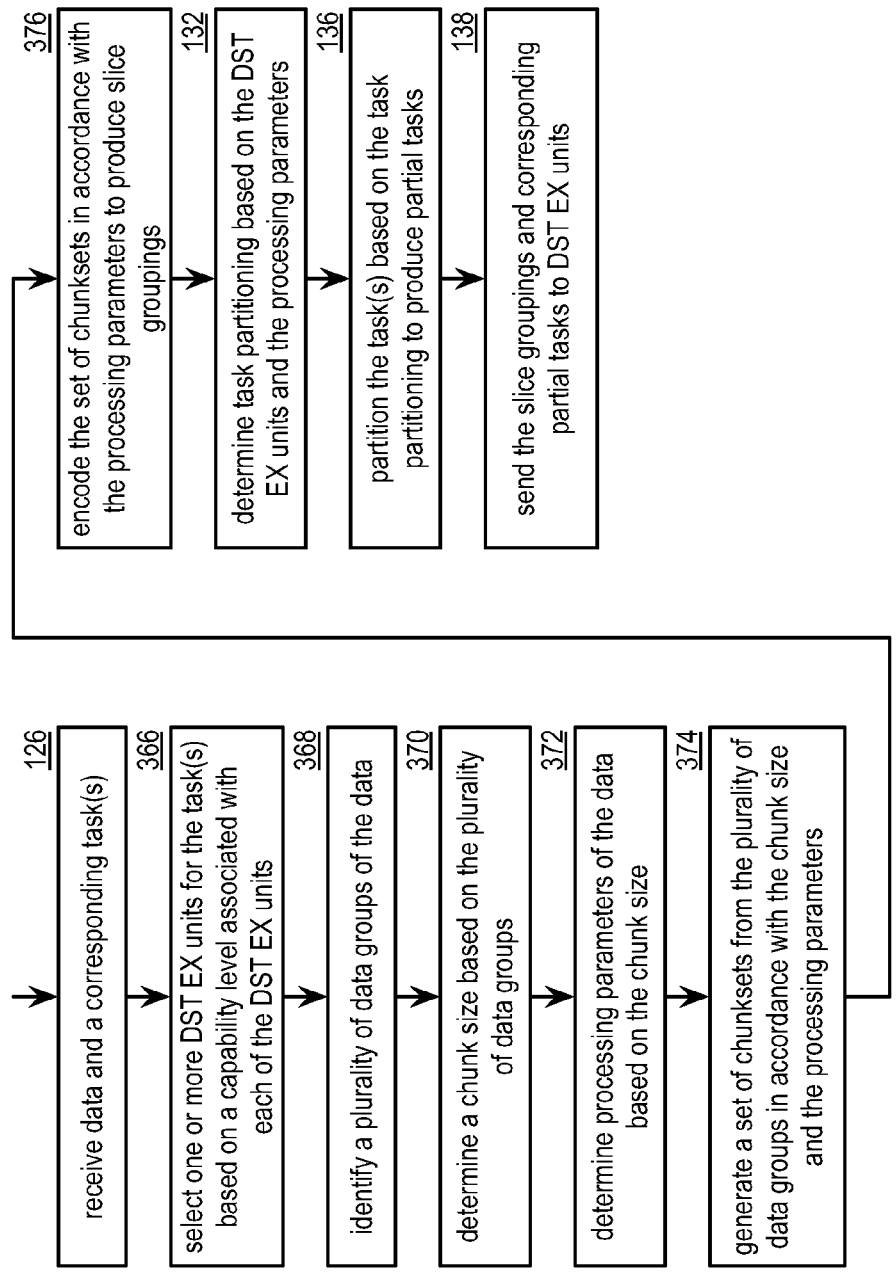
FIG. 40C is a flowchart illustrating an example of manipulating data in accordance with the present invention.

FIG. 40C is a flowchart illustrating an example of manipulating data, which include similar steps to FIG. 5. The method begins with step 126 of FIG. 5 where a processing module (e.g., of a distributed storage and task (DST) client module) receives data and a corresponding task. The method continues at step 366 where the processing module selects one or more DST execution units for the task based on a capability level associated with each of the DST execution units. The selecting includes one or more of determining a number of DST execution units and selecting the number of DST execution units based on one or more of an estimated distributed computing loading level, a DST execution unit capability indicator, a DST execution unit performance indicator, a DST execution unit availability level indicator, a task schedule, and a DST execution unit threshold computing capability indicator. For example, the processing module selects DST execution units 1-8 when DST execution unit availability level indicators for DST execution units 1-8 compares favorably to an estimated distributed computing loading level.

The method continues at step 368 where the processing module identifies a plurality of data groups of the data. The identifying includes at least one of receiving identification information, analyzing the data, and estimating the data groups based on previous data groups. The method continues at step 370 where the processing module determines a chunk size based on the plurality of data groups. The determining may be based on at least one of a chunk size selection scheme, a predetermination, and receiving the chunk size. For example, the processing module determines the chunk size to be greater than or equal to a largest data group size such that a largest data group associated with the largest data group size may fit within any chunk when the chunk size selection scheme indicates to fit any data group into any chunk.

The method continues at step 372 where the processing module determines processing parameters of the data based on the chunk size. The processing parameters includes at least one of a decode threshold number and a pillar width number. The processing module may determine the decode threshold number (e.g., number of chunks per chunkset) based on at least one of a desired reliability performance level, a predetermination, a pillar width number, the chunk size, a data pattern of the data, aligning similar data types with similar chunk numbers of resulting two or more chunksets resulting from manipulation of the data, and a request. For example, the decode threshold number is determined to be 10 when the pillar width number is 16 in accordance with a desired level of reliability performance. As another example, the decode threshold number is determined to be 5 when the chunk size is 20 kB and a data pattern of the data repeats every 100 kB.

The method continues at step 374 where the processing module generates a set of chunksets from the plurality of data groups in accordance with the chunk size and processing parameters. The generation includes packing one or more data groups of the plurality of data groups into each chunk of each chunkset such that a size of the one or more data groups is less than or equal to the chunk size. Unused capacity within each chunk may be padded with pad bytes, wherein each pad byte includes at least one of a predetermined value, a random value, a value associated with a chunk number, a value associated with a chunkset, a value associated with at least one data group packed into the chunk, and at least one partial task associated with the chunk.

The method continues at step 376 where the processing module encodes the set of chunksets in accordance with the processing parameters to produce slice groupings. The encoding includes encoding each chunkset of the set of chunksets with a dispersed storage error coded function to produce a decode threshold number of slices and a pillar width number minus the decode threshold number of error coded slices and forming a pillar width number of slice groupings that includes the slices and the error coded slices. The method continues with steps 132, 136, and 138 of FIG. 5 where the processing module determines task partitioning based on the DST execution units and the processing parameters, partitions the task based on the task partitioning to produce partial tasks, and sends the slice groupings and corresponding partial tasks to the DST execution units.

FIG. 41A is a diagram illustrating an example of mapping slice groupings to a set of distributed storage and task (DST) execution unit memories. The mapping includes a slice to memory mapping for two or more DST execution unit memories. Slices associated with one or more chunksets are distributed to the DST execution unit memories in accordance with a DST execution unit selection scheme. The DST execution unit selection scheme includes at least one of selecting a same DST execution unit for slices associated with a common pillar and a round robin scheme. Slices of a common chunk number (e.g., a common pillar number) are sent to a common DST execution unit when the selection scheme includes selecting the same DST execution unit for slices associated with the common pillar. For example, slice 1,1,1, slice 2,1,1, slice 3,1,1, slice 4,1,1 of chunk 1 of chunkset 1 are selected for sending to DST execution unit 1, wherein slice 1,2,3 is associated with a first slice of a second chunk of a third chunkset. As another example, slice 1,2,3, slice 2,2,3, slice 3,2,3, and slice 4,2,3 are selected for sending to DST execution unit 2.

Each DST execution unit of the associated DST execution unit memories executes a partial task on each slice in accordance with an execution ordering. For example, a first job runs to execute partial tasks on slices of a first chunk and a second job runs to execute partial tasks on slices of a second chunk. As another example, a first job runs on a first slice of each chunk of each chunkset and a second job runs on a second slice of each chunk of each chunkset.

FIG. 41B is a diagram illustrating another example of mapping slice groupings to a set of distributed storage and task (DST) execution unit memories. The mapping includes a slice to memory mapping for two or more DST execution unit memories. Slices associated with one or more chunksets are distributed to the DST execution unit memories in accordance with a DST execution unit selection scheme. The DST execution unit selection scheme includes at least one of selecting a same DST execution unit for slices associated with a common pillar and a round robin scheme. Slices of a rotating chunk numbers (e.g., rotating pillar numbers) are sent to a DST execution unit when the selection scheme includes the round robin scheme. For example, slice 1,1,1, slice 2,1,1, slice 3,1,1, slice 4,1,1 of chunk 1 of chunkset 1 and slice 1,2,2, slice 2,2,2, slice 3,2,2, and slice 4,2,2 are selected for sending to DST execution unit 1. In such an example, DST execution unit 1 receives a first chunk of a first chunkset and a second chunk of a second chunkset in accordance with the round robin scheme.

Each DST execution unit of the associated DST execution unit memories executes a partial task on each slice in accordance with an execution ordering. For example, a first job runs to execute partial tasks on slices of a first chunk and a second job runs to execute partial tasks on slices of a second chunk. As another example, a first job runs on a first slice of each chunk of each chunkset and a second job runs on a second slice of each chunk of each chunkset.

Figure 41C:
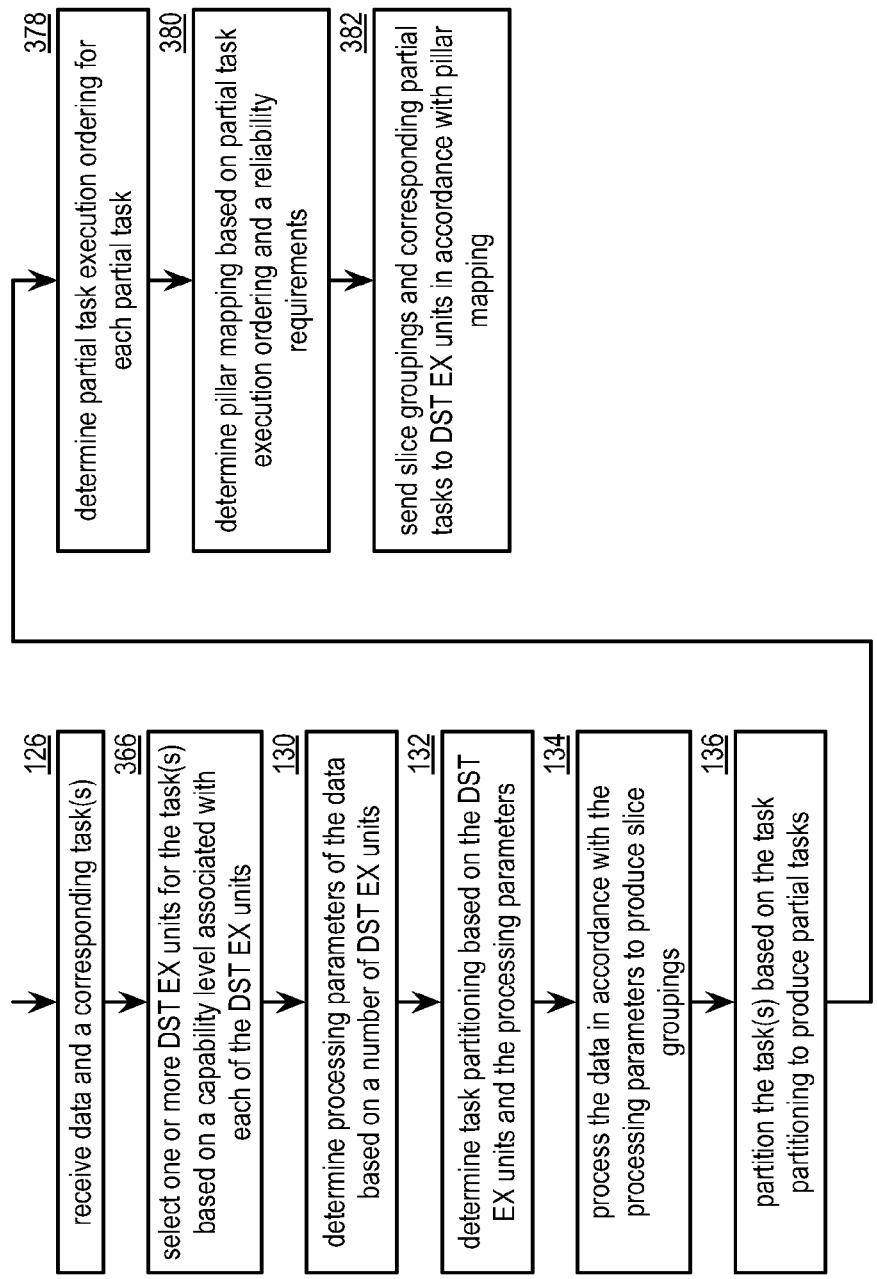
FIG. 41C is a flowchart illustrating an example of assigning slices and partial tasks to distributed storage and task (DST) execution units in accordance with the present invention.

FIG. 41C is a flowchart illustrating an example of assigning slices and partial tasks to distributed storage and task (DST) execution units, which include similar steps to FIGS. 5 and 40C. The method begins with step 126 of FIG. 5 where a processing module (e.g., of a DST client module) receives data and the corresponding task and continues with step 366 of FIG. 40C where the processing module selects one or more DST execution units for the task based on a capability level associated with each of the DST execution units. The method continues with steps 130, 132, 134, and 136 of FIG. 5 where the processing module determines processing parameters of the data based on a number of DST execution units, determines task partitioning based on the DST execution units and the processing parameters, processes the data in accordance with the processing parameters to produce slice groupings, and partitions the task based on the task partitioning to produce partial tasks.

The method continues at step 378 where the processing module determines partial task execution ordering for each partial task. The determining may be based on one or more of a requirement (e.g., task execution latency, task execution capability, storage reliability level), a data type, a DST execution unit capability level, a chunk identifier, a pillar number, and a slice name. The method continues at step 380 where the processing module determines a pillar mapping based on the partial task execution ordering and a reliability requirement. The determining of the pillar mapping produces an indication of which slice grouping is to be sent to which DST execution unit. The determining may be based on one or more of a pillar selection scheme (e.g., common chunk, round robin), a predetermination, a previous determination, a lookup, a query, and receiving the pillar mapping. The method continues at step 382 where the processing module sends the slice groupings and the corresponding partial tasks to the DST execution units in accordance with the pillar mapping.

Figure 42A:
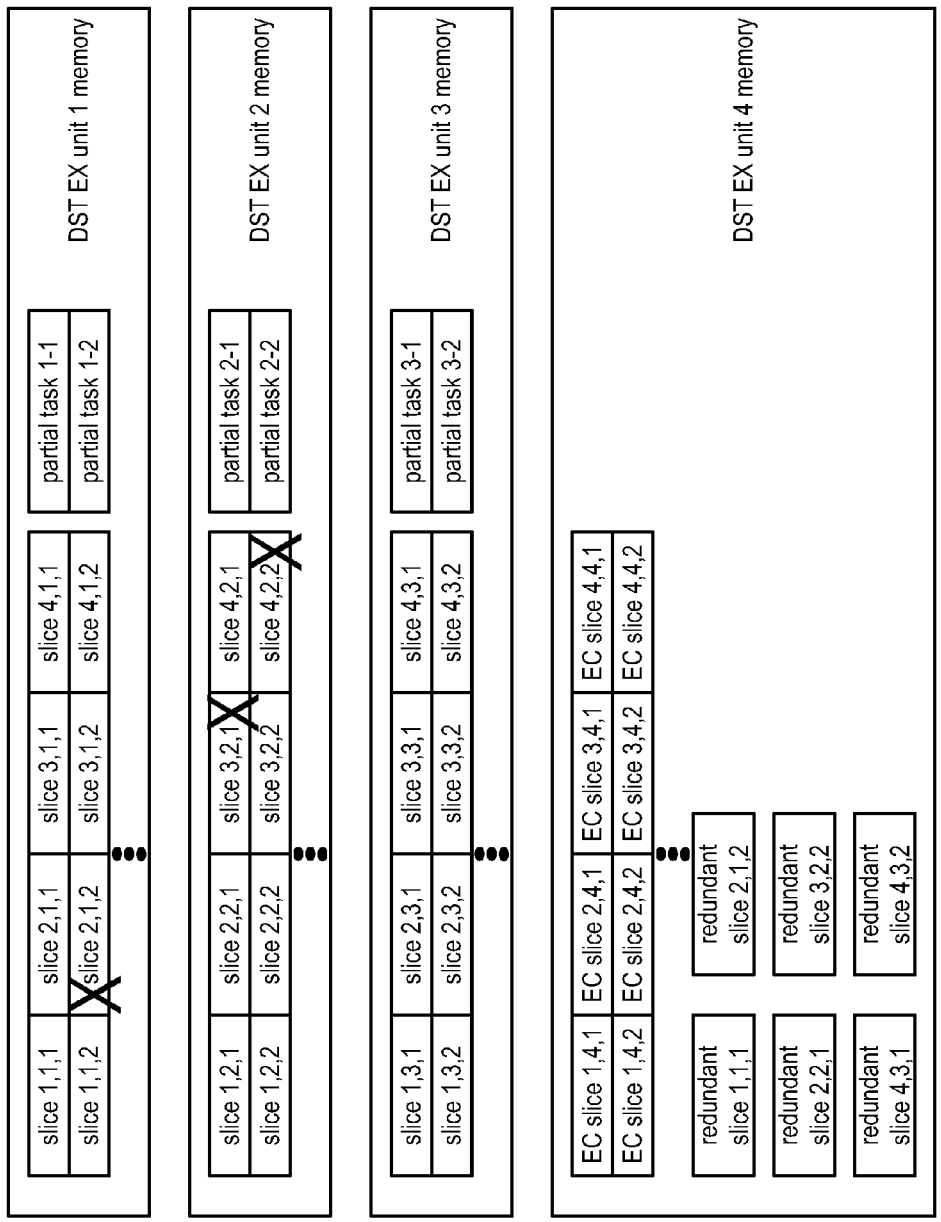
FIG. 42A is a diagram illustrating another example of mapping slice groupings to a set of distributed storage and task (DST) execution unit memories in accordance with the present invention.

FIG. 42A is a diagram illustrating another example of mapping slice groupings to a set of distributed storage and task (DST) execution unit memories. The mapping includes a slice to memory mapping for a pillar width number of DST execution unit memories. For example, for DST execution unit memories 1-4 are utilized to store 3 pillars of slices and 1 pillar of error coded slices when a pillar width is 4 and a decode threshold number is 3.

Slices associated with one or more chunksets are distributed to the DST execution unit memories in accordance with a DST execution unit selection scheme. Slices of a common chunk number (e.g., a common pillar number) are sent to a common DST execution unit when the selection scheme includes selecting a same DST execution unit for slices associated with a common pillar. For example, slices of each chunk 1 are sent to DST execution unit 1, slices of each chunk 2 are sent to DST execution unit 2, slices of each chunk 3 are sent to DST execution unit 3, and error coded slices of each chunk 4 are sent to DST execution unit 4.

For each chunk of each chunkset, associated partial tasks are sent to a DST execution unit that stores the chunk. For example, partial task 1-2 (e.g., chunk 1, chunkset 2) is sent to DST execution unit 1 when slices associated with chunk 1 of chunkset 2 are stored at DST execution unit 1.

One or more slices are selected in accordance with a redundancy scheme to produce one or more redundant slices. The redundancy scheme indicates how selection is accomplished and may be based on one or more of a reliability requirement, an access latency requirement, a DST execution unit performance level, and a DST execution unit reliability level. For example, the selecting includes selection of all slices. As another example, the selecting includes at least one slice per chunk per chunkset. As yet another example, the selecting includes at least one slice per chunkset. The one or more redundant slices are stored in a DST execution unit of the pillar width number of DST execution units in accordance with a pillar mapping. For example, all of the redundant slices are stored in a DST execution unit associated with storage of error coded slices when the pillar mapping includes storing the redundant slices in the DST execution unit associated with the storage of error coded slices.

A slice in error (e.g., missing, corrupted, a stored integrity value does not match a calculated integrity value) may be remedied by rebuilding or retrieving. A slice in error may further be remedied by replacing the slice and error with a corresponding redundant slice. For example, slice 2,1,2 is rebuilt by retrieving redundant slice 2,1,2 when slice 2,1,2 is in error. A slice in error may be remedied by rebuilding by utilizing at least a decode threshold number of associated slices, wherein each associated slice is associated with a common segment of the slice in error slice. The associated slices includes slices, error coded slices, and redundant slices of the common segment. For example, slice 3,2,1 is rebuilt from associated slices including slice 3,1,1, slice 3,3,1, and error coded slice 3,4,1 when slice 3,2,1 is in error and a redundant slice corresponding to slice 3,2,1 is not available. As another example, slice 4,2,2 is rebuilt from associated slices including slice 4,1,2, error coded slice 4,4,2, and redundant slice 4,3,2, when slice 4,2,2 is in error and utilization of slice 4,3,2 from DST execution unit 3 is undesirable (e.g., DST execution unit 3 is unavailable, not trusted, or too busy).

Figure 42B:
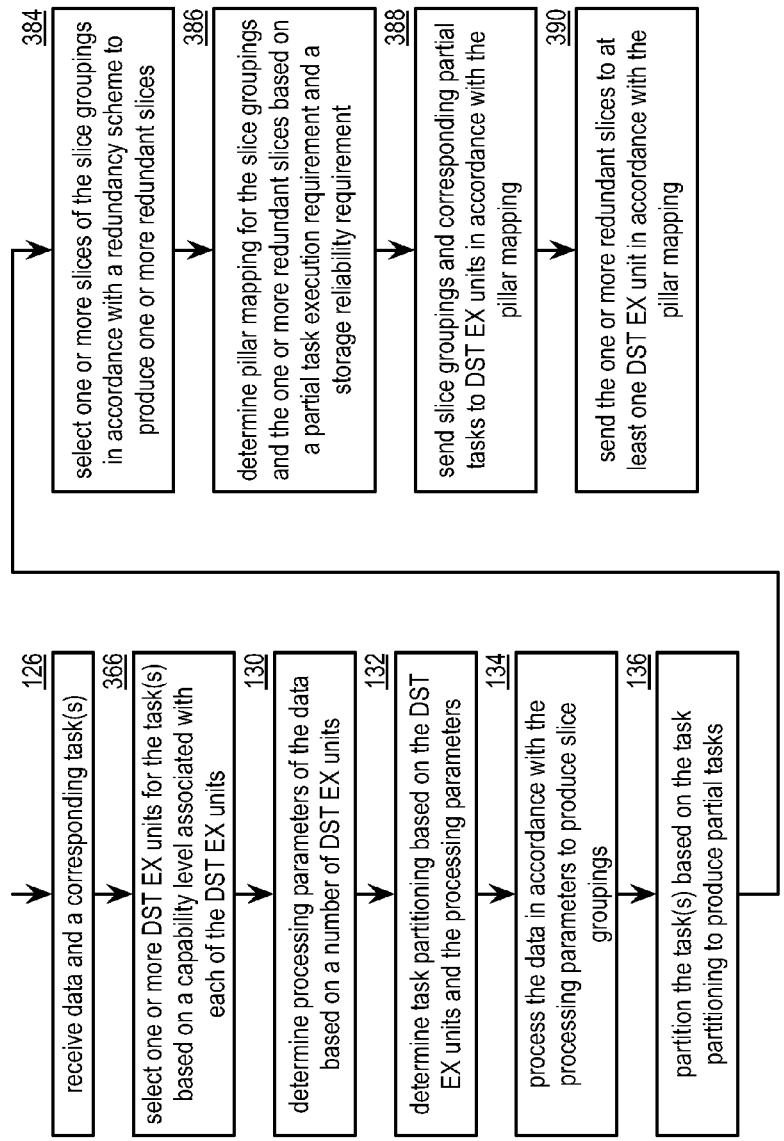
FIG. 42B is a flowchart illustrating another example of assigning slices and partial tasks to distributed storage and task (DST) execution units in accordance with the present invention.

FIG. 42B is a flowchart illustrating another example of assigning slices and partial tasks to distributed storage and task (DST) execution units, which include similar steps to FIGS. 5 and 40C. The method begins with step 126 of FIG. 5 where a processing module (e.g., of a DST client module) receives data and the corresponding task and continues with step 366 of FIG. 40C where the processing module selects one or more DST execution units for the task based on a capability level associated with each of the DST execution units. The method continues with steps 130, 132, 134, and 136 of FIG. 5 where the processing module determines processing parameters of the data based on a number of DST execution units, determines task partitioning based on the DST execution units and the processing parameters, processes the data in accordance with the processing parameters to produce slice groupings, and partitions the task based on the task partitioning to produce partial tasks.

The method continues at step 384 where the processing module selects one or more slices of the slice groupings in accordance with a redundancy scheme to produce one or more redundant slices. The redundancy scheme indicates how selection is accomplished and may be based on one or more of a reliability requirement, an access latency requirement, a DST execution unit performance level, and a DST execution unit reliability level. The method continues at step 386 where the processing module determines pillar mapping for the slice groupings and the one or more redundant slices based on a partial task execution requirement and a storage reliability requirement. For example, processing module determines the pillar mapping to store the one or more redundant slices in a DST execution unit associated with a favorable performance level and a favorable available storage capacity level. The method continues at step 388 where the processing module sends the slice groupings and corresponding partial tasks to the DST execution units in accordance with the pillar mapping. The sending may include outputting the slice groupings and corresponding partial tasks in accordance with task execution ordering. The method continues at step 390 where the processing module sends the one or more redundant slices to at least one DST execution unit in accordance with the pillar mapping.

Figure 42C:
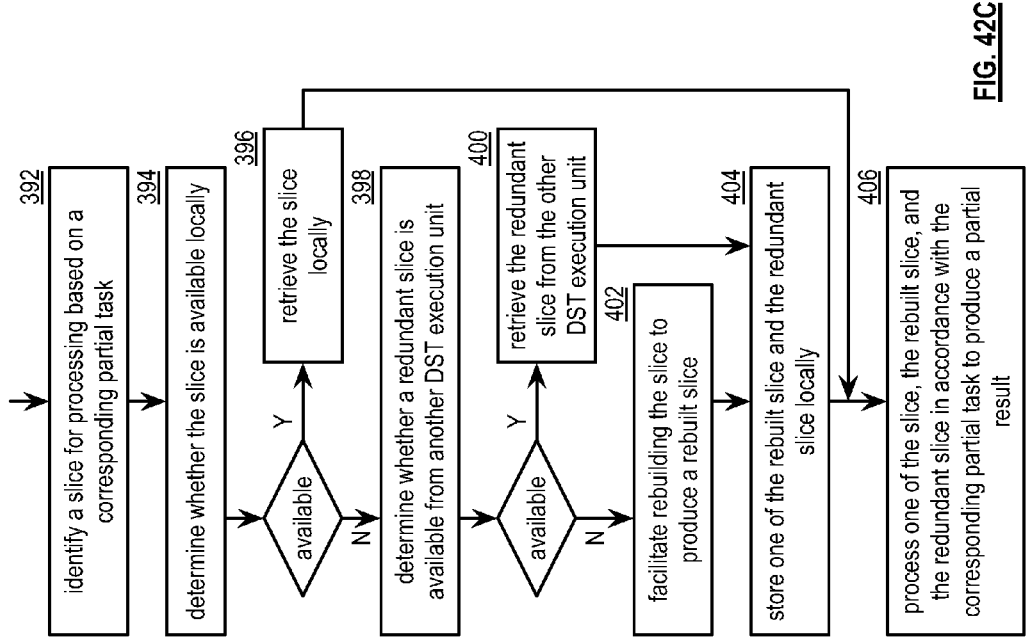
FIG. 42C is a flowchart illustrating an example of retrieving a slice for partial task processing in accordance with the present invention.

FIG. 42C is a flowchart illustrating an example of retrieving a slice for partial task processing. The method begins at step 392 where a processing module (e.g., of a distributed storage and task (DST) client module of a DST execution unit) identifies a slice (e.g., produces a slice name) for processing based on a corresponding partial task. The identifying includes at least one of retrieving a partial task for execution, extracting a slice name from the partial task, extracting a chunk identifier (ID) from the partial task, and obtaining a slice name of the slice based on the chunk ID (e.g., a table lookup). The method continues at step 394 where the processing module determines whether the slice is available locally. The determining may be based on one or more of issuing a local read slice request and receiving a local read slice response, a local storage table lookup, and receiving a local slice name list. The method branches to step 398 when the slice is not available locally. The method continues to step 396 when the slice is available locally. The method continues at step 396 where the processing module retrieves the slice locally. The method branches to step 406.

The method continues at step 398 where the processing module determines whether a redundant slices available from another DST execution unit when the processing module determines that the slice is not available locally. The determining may be based on at least one of a retrieval attempt, a query, a redundant slice location table, and a slice location extracted from the partial task. The determining may include obtaining a DST execution unit ID associated with the other DST execution unit. The method branches to step 402 when the redundant slice is not available. The method continues to step 400 when the redundant slice is available. The method continues at step 400 where the processing module retrieves the redundant slice from the other DST execution unit. For example, the processing module generates a slice retrieval request that includes the slice name, sends the request to the other DST execution unit based on the other DST execution unit ID, and receives the redundant slice. The method branches to step 404.

The method continues at step 402 where the processing module facilitates rebuilding the slice to produce a rebuilt slice when the redundant slice is not available. The facilitating includes at least one of utilizing a rebuilding process and utilizing a zero information gain (ZIG) rebuilding process. The processing module retrieves a decode threshold number of slices corresponding to the slice (e.g., a common segment), decodes the decode threshold number of slices to reproduce a data segment, re-encodes the data segment to produce a pillar width number of slices that includes the rebuilt slice when the rebuilding process is utilized. The retrieving the decode threshold number of slices corresponding to the slice includes generating at least a decode threshold number of read slice requests, sending the at least the decode threshold number of read slice requests to other DST execution units, and receiving the at least the decode threshold number of slices corresponding to the slice.

The processing module retrieves a decode threshold number of ZIG partial slices and decodes (e.g., exclusive OR) the ZIG partial slices to reproduce the rebuilt slice when the ZIG rebuilding process is utilized. The retrieving the decode threshold number of ZIG partial slices includes generating at least a decode threshold number of ZIG partial slice requests, sending the at least the decode threshold number of ZIG partial slice requests to the other DST execution units, wherein each of the other DST execution units generates a ZIG partial slice, and receiving the decode threshold number of ZIG partial slices. The generating of a ZIG partial slice by a DST execution unit of the other DST execution units includes reducing a generator matrix to produce a square matrix that exclusively includes rows identified in the partial request (e.g., slice pillars associated with participating units of a decode threshold number of units), invert the square matrix to produce an inverted matrix (e.g., alternatively, may extract the inverted matrix from the request), matrix multiply the inverted matrix by a local slice (e.g., of same segment as slice to be rebuilt) to produce a vector, and matrix multiply the vector by a row of the generator matrix corresponding to the desired slice to be rebuilt (e.g., alternatively, may identify the row from the request), to produce the requested ZIG partial slice.

The method continues at step 404 where the processing module stores one of the rebuilt slice and the redundant slice locally. As such, a remedy is provided to the slice not being available locally. Subsequent access of the redundant slice locally may avoid burdening a primary DST execution unit. The method continues at step 406 where the processing module processes one of the slice, the rebuilt slice, and the redundant slice in accordance with the corresponding partial task to produce a partial result. The processing may include outputting the partial result.

Figure 43A:
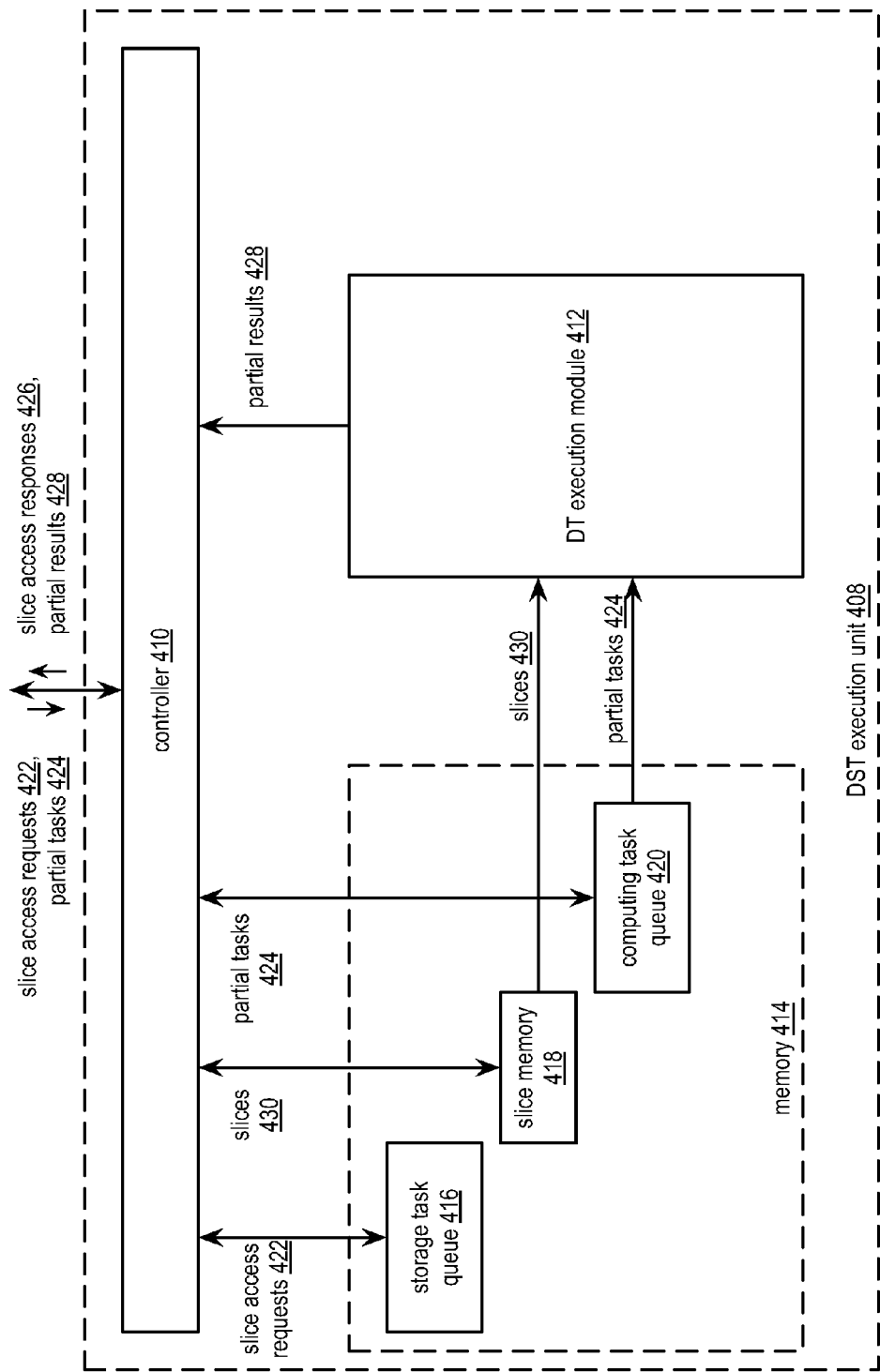
FIG. 43A is a schematic block diagram of another embodiment of a distributed storage and task (DST) execution unit in accordance with the present invention.

FIG. 43A is a schematic block diagram of another embodiment of a distributed storage and task (DST) execution unit 408 that includes a controller 410, a memory 414, and a distributed task (DT) execution module 412. The memory 414 is operational to provide a storage task queue 416, a slice memory 418, and a computing task queue 420. The controller 410 is operational to receive slices 430, store the slices 430 in the slice memory 418, receive slice access requests 422, store the slice access requests 422 in the storage task queue 416, receive partial task requests 424, store the partial tasks 424 in the computing task queue 420, determine a prioritization for the slice access requests 422 and the partial task requests 424, update prioritization of slice access requests 422 in the storage task queue 416, update prioritization of partial tasks 424 stored in the computing task queue 420, facilitate execution of the slice access requests 422 and the partial task requests 424 in accordance with the prioritization to produce slice access responses 426 and partial results 428, and output the slice access responses 426 and the partial results 428. Each slice access request 422 of the slice access requests 422 includes at least one of a read request and a write request. Each slice access response 426 of the slice access responses 426 includes at least one of a read responses and a write response. The DT execution module 412 is operational to retrieve slices 430 from slice memory 418, retrieve partial tasks 424 from the computing task queue 420, and perform partial tasks 424 on the slices 430 in accordance with prioritization of the partial tasks 424 to produce the partial results 428.

In an example of operation, the controller 410 receives a slice access request 422 that includes a read slice request for 100 slices available from the slice memory 418. The controller 410 stores read slice request in the storage task queue 416. Next, the controller 410 receives a partial task 424 that includes a computing task to search 10,000 slices available from the slice memory 418 for a keyword to identify each slice that includes the keyword. The controller 410 stores the partial task 424 in the computing task queue 420.

At least one of the controller 410, the DT execution module 412, and a DST client module updates a computing task prioritization of entries in the computing task queue 420 (e.g., including the entry to search the 10,000 slices) based on one or more of task execution requirements, task execution performance level information, and task execution capability level information. The task execution requirements includes one or more of a capacity threshold, a loading threshold, a computing task execution performance level goal, a storage task execution performance level goal, a partial task priority level, and a storage task priority level. The task execution performance level information includes one or more of a DT execution module loading level, historic computing task execution performance level information, and historic storage task execution performance level information. The task execution capability level information includes memory availability, available memory capacity, and available DT execution module processing capability. For example, the controller updates the computing task prioritization such that the partial task to search the 10,000 slices is prioritized lower than a previous task retrieved from the computing task queue to sort data of 300 slices when the previous task associated with sorting is associated with a partial task priority level that is greater than a partial task priority level associated with the partial task to search the 10,000 slices.

The at least one of the controller 410, the DT execution module 412, and the DST client module updates a storage task prioritization of entries in the storage task queue 416 (e.g., including the read request for the 100 slices) based on one or more of the task execution requirements, the task execution performance level information, and the task execution capability level information. For example, the controller 410 updates the storage task prioritization such that the partial task to read the 100 slices is prioritized higher than a previous task retrieved from the storage task queue to write 200 slices when the previous task associated with writing is associated with a storage task priority level that is lower than a storage task priority level associated with the storage task to read the 100 slices.

In the example of operation continued, the at least one of the controller 410, the DT execution module 412, and the DST client module further updates the computing task prioritization and the storage task prioritization in accordance with a task prioritization scheme. The task prioritization scheme includes prioritization between storage tasks and computing tasks. For example, the task prioritization scheme indicates to prioritize storage tasks over computing tasks. As another example, the task prioritization scheme indicates to prioritize computing tasks over storage tasks. As yet another example, the task prioritization scheme indicates to prioritize storage tasks and computing tasks independently from each other. For instance, the task prioritization scheme indicates to privatize storage tasks to maintain a storage capacity utilization level below a storage capacity utilization level threshold and to prioritize computing tasks to maintain a computing task capacity utilization level below a computing task capacity utilization level threshold. Alternatively, the at least one of the controller 410, the DT execution module 412, and the DST client module updates the storage task prioritization and the computing task prioritization in one cycle based one or more of the task execution requirements, the task execution performance level information, the task execution capability level information, and the task prioritization scheme.

Next, the controller 410 executes storage tasks from the storage task queue 416 and the DT execution module 412 executes computing tasks from the computing task queue 420 in accordance with updated task prioritization. For example, the DT execution module 412 retrieves the partial task to search the 10,000 slices from the computing task queue 420, initiates execution of the partial task in accordance with the computing task prioritization, which when activated, retrieves the 10,000 slices from the slice memory 418, performs the search on the 10,000 slices for the keyword to identify slices that include the keyword, generates partial results 428 that includes the identification of the identify slices, and outputs the partial results 428. As another example, the controller 410 retrieves the read 100 slices request from the storage task queue 416, initiates execution of the read request in accordance with the storage task prioritization, which when activated, retrieves the 100 slices from the slice memory 418, and outputs the 100 slices.

Figure 43B:
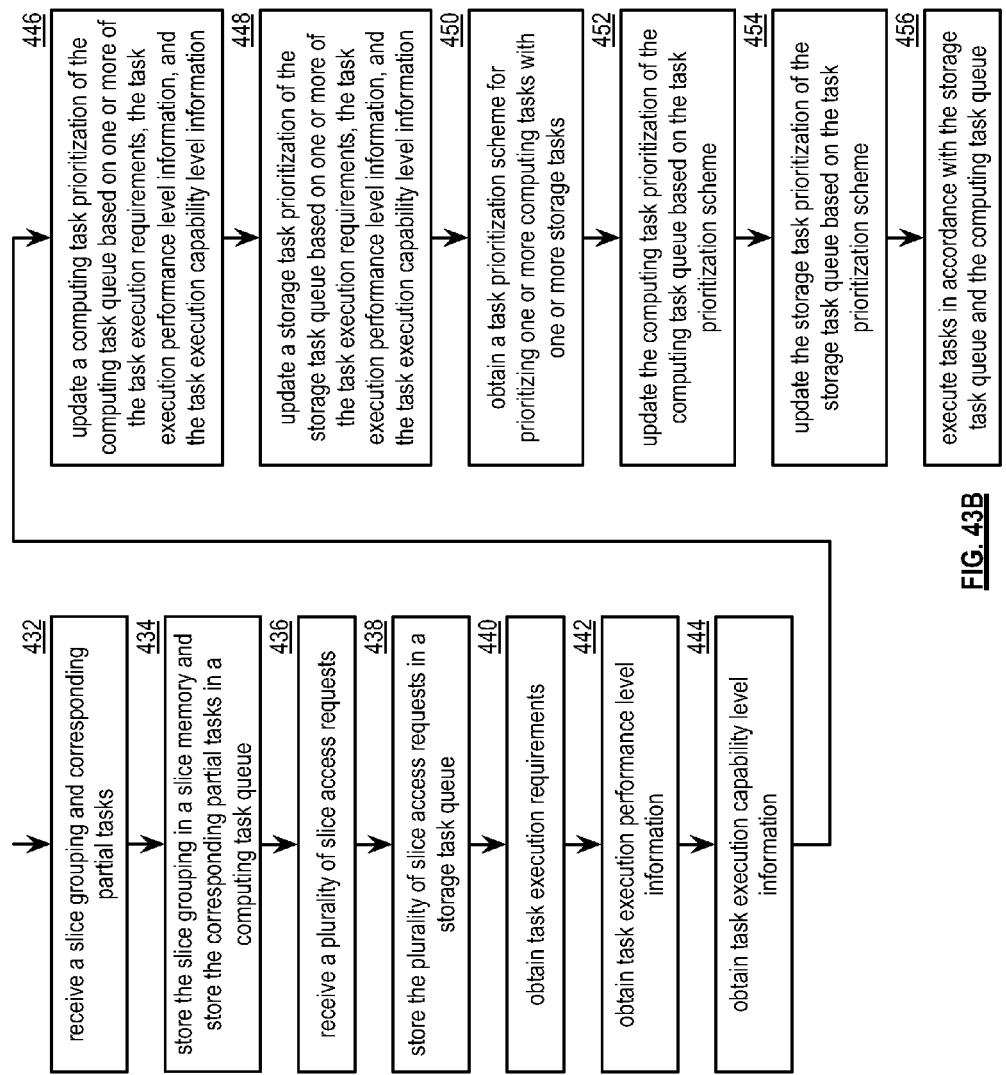
FIG. 43B is a flowchart illustrating an example of prioritizing a partial task in accordance with the present invention.

FIG. 43B is a flowchart illustrating an example of prioritizing a partial task. The method begins at step 432 where a processing module (e.g., of a distributed storage and task (DST) execution unit) receives a slice grouping and corresponding partial tasks. The method continues at step 434 where the processing module stores the slice grouping in a slice memory and stores the corresponding partial tasks in a computing task queue. The storing includes at least one of appending the slice grouping to an end of previously stored slices in the slice memory, appending the corresponding partial tasks to an end of previously stored partial tasks in the computing task queue, and initializing a computing task prioritization. The initializing of the computing task prioritization includes obtaining a prioritization level and updating the computing task queue to include the prioritization level. The obtaining includes at least one of utilizing a default prioritization level, retrieving a prioritization level, and receiving the prioritization level.

The method continues at step 436 where the processing module receives a plurality of slice access requests. Each slice access request of the plurality of slice access requests includes one or more of a request type indicator (e.g., read, write), a slice, a slice name, an access requirement, a priority level indicator, a data type indicator (e.g., video, text, image, audio, etc.), and a requesting entity identifier (ID). The method continues at step 438 where processing module stores the plurality of slice access requests in a storage task queue. The storing includes at least one of appending the slice access requests to an end of previously stored slice access requests and initializing a storage task prioritization. The initializing of the storage task prioritization includes obtaining a prioritization level and updating the storage task queue to include the prioritization level. The obtaining includes at least one of utilizing a default prioritization level, retrieving a prioritization level, and receiving the prioritization level.

The method continues at step 440 where the processing module obtains task execution requirements. The obtaining includes at least one of initiating a query, receiving, a lookup, and receiving with the slice access requests. The method continues at step 442 where the processing module obtains task execution performance level information. The obtaining includes at least one of initiating a performance test, initiating a query, receiving, a lookup, receiving with the slice access requests, and accessing historical performance level records. The method continues at step 444 where the processing module obtains task execution capability level information. The obtaining includes at least one of initiating an availability test, initiating a query, receiving, a lookup, receiving with the slice access requests, accessing configuration information, and accessing historical capability level records.

The method continues at step 446 where the processing module updates computing task prioritization of the computing task queue based on one or more of the task execution requirements, the task execution performance level information, and the task execution capability level information. For example, the processing module raises priority for higher priority tasks. As another example, the processing module lowers priority for more tasks when performance is unfavorable. As yet another example, the processing module raises priority for more tasks when favorable capability exists.

The method continues at step 448 where the processing module updates storage task prioritization of the storage task queue based on one or more of the task execution requirements, the task execution performance level information, and the task execution capability level information. For example, the processing module raises priority for higher priority tasks. As another example, the processing module lowers priority for more tasks when performance is unfavorable. As yet another example, the processing module raises priority for more tasks when favorable capability exists.

The method continues at step 450 where the processing module obtains a task prioritization scheme for prioritizing one or more computing tasks with one or more storage tasks. The obtaining includes at least one of analyzing performance by type, comparing performance by type, initiating a query, receiving the scheme, a lookup, utilizing a predetermined scheme, and accessing configuration information. The method continues at step 452 where the processing module updates the computing task prioritization of the computing task queue based on the task prioritization scheme. The method continues at step 454 where the processing module updates the storage task prioritization of the storage task queue based on the task prioritization scheme. The method continues at step 456 where the processing module executes tasks in accordance with the storage task queue and the computing task queue.

FIG. 44A is a diagram illustrating another example of mapping slice groupings to a set of distributed storage and task (DST) execution unit memories. The mapping includes a slice to memory mapping for a pillar width number of DST execution unit memories. For example, for DST execution unit memories 1-5 are utilized to store 3 pillars of slices and 2 pillars of error coded slices when a pillar width is 5 and a decode threshold number is 3.

Slices associated with one or more chunksets are distributed to the DST execution unit memories 1-5 in accordance with a DST execution unit selection scheme of a pillar mapping scheme. The pillar mapping scheme identifies at least one of a number of DST execution units to utilize for the storage of chunks and a number of DST execution units to utilize for the storage of pillars of error coded slices. For example, the number of DST execution units to utilize for the storage of chunks is chosen to be a pillar width number when the pillar mapping scheme includes maximizing a number of DST execution units to execute partial tasks on stored chunks.

The DST execution unit selection scheme includes one of a round robin approach and a common pillar approach. When the DST execution unit selection scheme includes the common pillar approach, slices of a common chunk number (e.g., a common pillar number) are sent to a common DST execution unit. For example, slices of each chunk 1 are sent to DST execution unit 1, slices of each chunk 2 are sent to DST execution unit 2, slices of each chunk 3 are sent to DST execution unit 3, error coded slices of each chunk 4 are sent to one or more of the DST execution units 1-5 (e.g., DST execution unit 4), and error coded slices of each chunk 5 are sent to one or more of the DST execution units 1-5 (e.g., DST execution unit 5).

When the DST execution unit selection scheme includes the round robin approach, chunks from different chunksets and of a same chunk number are sent to a different DST execution unit memory from chunkset to a next chunkset. For example slices of a chunk 1 of a chunkset 1 are sent to DST execution unit 1, slices of a chunk 1 of a chunkset 2 are sent to DST execution unit 5, slices of a chunk 1 of a chunkset 3 are sent to DST execution unit 4, and slices of a chunk 1 of a chunkset 4 are sent to DST execution unit 4 etc. As another example, error coded slices of a pillar 5 of chunkset 1 are sent to DST execution unit 5, error coded slices of a pillar 5 of chunkset 2 are sent to DST execution unit 4, error coded slices of a pillar 5 of chunkset 3 are sent to DST execution unit 3, and error coded slices of a pillar 5 of chunkset 4 are sent to DST execution unit 2.

For each chunk of each chunkset, associated partial tasks are sent to a DST execution unit that stores the chunk. For example, partial task 1-2 (e.g., chunk 1, chunkset 2) is sent to DST execution unit 5 when slices associated with chunk 1 of chunkset 2 are stored at DST execution unit 5. The round robin approach provides a system improvement by providing a balancing of partial task assignments across the pillar width number of DST execution units 1-5. A further improvement is provided when even more chunks of further chunksets are distributed amongst the DST execution units 1-5.

FIG. 44B is a diagram illustrating another example of mapping slice groupings to a set of distributed storage and task (DST) execution unit memories. The mapping includes a slice to memory mapping for a decode threshold number of DST execution unit memories. For example, for DST execution unit memories 1-3 are utilized to store 3 pillars of slices and 2 pillars of error coded slices when a pillar width is 5 and a decode threshold number is 3.

Slices associated with one or more chunksets are distributed to the DST execution unit memories 1-3 in accordance with a DST execution unit selection scheme of a pillar mapping scheme. The pillar mapping scheme identifies at least one of a number of DST execution units to utilize for the storage of chunks and a number of DST execution units to utilize for the storage of pillars of error coded slices. For example, the number of DST execution units to utilize for the storage of chunks is chosen to be the decode threshold number when the pillar mapping scheme includes limiting a number of DST execution units to execute partial tasks on stored chunks to the decode threshold number.

The DST execution unit selection scheme includes one of a round robin approach and a common pillar approach. When the DST execution unit selection scheme includes the common pillar approach, slices of a common chunk number (e.g., a common pillar number) are sent to a common DST execution unit. For example, slices of each chunk 1 are sent to DST execution unit 1, slices of each chunk 2 are sent to DST execution unit 2, and slices of each chunk 3 are sent to DST execution unit 3.

When the DST execution unit selection scheme includes the round robin approach, one or more of slices from different chunksets and error coded slices of error coded pillars are sent to a different DST execution unit memory from chunkset to a next chunkset. For example slices of a chunk 1 of a chunkset 1 are sent to DST execution unit 1, slices of a chunk 1 of a chunkset 2 are sent to DST execution unit 3, slices of a chunk 1 of a chunkset 3 are sent to DST execution unit 2, and slices of a chunk 1 of a chunkset 4 are sent to DST execution unit 1 etc. As another example, error coded slices of a pillar 5 of chunkset 1 are sent to DST execution unit 2, error coded slices of a pillar 5 of chunkset 2 are sent to DST execution unit 1, error coded slices of a pillar 5 of chunkset 3 are sent to DST execution unit 3, and error coded slices of a pillar 5 of chunkset 4 are sent to DST execution unit 2. For each chunk of each chunkset, associated partial tasks are sent to a DST execution unit that stores the chunk. For example, partial task 1-2 (e.g., chunk 1, chunkset 2) is sent to DST execution unit 1 when slices associated with chunk 1 of chunkset 2 are stored at DST execution unit 1.

Figure 44C:
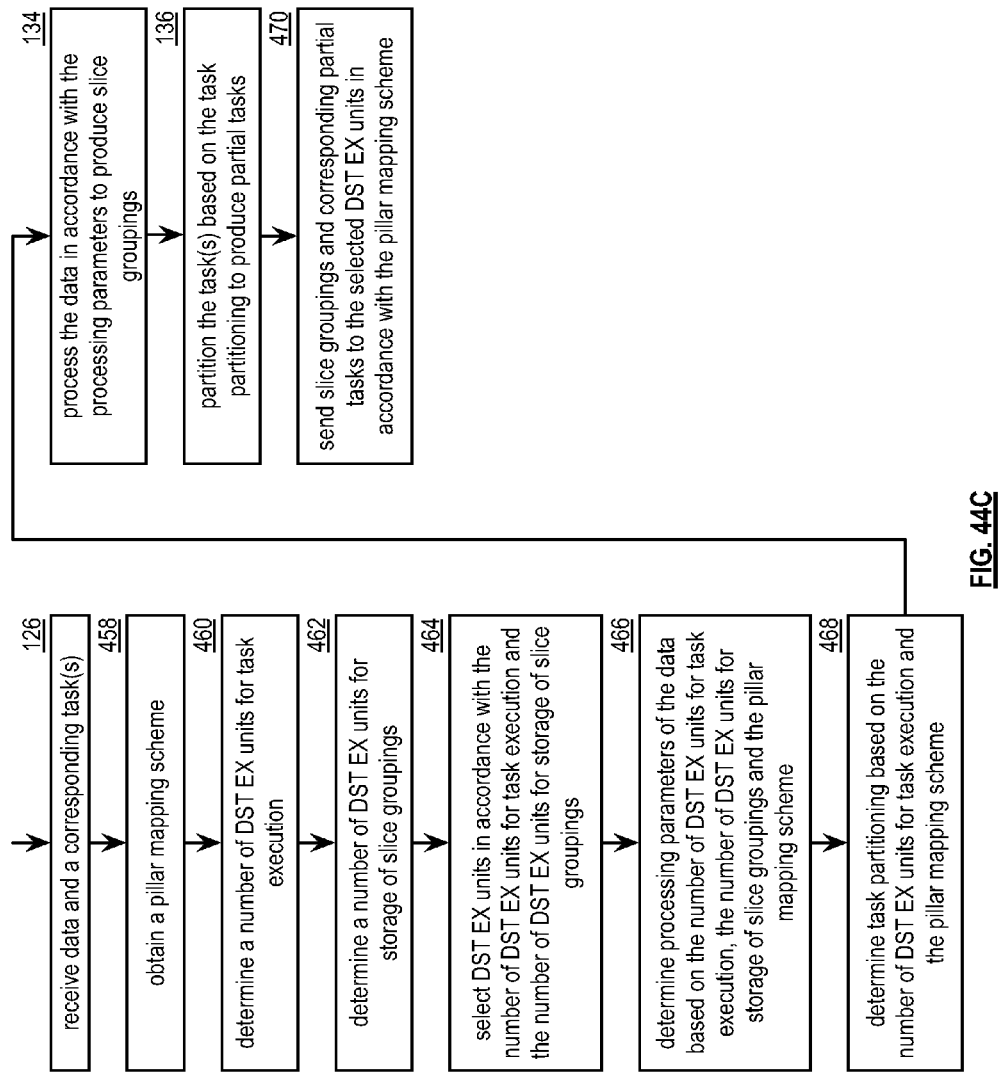
FIG. 44C is a flowchart illustrating another example of assigning slices and partial tasks to distributed storage and task (DST) execution units in accordance with the present invention.

FIG. 44C is a flowchart illustrating another example of assigning slices and partial tasks to distributed storage and task (DST) execution units, which include similar steps to FIG. 5. The method begins with step 126 of FIG. 5 where a processing module (e.g., of a DST client module) receives data and the corresponding task and continues at step 458 where the processing module obtains a pillar mapping scheme. The pillar mapping scheme includes at least one of a common pillar approach and a round robin approach for one or more of slices of chunks and error coded slices. The obtaining includes at least one of determining based on the data, a query, a lookup, and receiving the pillar mapping scheme.

The method continues step 460 where the processing module determines a number of DST execution units for task execution. The determining may be based on one or more of the pillar mapping scheme, the data, the task, and an execution requirement. For example, processing module determines the number of DST execution units for task execution to be five when an execution requirement requires five DST execution units to execute the partial tasks within a required timeframe. The method continues at step 462 where the processing module determines a number of DST execution units for storage of slice groupings. The determining may be based on one or more of the number of DST execution units for task execution, the pillar mapping scheme, the data, the task, and a storage requirement. For example, the processing module determines a number of DST execution units for storage of slice groupings to be three when error coded slices are required to be stored in at least three DST execution units.

The method continues at step 464 where the processing module selects DST execution units in accordance with the number of DST execution units for task execution and the number of DST execution units for storage of slice groupings. The selecting may also be based on a performance requirement, reliability requirement, a capacity requirement, DST execution unit reliability history, a DST execution unit capacity level, and DST execution unit performance history. The method continues at step 466 where the processing module determines processing parameters of the data based on the number of DST execution units for task execution, the number of DST execution units for storage of slice groupings, and the pillar mapping scheme. For example, a decode threshold number is established to be substantially five which is the same as the number of DST execution units for task execution when the pillar mapping scheme includes minimizing the number of DST execution units. As another example, a decode threshold number is established as 10 based on reliability requirement when the pillar mapping scheme indicates to utilize a maximum number of DST execution units. As yet another example, a pillar width number is established to be the same as the number of DST execution units for storage of slice groupings when the pillar mapping scheme is to maximize the number of DST execution units.

The method continues at step 468 where the processing module determines task partitioning based on the number of DST execution units for task execution and the pillar mapping scheme. For example, the task partitioning is established to be a round robin approach when the pillar mapping scheme includes maximizing the number of units as a pillar width number of units. As another example, the task partitioning established to align common pillars of each chunkset with a common DST execution unit as partial tasks are evenly distributed amongst the DST execution units when the pillar mapping scheme includes minimizing the number of DST execution units (e.g., when a number of DST execution units for task execution is substantially the same as the decode threshold number).

The method continues with steps 134-136 of FIG. 5 where the processing module processes the data in accordance with the processing parameters to produce slice groupings and partitions the task based on the task partitioning to produce partial tasks. The method continues at step 470 where the processing module sends the slice groupings and corresponding partial tasks to the selected DST execution units in accordance with the pillar mapping scheme. As such, slices of the slice groupings are stored in one or more of the selected DST execution units for subsequent partial task execution and error coded slices of the slice groupings are stored in one or more of the selected DST execution units for storage.

Figure 45A:
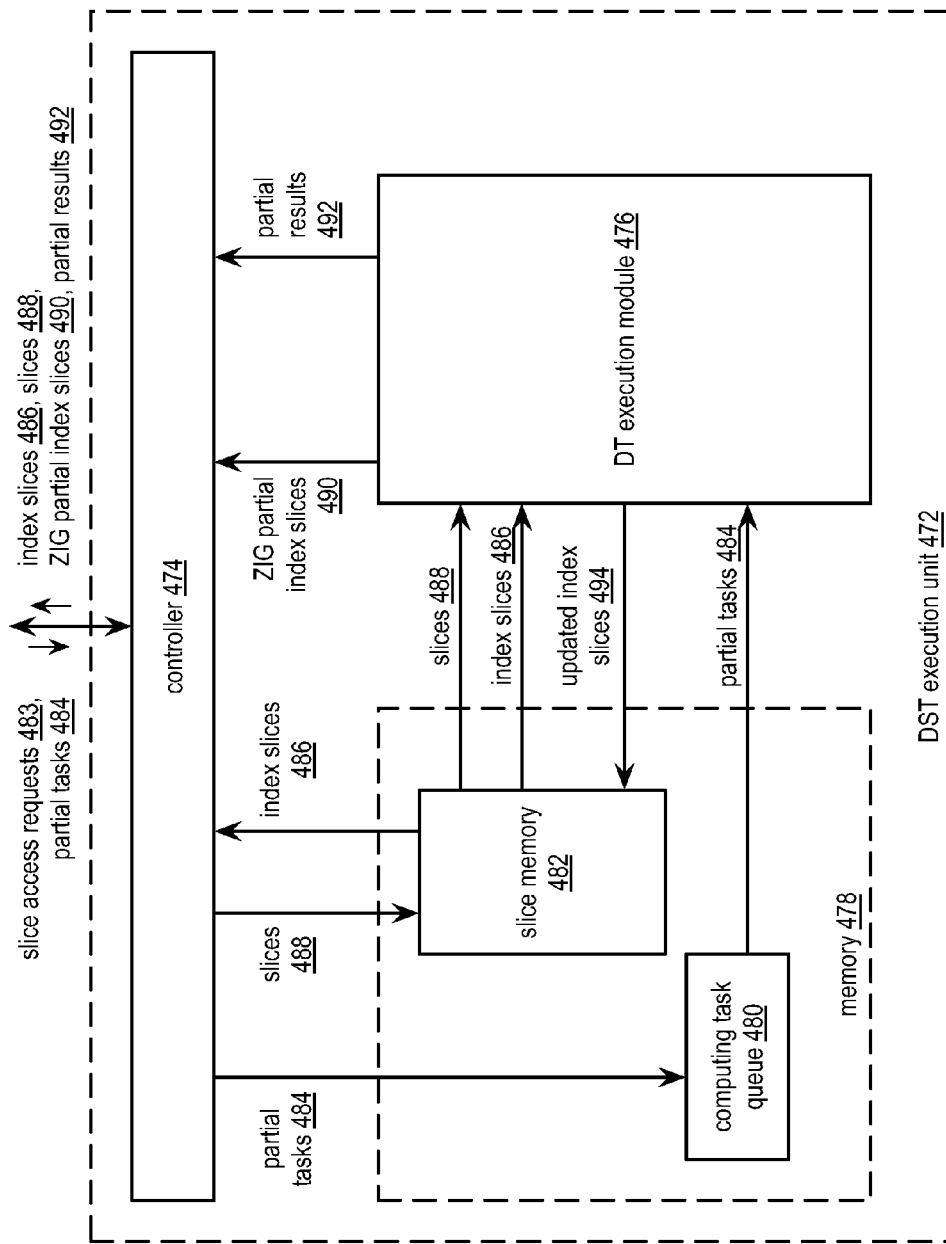
FIG. 45A is a schematic block diagram of another embodiment of a distributed storage and task (DST) execution unit in accordance with the present invention.

FIG. 45A is a schematic block diagram of another embodiment of a distributed storage and task (DST) execution unit 472 that includes a controller 474, a memory 478, and a distributed task (DT) execution module 476. The memory 478 is operational to provide a slice memory 482 and a computing task queue 480. The controller 474 is operational to receive slices 488, store the slices 488 in the slice memory 482, receive slice access requests 483, receive index slice access requests 483, receive partial task requests 484, store the partial tasks 484 in the computing task queue 480, facilitate execution of the slice access requests 483, the index slice access requests 483, and the partial task requests 484 to produce slice access responses (e/g/. slices 488), index slice access responses (e.g., index slices 486), zero information gain (ZIG) partial index slices 490, partial results 492, and output the slice access responses, the index slice access responses, the ZIG partial index slices 490, and the partial results 492. Each slice access request 483 of the slice access requests 483 includes at least one of a read request and a write request. Each slice access response of the slice access responses includes at least one of a read responses and a write response. The DT execution module 476 is operational to retrieve slices 488 from the slice memory 482, retrieve partial tasks 484 from the computing task queue 480, retrieve index slices 486 from the slice memory 482, and perform partial tasks 484 on the slices 488 and/or the index slices 486 to produce updated index slices 494, the ZIG partial index slices 490, and the partial results 492.

In an example of operation, the DT execution module 476 retrieves slices 488 of a corresponding chunk from the slice memory 482 and retrieves partial tasks 484 associated with the chunk from the computing task queue 480. When the partial tasks 484 include an indexing partial task, the DT execution module 476 processes the chunk in accordance with the indexing partial tasks associated with the chunk to produce index information. The index information includes an indexing partial result. Next, the DT execution module 476 retrieves a corresponding index slice 486 from the slice memory 482 and updates the index slice utilizing the index information to produce the updated index slice 494 when the corresponding index slice is available (e.g., as a first time null index slice or as a previously stored index slice). The DT execution module 476 stores the updated index slice 494 in the slice memory 482 such that the controller 474 can subsequently retrieve the index slice 486 in response to an index slice access request 483. Next, for each error coded pillar associated with the index slice 486, the DT execution module 476 generates error coded slice modification information based on one or more of the updated index slice 494, the index slice 486, and ZIG partial slice generation information. The DT execution module 476 sends the error coded slice publication information to one or more other DST execution units where each of the one or more other DST execution units generates and stores an updated error coded index slice. The updated error coded index slice may be utilized for subsequent rebuilding of the index slice 486.

The ZIG partial slice generation information includes one or more of a generator matrix, an inverted square matrix, a decode threshold number of participating pillar numbers, and a pillar number associated with the pillar. The generating of the error coded slice modification information includes generating the error coded slice modification information in accordance with an expression: error coded slice modification information=(ZIG partial updated index slice) XOR (ZIG partial index slice), wherein XOR is an exclusive OR function. A ZIG partial slice is generated by reducing the generator matrix to produce a square matrix that exclusively includes rows identified in the ZIG partial slice generation information (e.g., participating pillar numbers), invert the square matrix to produce the inverted score matrix (e.g., alternatively, may extract the inverted square matrix from the ZIG partial slice generation information), matrix multiply the inverted square matrix by the slice (e.g., updated index slice, index slice) to produce a vector, and matrix multiply the vector by a row of the generator matrix corresponding to the error coded slice to be partial encoded (e.g., alternatively, may extract the row corresponding to the pillar number associated with the pillar of the ZIG partial slice generation information) to produce the ZIG partial (updated) index slice 490.

Figure 45B:
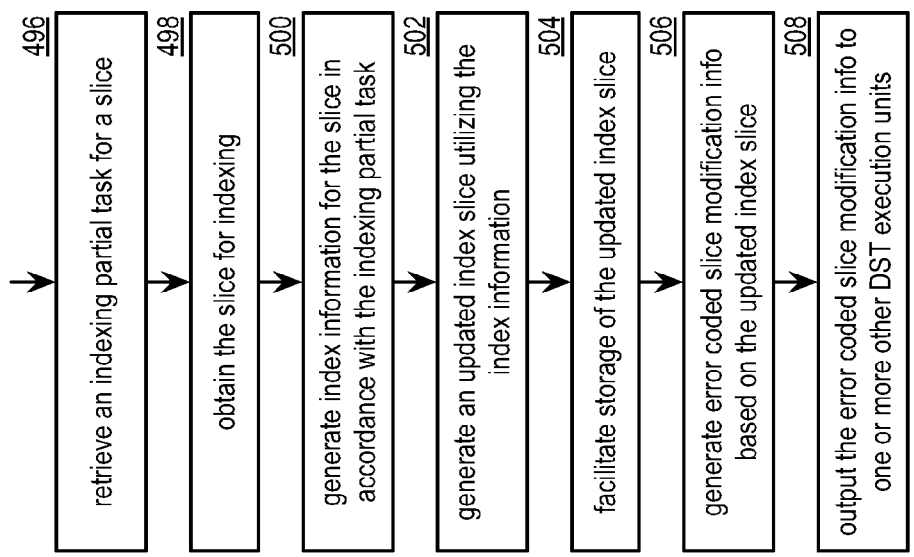
FIG. 45B is a flowchart illustrating an example of generating an index in accordance with the present invention.

FIG. 45B is a flowchart illustrating an example of generating an index. The method begins at step 496 where a processing module (e.g., of a dispersed storage and task (DST) execution unit) retrieves an indexing partial task for a slice (e.g., from a slice memory). The retrieving may also include one or more of identifying the indexing partial task based on receiving the slice, ingesting data to produce the slice, and identifying the partial task based on the ingested data. The method continues at step 498 where the processing module obtains the slice for indexing. The obtaining includes one or more of obtaining a slice name (e.g., retrieving, generating, extracting from a partial task), receiving the slice, retrieving the slice from a slice memory, requesting the slice, and identifying the slice based on a pending indexing partial task.

The method continues at step 500 where the processing module generates index information for the slice in accordance with the indexing partial task. The generating includes processing the slice in accordance with the indexing partial task to produce a partial result that includes the index information. The method continues at step 502 where the processing module generates an updated index slice utilizing the index information. The generating includes retrieving a corresponding index slice from a slice memory and modifying the index slice based on the index information to produce the updated index slice. The index slice may include a null slice when no previous update process has been executed. The index slice may include a result of a previous update index slice process that resulted in the index slice been stored in the slice memory.

The method continues at step 504 where the processing module facilitates storage of the updated index slice. The facilitating includes at least one of storing the updated index slice in the slice memory, replacing the index slice with the updated index slice in the slice memory, and sending the updated index slice to another DST execution unit for storage therein. The method continues at step 506 where the processing module generates error coded slice modification information based on the updated index slice as discussed with reference to FIG. 45A. The method continues at step 508 where the processing module outputs the error coded slice modification information to one or more other DST execution units. The outputting includes identifying the one or more other DST execution units as DST execution units utilize to store error coded slices associated with the slice. For example, the processing module identifies DST execution units 4 and 5 when DST execution units 1-3 are utilized to store chunks (e.g., of index slices) and DST execution units 4 and 5 are utilized to store error coded index slices associated with the chunks of index slices.

Figure 46:
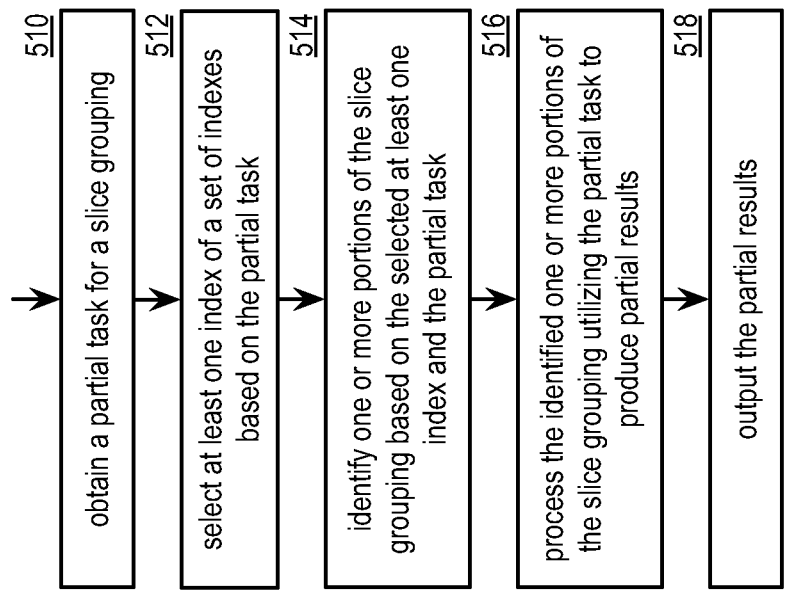
FIG. 46 is a flowchart illustrating an example of identifying a portion of a slice groupings in accordance with the present invention.

FIG. 46 is a flowchart illustrating an example of identifying a portion of a slice groupings. The method begins at step 510 where a processing module (e.g., of a dispersed storage and task (DST) execution module) obtains a partial task for slice grouping. The partial task includes a partial task associated with an index utilized to locate and/or identify data stored as one of more slice groupings in a DST module. The partial task includes at least one of a computation task, an index type indicator, an index search term, a slice name, and a slice grouping identifier (ID). The obtaining includes at least one of identifying a next partial task, retrieving the partial task from a local memory, and receiving the partial task, wherein the partial task is associated with the slice grouping.

The method continues at step 512 where the processing module selects at least one index of a set of indexes based on the partial task. The set of indexes may be utilized to locate and/or identify data utilizing a set of index types and associated set of index search terms. The selecting includes at least one of identifying the at least one index as an index associated with an index type that substantially matches and index type of the partial task.

The method continues at step 514 where the processing module identifies one or more portions of the slice grouping based on the selected at least one index and the partial task. The identifying includes extracting and index search term from the partial task and utilizing the search term to search the index to identify the one or more portions of the slice grouping. The method continues at step 516 where the processing module processes the identifying one or more portions of the slice grouping utilizing the partial task to produce partial results. The processing includes executing a computation of task of the partial task on the identified one or more portions of the slice groupings to produce partial results. The method continues at step 518 where the processing module outputs the partial results.

Figure 47A:
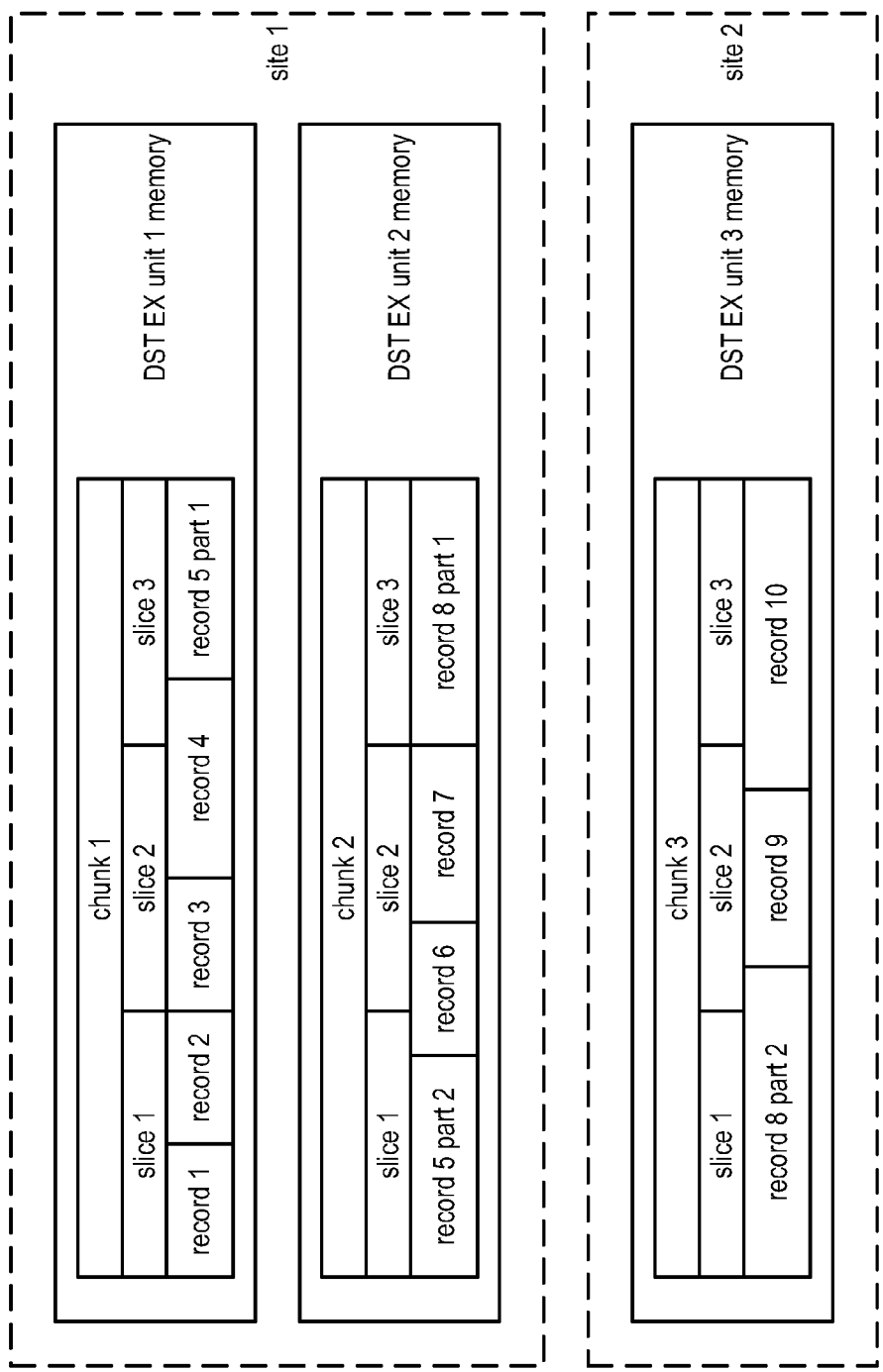
FIG. 47A is a diagram illustrating another example of mapping slice groupings to a set of distributed storage and task (DST) execution unit memories in accordance with the present invention.

FIG. 47A is a diagram illustrating another example of mapping slice groupings to a set of distributed storage and task (DST) execution unit memories. The mapping includes a record to memory mapping for two or more DST execution unit memories. Each record includes a number of bytes of data, wherein the data includes at least one of a data file, and a portion of a data file, and the number of bytes of the data corresponds to the record. For example, an audio sample record includes 1000 acoustic sampling bytes. As another example, a text record includes a text document file. A chunk includes one or more slices of a slice grouping. For example, a chunk includes three slices. Each slice of the one more slices includes at least a portion of a record. For example, slice 1 of chunk 1 includes record 1 and record 2. As another example, slice 2 of chunk 1 includes record 3 and a portion of record 4. A plurality of chunks includes a plurality of slices, wherein two or more chunks may include two or more slices corresponding to contiguous data. For example, contiguous data may extend from a last slice of a first chunk to a first slice of a second chunk. As such, a record may be mapped to two or more chunks. For example, a first portion of record 5 is mapped to a portion of slice 3 of chunk 1 and a second portion of record 5 is mapped to a portion of a slice 1 of a chunk 2.

Two or more DST execution unit memories may be assigned to a common site. As such, a record mapped to the two or more DST execution unit memories at the common site may be readily retrieved for processing by any DST execution unit associated with the DST execution unit memories. Retrieving may include reading a slice to immediately execute a partial task and pre-reading the slice to execute the partial task within a time period (e.g., shortly thereafter without delay between execution of the previous slice and execution of the slice). For example, DST execution units 1 and 2 may readily retrieve both portions of record 5. A record may be mapped to two or more DST execution unit memories, wherein each of the two or more DST execution unit memories are at different sites. For example, a record 8 part 1 is mapped to DST execution unit 2 memory at site 1 and record 8 part 2 is mapped to DST execution unit 3 summary at a site 2. As such, the record mapped to two or more DST execution unit memories located at two or more sites may not be readily retrieved for processing except by a DST execution unit associated with a portion of the record mapped to a common site. For example, DST execution unit 2 at site 1 can readily retrieve record 8 part 1 but not record 8 part 2 at another site and DST execution unit 3 at site 2 can readily retrieve record 8 part 2 but not record 8 part 1 at another site.

A read ahead process may facilitate determining when to read ahead and determining which slices to read ahead based on at least one of a partial task execution performance level and the mapping of slice groupings to the set of DST execution unit memories such that there is substantially no delay between execution of a partial task on a record of a previous slice and execution of the partial task on another portion of the record from a next slice. For example, the read ahead process facilitates execution of a partial task on the first portion of record 5 and the second portion of record 5 without delay to include continuous computation.

In a read ahead process example of operation, slice 2 is retrieved from DST execution unit 1 memory, wherein slice 2 includes a record 3 and a first portion of a record 4. Execution of a partial task is initiated on record 3 and a pre-read of a second portion of record 4 is initiated, since the second portion of record 4 is available from a common DST execution unit memory, by retrieving slice 3 from the DST execution unit 1 memory.

In another read ahead process example of operation, slice 3 is retrieved from DST execution unit 1 memory at site 1, wherein slice 3 includes the second portion of record 4 and the first portion of record 5. Execution of a partial task is initiated on record 5. A determination is made whether to pre-read the second portion of record 5 based on the mapping. A pre-read of the second portion of record 5 is initiated, since the second portion of record 5 is available from DST execution unit memory of a common site with the first portion, by retrieving the second portion of record 5 from the DST execution unit 2 memory at site 1.

In yet another read ahead process example of operation, DST execution unit 2 retrieves slice 3 from DST execution unit 2 memory at site 2, wherein slice 3 includes the first portion of record 8. The DST execution unit 2 initiates execution of a partial task on the first portion of record 8. A determination is made whether to pre-read the second portion of record 8 based on the mapping. DST execution unit 2 determines not to pre-read the second portion of record 8 when the second portion of record 8 is not readily available (e.g., stored at another site). As such, the execution of the partial task on the second portion of record 8 is left to DST execution unit 3.

A DST execution unit may retrieve a slice from a DST execution unit memory associated with the DST execution unit and determine to execute a partial task on a portion of the slice when the portion of the slice is associated with a subsequent portion of a record, wherein the record includes a previous portion that is stored in another DST execution unit memory at another site. For example, DST execution unit 3 retrieves slice 1 from the DST execution unit 3 memory. The DST execution unit 3 determines whether to execute a partial task on any portion of slice 1. The DST execution unit 3 determines to execute a partial task on the second portion of record 8 when the second portion of record 8 is not readily available to DST execution unit 2 associated with storing the first portion of record 8.

A DST execution unit may retrieve a slice from a DST execution unit memory associated with the DST execution unit and determine not to execute a partial task on a portion of the slice when the portion of the slice is associated with a subsequent portion of a record, wherein the record includes a previous portion that is stored in another DST execution unit memory at another site. For example, DST execution unit 2 retrieves slice 1 from the DST execution unit 2 memory. The DST execution unit 2 determines whether to execute a partial task on any portion of slice 1. The DST execution unit 2 determines not to execute a partial task on the second portion of record 5 when the second portion of record 5 is readily available to DST execution unit 1 associated with storing the first portion of record 5. The DST execution unit 2 determines to execute a partial task on a first portion of record 6 from slice 1.

Figure 47B:
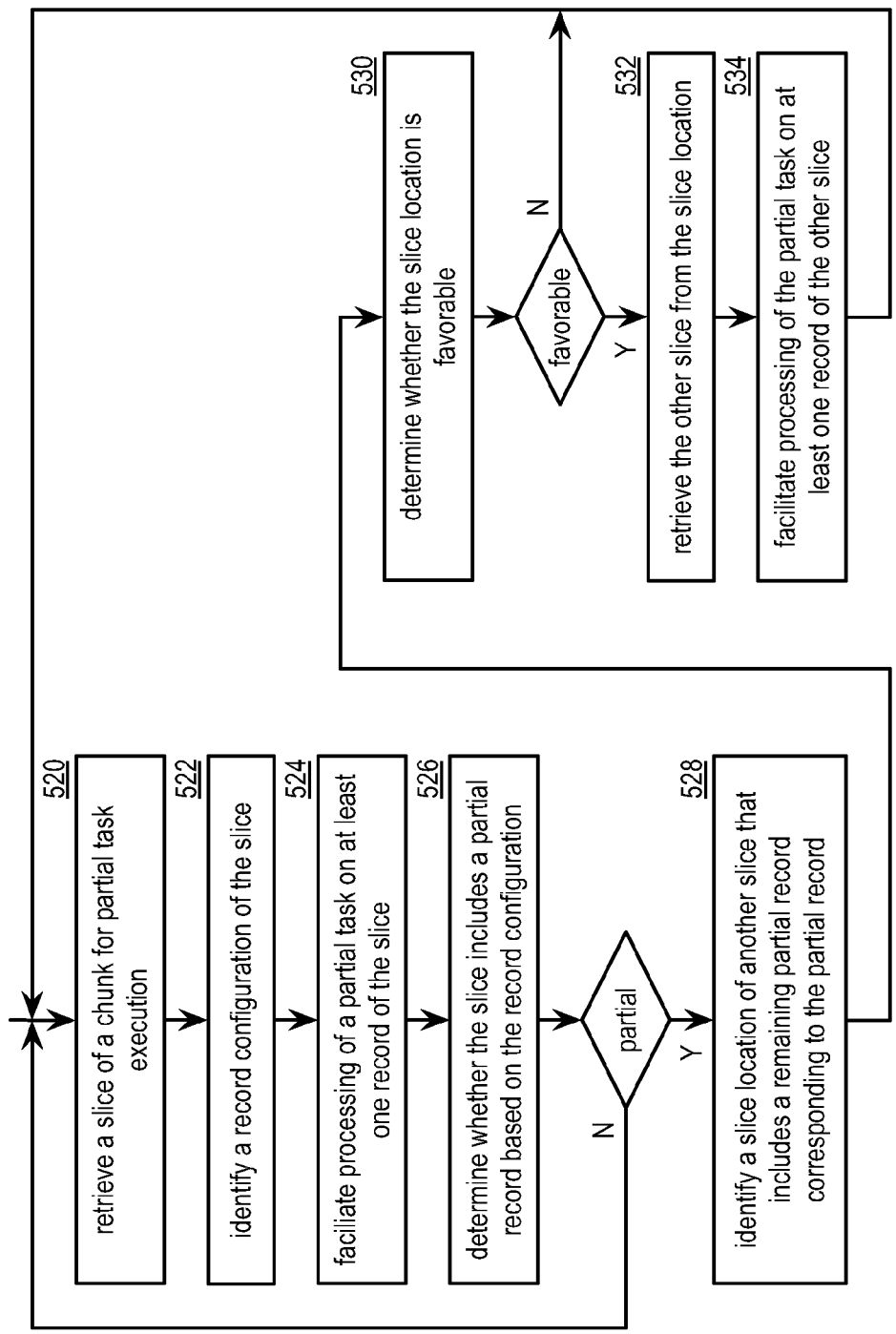
FIG. 47B is a flowchart illustrating an example of retrieving slices in accordance with the present invention.

FIG. 47B is a flowchart illustrating an example of retrieving slices. The method begins at step 520 where a processing module (e.g., of a dispersed task (DT) execution module) retrieves a slice of a chunk for execution of a partial task. The slice may include a next slice for execution of the partial task. The method continues at step 522 where the processing module identifies a record configuration of the slice (e.g., a mapping of the slice to at least one record). The identifying includes retrieving a mapping record, receiving the mapping record, and extracting mapping from the slice (e.g., searching for a record identifier). The method continues at step 524 where the processing module facilitates processing of a partial task on at least one record of the slice. The facilitating includes one or more of retrieving the partial task associated with the slice, queuing the slice for processing in accordance with the record configuration of the slice, and immediately executing the partial task.

The method continues at step 526 where the processing module determines whether the slice includes a partial record based on the record configuration of the slice. The method loops back to step 520 where the processing module retrieves a slice of a chunk for partial task execution to retrieve a next slice when the processing module determines that the slice does not include a partial record. The method continues to step 528 when the processing module determines that the slice does include a partial record.

The method continues at step 528 where the processing module identifies a slice location of another slice that includes a remaining partial record corresponding to the partial record. The slice location includes at least one of a next slice of the chunk when the slice is not a last slice of the chunk, a different chunk when the slice is the last slice of the chunk, another DST execution unit memory when a chunk map indicates that the chunk is assigned to another DST execution unit memory, and another site when the chunk map indicates that the chunk is assigned to a DST execution unit memory at the other site.

The method continues step 530 where the processing module determines whether the slice location is favorable. The determining may be based on one or more of the slice location, network performance, a predetermination, an estimated amount of time to retrieve the slice, and an estimated amount of time until processing may begin on the slice. For example, the processing module indicates that the slice location is favorable when the slices at a same site. As another example, the processing module indicates that the slice location is favorable when the slice is at another slice and there is enough time to retrieve the slice before processing of an associated partial task should begin. The method loops back to step 520 when the processing module determines that the slice location is unfavorable. The method continues to step 532 when the processing module determines that the slice location is favorable.

The method continues at step 532 where the processing module retrieves the other slice from the slice location (e.g., another slice of the chunk, another slice of another chunk from a common DST execution unit memory, another slice of another chunk from another DST execution unit memory and a common site). The method continues at step 534 where the processing module facilitates processing of the partial task on at least one record of the other slice. The facilitating includes at least one of queuing the slice for processing after other records of the slice in accordance with the record configuration of the slice and immediately processing the partial task on the at least one record.

Figure 48A:
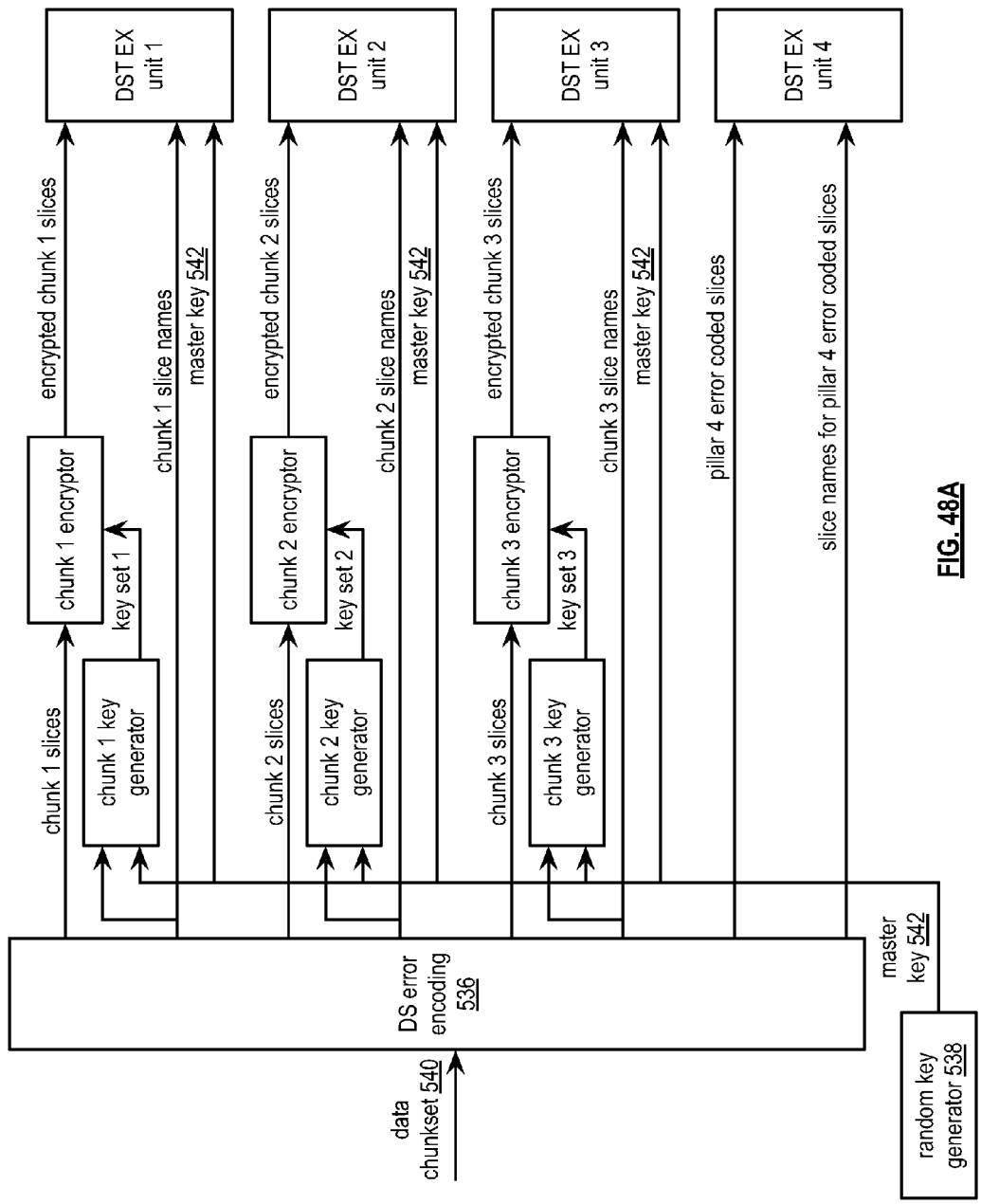
FIG. 48A is a schematic block diagram of an encoder system in accordance with the present invention.

FIG. 48A is a schematic block diagram of an encoder system. The encoder system includes one or more of a dispersed storage (DS) error encoding function 536, a random key generator 538, a set of dispersed storage and task execution units 1-4, a set of chunk 1-3 encryptors corresponding to DST execution units storing chunks, and a set of chunk 1-3 key generators corresponding to the set of chunk 1-3 encryptors. The encoder system is operable to encrypt chunks of a data chunkset 540 for storage as encrypted chunk slices in DST execution units associated with storing chunks of the set of DST execution units. The data chunkset 540 may include data for storage and additional authenticated data partitioned into a decode threshold number of chunks. The additional authenticated data may include one or more of a user identifier (ID), a nonce, a data version, a sequence number, a transaction number, a snapshot ID, a filename, a data ID, a timestamp, authentication information, a credential, and a vault ID.

The random key generator 538 is operable to generate a master key 542 by at least one of transforming a random number and retrieving a key. The DS error encoding 536 is operable to encode the data chunkset 540 utilizing a dispersed storage error coding function to produce a decode threshold number of chunks and a pillar with number minus the decode threshold number of corresponding error coded slices. For example, the DS error encoding 536 encodes the data chunkset 540 to produce three chunks and a fourth pillar of error coded slices. Each chunk includes one or more slices based on an amount of data of the data chunkset and a number of bytes per slice. For example, each chunk includes a number of bytes in accordance with an expression of number of chunk bytes=number of data chunkset sites divided by the decode threshold number. As such, the DS error encoding 536 encodes the data chunkset 540 to include chunk 1 slices, chunk 2 slices, chunk 3 slices, and pillar 4 error coded slices when the decode threshold is 3 and the pillar width is 4.

The DS error encoding 536 is further operable to generate slice names corresponding to each slice of each chunk and slice names corresponding to each error coded slice of the error coded slices in accordance with a vault identifier (ID) associated with the data chunkset and the pillar width number. For example, the DS error encoding 536 generates chunk 1 slice names corresponding to the chunk 1 slices, chunk 2 slice names corresponding to the chunk 2 slices, chunk 3 slice names corresponding to the chunk 3 slices, and slice names for the pillar 4 error coded slices.

Each chunk key generator of the set of chunk key generators is operable to generate a key set for each corresponding chunk, where the key set includes one or more keys corresponding to each slice of the corresponding chunk. For example, the chunk key generator may generate a common key as the key set. As another example, the chunk key generator may generate a unique key for each slice of the corresponding chunk. The generating includes transforming the master key 542 and a portion of corresponding chunk slice names utilizing a deterministic function to produce the key set. The portion of the corresponding chunk slice names includes at least one of a pillar number, a vault ID, a segment number, a block number, an object number, generation number, and a slice index. For example, the chunk key generator applies an exclusive OR (XOR) function on the master key 542 and the pillar number to produce an interim result and applies a mask generating function to the interim result to produce a common key as the key set. As another example, for each slice of the chunk, the chunk key generator applies the XOR function on the master key 542 and the segment number to produce an interim result and applies a mask generating function to the interim result to produce a corresponding key of the key set corresponding to a slice of the slices of the chunk.

Each chunk encryptor of the chunk encryptors is operable to encrypt each slice of the corresponding chunk utilizing a corresponding key of a corresponding key set to produce encrypted chunk slices. For example, chunk 1 encryptor encrypts a first slice of the chunk 1 slices utilizing a first key of key set 1 to produce a first slice of encrypted chunk 1 slices. As another example, chunk 3 encryptor encrypts a second slice of the chunk 3 slices utilizing a second key of key set 3 to produce a second slice of encrypted chunk 3 slices. The encrypted chunk slices, the chunk slice names, the master key, the error coded slices, and the slice names for the error coded slices are sent to the set of DST execution units for storage therein. For example, encrypted chunk 1 slices, chunk 1 slice names, and the master key is sent to DST execution unit 1 for storage therein. As another example, the pillar 4 error coded slices and the slice names for the pillar 4 error coded slices are sent to DST execution unit 4 for storage therein. Alternatively, or in addition to, the master key 542 is encoded utilizing the dispersed storage error coding function to produce a set of encoded master key slices and the set of encoded master key slices are sent to the set of DST execution units for storage therein.

Figure 48B:
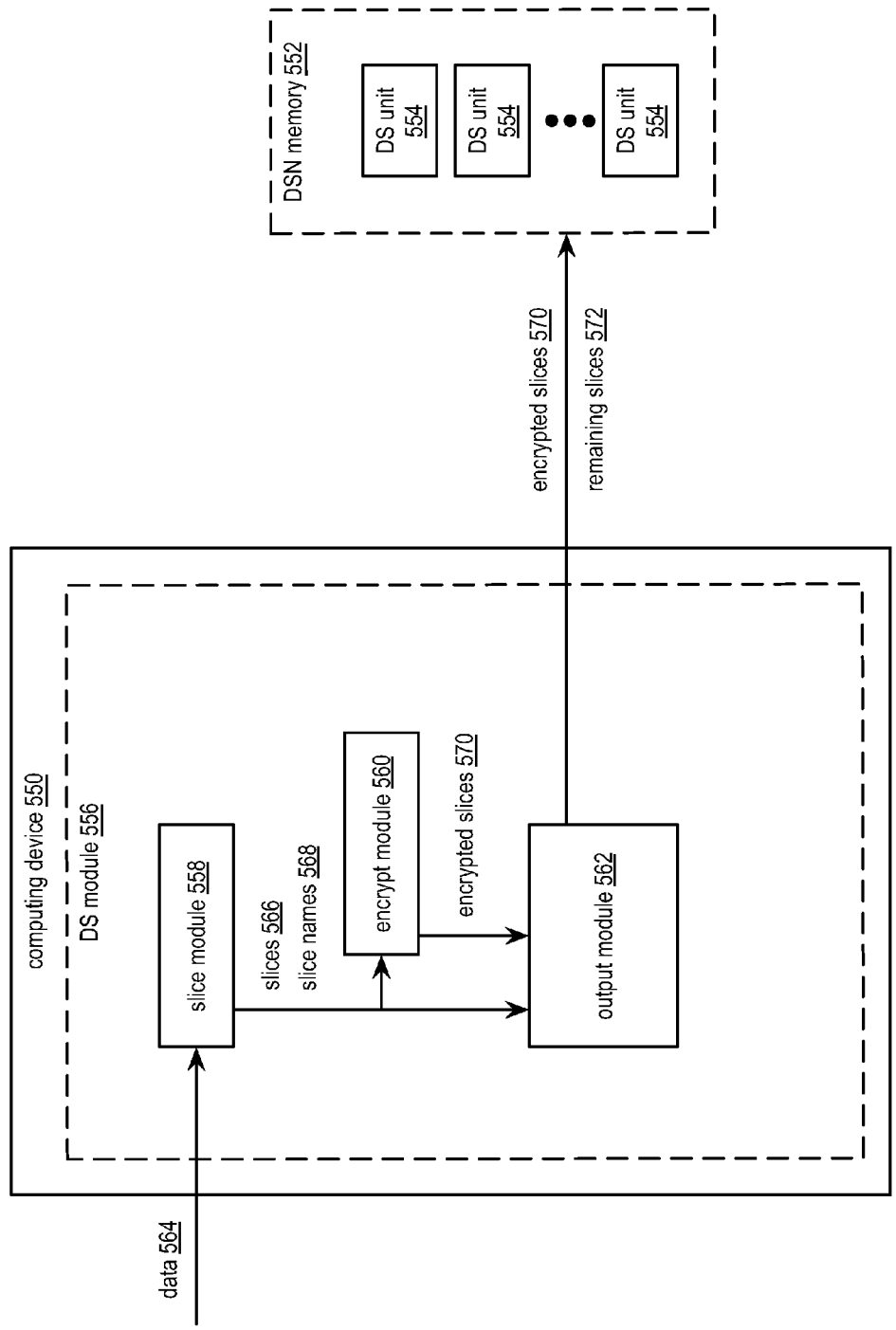
FIG. 48B is a schematic block diagram of a dispersed storage system in accordance with the present invention.

FIG. 48B is a schematic block diagram of a dispersed storage system that includes a computing device 550 and a dispersed storage network (DSN) memory 552. The DSN memory 552 may be implemented utilizing one or more of a distributed storage and task network (DSTN), a DSTN module, a plurality of storage nodes, one or more dispersed storage (DS) unit sets, and a plurality of dispersed storage (DS) units 554. Each DS unit 554 may be implemented utilizing at least one of a storage server, a storage unit, a storage module, a memory device, a memory, a distributed storage and task (DST) execution unit, a user device, a DST processing unit, and a DST processing module. The computing device 550 may be implemented utilizing at least one of a server, a storage unit, a DSTN managing unit, a DSN managing unit, a DS unit 554, a storage server, a storage module, a DS processing unit, a DST execution unit, a user device, a DST processing unit, and a DST processing module. For example, computing device 550 is implemented as the DST processing unit. The computing device 550 includes a dispersed storage (DS) module 556. The DS module 556 includes a slice module 558, an encrypt module 560, and an output module 562.

The system functions to encode data 564 to produce slices 566, encrypt the slices 566 to produce encrypted slices 570, and store the encrypted slices 570 in the DSN memory 552. With regards to encoding the data 564, the slice module 558 performs a series of slicing steps. In a first slicing step, the slice module 558 divides the data 564 into a plurality of data segments. The slice module 558 divides the data 564 in accordance with a segmentation scheme such that encoded data slices of a common pillar of adjacent data segments include contiguous data portion of the data 564. For a data segment of the plurality of data segments, in a second slicing step, the slice module 558 encodes the data segment using a dispersed storage error encoding function to produce the set of encoded data slices 566. Each slice may be associated with a slice grouping of encoded data slices of a common pillar of other data segments and includes one or more encoded data slices of a data chunk. The encoding includes arranging an encoding matrix and encoding to produce encoded data slices of contiguous bytes of the data portion. In a third slicing step, the slice module 558 generates slice names 568 for each encoded data slice of the set of encoded data slices 566 to produce a plurality of slice names 568, where a slice name 568 of the plurality of slice names 568 includes a data identifier, a data segment identifier, and an encoded slice identifier. The slice name 568 may further include at least one of identity of a target storage node (e.g., DS unit 554) of the DSN memory 552, a security identifier, a random number, a revision level number, and a transaction number.

With regards to encrypting the slices 566 to produce encrypted slices 570, the encrypt module 560 is operable to select a subset of encoded data slices (e.g., a decode threshold number) as a first type of encoded data slices of the set of encoded data slices 566, where the data segment was encoded utilizing a dispersed storage error encoding matrix that includes a unity matrix section. The set of encoded data slices 566 includes the first type of encoded data slices and a second type of encoded data slices, where the first type of encoded data slices corresponds to the unity matrix section and the second type of encoded data slices corresponds to another section of the dispersed storage error encoding matrix. Alternatively, the encrypt module 560 selects the subset of encoded data slices as a third type of encoded data slices of the set of encoded data slices 566, where the set of encoded data slices 566 includes the third type of encoded data slices and a fourth type of encoded data slices, where the third type of encoded data slices includes encoded data slices based on data blocks and the fourth type of encoded data slices includes encoded data slices based on data blocks and auxiliary blocks.

The encrypt module 560 may determine to encrypt the subset of encoded data slices based on one or more of a predetermination, a request, a query result, a sensitivity level of the data, and a vulnerability level of the DSN memory 552. When the subset of encoded data slices of the set of encoded data slices 566 is to be encrypted, the encrypt module 560 performs a series of encryption steps. In a first encryption step, the encrypt module 560 generates a master key. The encrypt module 560 generates the master key based on one or more of a random number, an identifier of the data chunk slice grouping, a lookup, and a private key of a public-private key pair. In a second encryption step, the encrypt module 560 selects a portion of the slice names 568 for the subset of encoded data slices to produce a subset of selected slice name portions. The encrypt module 560 selects the portion of the slice names based on one or more of a predetermination, a request, a query result, the sensitivity level of the data, a required encryption level, and the vulnerability level of the DSN memory 552. In a third encryption step, the encrypt module 560 generates a subset of encryption keys based on the master key and the subset of selected slice name portions. The encrypt module 560 generates the subset of encryption keys by applying a deterministic function to the master key and the subset of selected slice name portions. The deterministic function includes one or more of a hashing function, a mask generating function, a hash based message authentication code, and a sponge function. The encrypt module 560 generates at least one key for slices of the data chunk and as many as one key per encoded data slice.

The encrypt module 560 generates an encryption key based on the master key and a data identifier as the subset of encryption keys for each of the plurality of data segments when the encrypt module 560 selects the data identifier as the portion of the slice names. The encrypt module 560 generates the encryption key based on the master key and the data segment identifier as the subset of encryption keys for the data segment when the encrypt module 560 selects the data segment identifier as the portion of the slice names. The encrypt module 560 generates the subset of encryption keys based on the master key and each encoded data slice identifier of the subset of encoded data slices when the encrypt module 560 selects the encoded slice identifier as the portion of the slice names. The encrypt module 560 generates the subset of encryption keys based on the master key and each pillar number of the subset of encoded data slices when the encrypt module 560 selects a pillar number as the portion of the slice names, where the slice name further includes the pillar number. In a fourth encryption step, the encrypt module 560 encrypts the subset of encoded data slices using the subset of encryption keys to produce a subset of encrypted encoded data slices 570. The encrypt module 560 may encrypt the entire data chunk slice grouping at once or encrypt each encoded data slice one at a time using a common encryption key for all slices or a different key for each encoded data slice.

With regards to storing the encrypted slices 570 in the DSN memory 552, the output module 562 performs a series of output steps. In a first output step, the output module 562 outputs the subset of encrypted encoded data slices 570 to the DSN memory 552 for storage therein. The outputting may include the output module 562 identifying DS units (e.g., storage units) 554 of the DSN memory 552 requiring a higher security than other storage units 554 of the DSN memory 552 (e.g., more publicly accessible, less hacker protection, etc.) and selecting the subset of encoded data slices as being targeted for storage in the storage units requiring higher security. In a second output step, the output module 562 outputs remaining encoded data slices 572 of the set of encoded data slices 566 to the DSN memory 552 for storage therein.

Figure 48C:
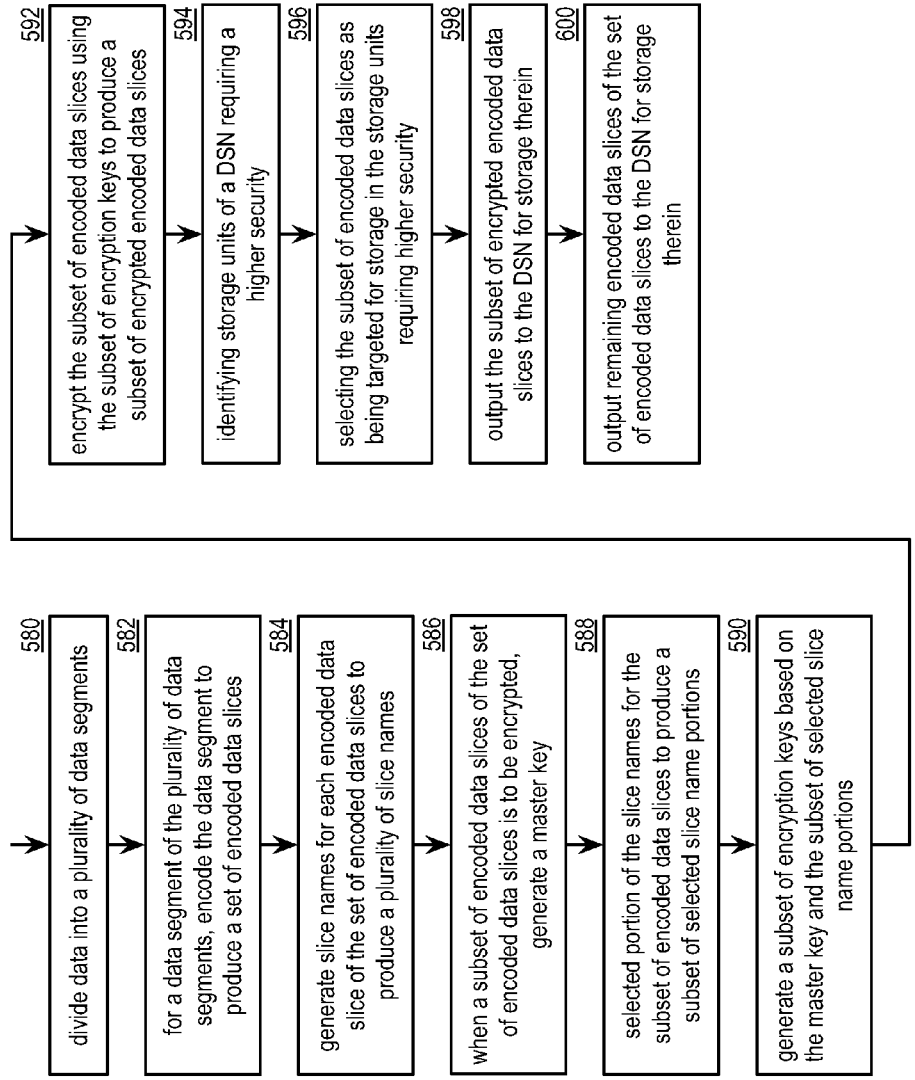
FIG. 48C is a flowchart illustrating an example of encrypting slices in accordance with the present invention.

FIG. 48C is a flowchart illustrating an example of encrypting slices. The method begins at step 580 where a processing module (e.g., of a distributed storage and task processing module) divides data into a plurality of data segments (e.g., in accordance with a data segmentation scheme such that encoded data slices of a common pillar of adjacent data segments include contiguous data. For a data segment of the plurality of data segments, the method continues at step 582 where the processing module encodes the data segment using a dispersed storage error encoding function to produce a set of encoded data slices. The method continues at step 584 where the processing module generates slice names for each encoded data slice of the set of encoded data slices to produce a plurality of slice names, where a slice name of the plurality of slice names includes a data identifier, a data segment identifier, and an encoded slice identifier. The slice name may further include at least one of identity of a target storage node of the DSN, a security identifier, a random number, a revision level number, and a transaction number.

When a subset (e.g., a decode threshold number) of encoded data slices of the set of encoded data slices is to be encrypted, the method continues at step 586 where the processing module generates a master key. The generating may be based on one or more of a random number, an identifier of the data chunk slice grouping, a lookup, and a private key of a public-private key pair. The processing module may select the subset of encoded data slices as a first type of encoded data slices of the set of encoded data slices, where the data segment was encoded utilizing a dispersed storage error encoding matrix that includes a unity matrix section. The set of encoded data slices includes the first type of encoded data slices and a second type of encoded data slices, where the first type of encoded data slices corresponds to the unity matrix section and the second type of encoded data slices corresponds to another section of the dispersed storage error encoding matrix. Alternatively, the processing module may select the subset of encoded data slices as a third type of encoded data slices of the set of encoded data slices, where the set of encoded data slices includes the third type of encoded data slices and a fourth type of encoded data slices. The third type of encoded data slices includes encoded data slices based on data blocks and the fourth type of encoded data slices includes encoded data slices based on data blocks and auxiliary blocks.

The method continues at step 588 where the processing module selects a portion of the slice names for the subset of encoded data slices to produce a subset of selected slice name portions. The processing module may select one of the data identifier, the data segment identifier, the encoded slice identifier, and a pillar number as the portion of the slice names. The method continues at step 590 where the processing module generates a subset of encryption keys based on the master key and the subset of selected slice name portions. The processing module may generate the subset of encryption keys by performing a deterministic function on the master key and the subset of selected slice name portions. For example, the processing module performs a modulo addition of the master key and the subset of selected slice name portions to produce the subset of encryption keys.

The processing module generates an encryption key based on the master key and the data identifier as the subset of encryption keys for each of the plurality of data segments when the processing module selects the data identifier as the portion of the slice names. The processing module generates the encryption key based on the master key and the data segment identifier as the subset of encryption keys for the data segment when the processing module selects the data segment identifier as the portion of the slice names. The processing module generates the subset of encryption keys based on the master key and each of the encoded data slice identifiers of the subset of encoded data slices when the processing module selects the encoded slice identifier as the portion of slice names. The processing module generates the subset of encryption keys based on the master key and each of the pillar numbers of the subset of encoded data slices when the processing module selects the pillar number as the portion of the slice names, where the slice name further includes the pillar number.

The method continues at step 592 where the processing module encrypts the subset of encoded data slices using the subset of encryption keys to produce a subset of encrypted encoded data slices. The processing module encrypts the entire data chunk slice grouping at once or encrypts each encoded data slice one at a time using a common encryption key for all encoded data slices or a different encryption key for each encoded data slice. The method continues at step 594 where the processing module identifies storage units of a dispersed storage network (DSN) requiring a higher security than other storage units of the DSN. The identifying may be based on one or more of a lookup, a request, a query, and an error message.

The method continues at step 596 where the processing module selects the subset of encoded data slices as being targeted for storage in the storage units requiring higher security. The selecting may be based on one or more of an accessibility level, a predetermination, a lookup, an error message, and intrusion detection susceptibility level, and a request. The method continues at step 598 where the processing module outputs the subset of encrypted encoded data slices to the DSN for storage therein. The method continues at step 600 where the processing module outputs remaining encoded data slices of the set of encoded data slices to the DSN for storage therein.

Figure 48D:
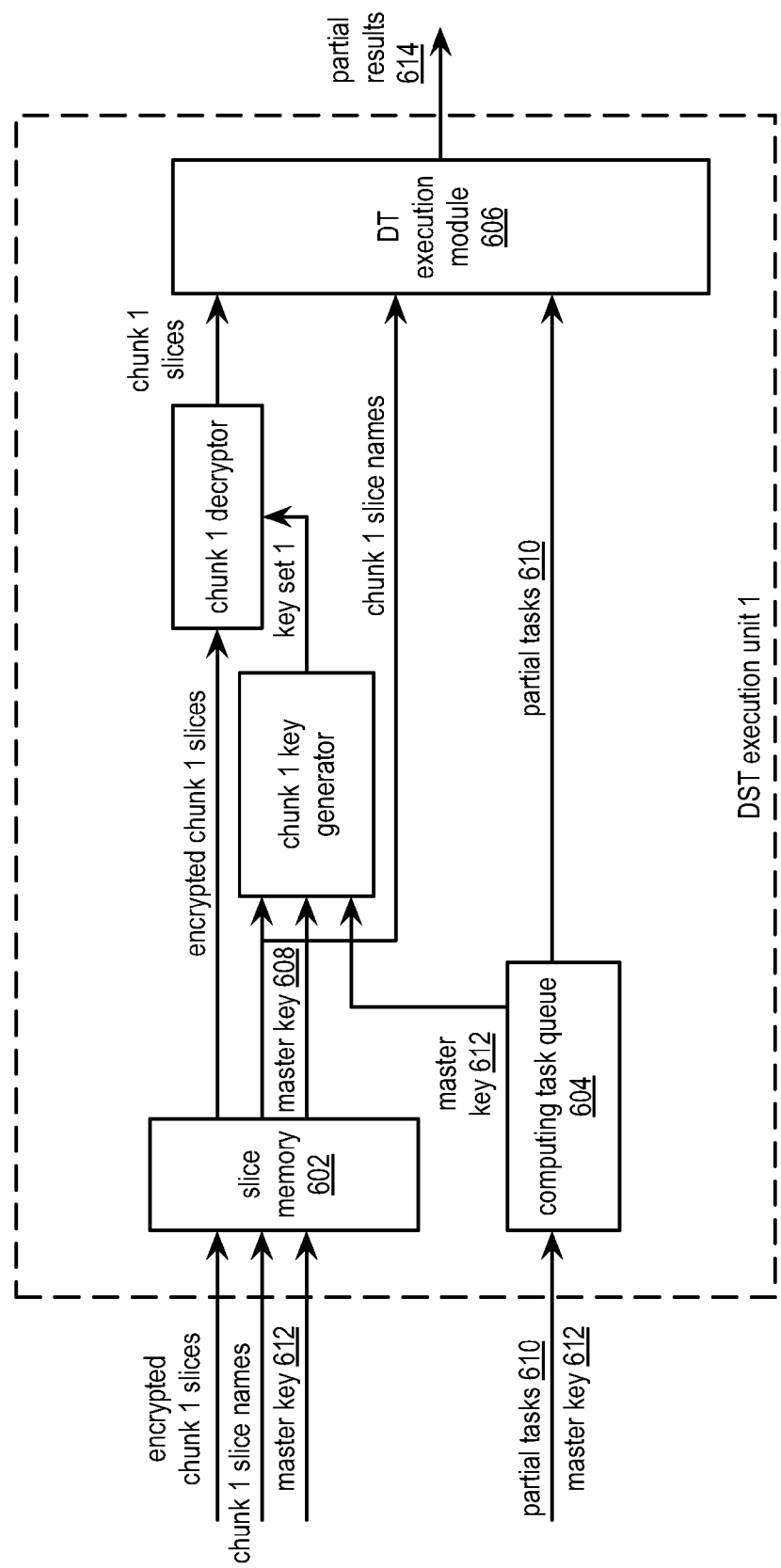
FIG. 48D is a schematic block diagram of a DST execution unit with a decoder function in accordance with the present invention.

FIG. 48D is a schematic block diagram of a decoder system. The data decoder system includes a dispersed storage and task (DST) execution unit 1 of a set of DST execution units 1-n that is operable to retrieve encrypted chunk 1 slices, obtain partial tasks 610 associated with the encrypted chunk 1 slices, decrypt the encrypted chunk 1 slices to produce chunk 1 slices, and execute one or more of the partial tasks 610 on the chunk 1 slices to produce partial results. The DST execution unit 1 includes a slice memory 602, a computing task queue 604, a chunk 1 key generator, a chunk 1 encryptor, and a distributed task (DT) execution module 606.

The computing task queue 604 may be implemented using a memory device and is operable to receive and store the partial tasks 610 and receive a master key. The slice memory 602 is operable to receive and store the encrypted chunk 1 slices, chunk 1 slice names, and the master key 612. The chunk 1 key generator is operable to recover a key set 1 based on the master key 612 and the chunk 1 slice names. The regenerating includes retrieving the chunk 1 slice names from the slice memory 602 and retrieving the master key 612 from at least one of the slice memory six are to and the computing task queue 604.

The regenerating includes transforming the master key 612 and a portion of the chunk 1 slice names utilizing a deterministic function to produce the key set 1. The portion of the corresponding chunk 1 slice names includes at least one of a pillar number associated with chunk 1 (e.g., pillar 1), a vault ID, a segment number, a block number, an object number, generation number, and a slice index. For example, the chunk 1 key generator applies an exclusive OR (XOR) function on the master key six and 12 and the pillar number to produce an interim result and applies a mask generating function to the interim result to produce a common key as the key set 1. As another example, for each slice of the encrypted chunk 1 slices, the chunk 1 key generator applies the XOR function on the master key 612 and the segment number of the encrypted slice to produce an interim result and applies a mask generating function to the interim result to produce a corresponding key of the key set 1.

The chunk 1 decryptor is operable to decrypt the encrypted chunk 1 slices utilizing the key set 1 to produce chunk 1 slices. For example, the chunk 1 decryptor decrypts a first encrypted slice of the encrypted chunk 1 slices utilizing a first key of the key set 1 to produce a first slice of the chunk 1 slices. As another example, the chunk 1 decryptor decrypts each encrypted slice of the encrypted chunk 1 slices utilizing a common key of the key set 1 to produce the chunk 1 slices.

DT execution module 606 is operable to obtain the partial tasks 610 from the computing task queue 604, obtain the chunk 1 slice names from the slice memory 602, obtain the chunk 1 slices from the chunk 1 decryptor, and execute one or more of the partial tasks 610 on one or more of the chunk 1 slices to produce partial results 614. In addition, the DT execution module 606 may output the partial results 614 to a requesting entity.

Figure 48E:
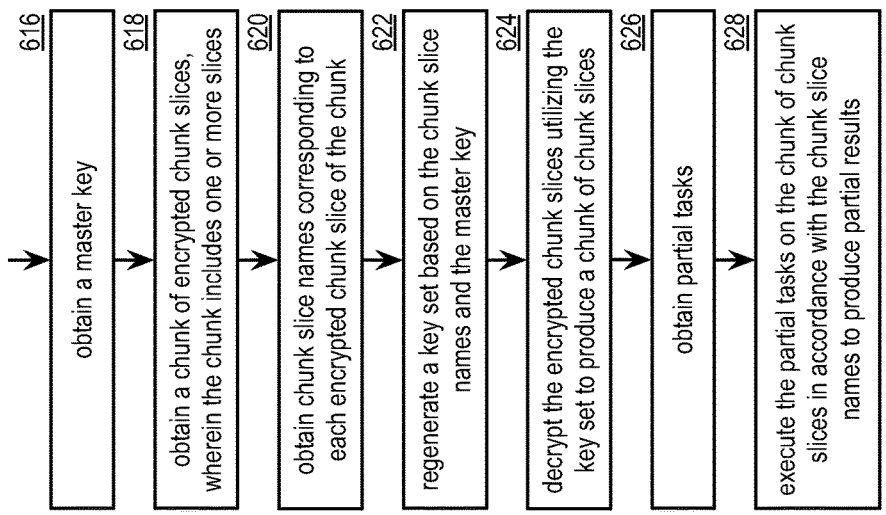
FIG. 48E is a flowchart illustrating an example of decrypting slices in accordance with the present invention.

FIG. 48E is a flowchart illustrating an example of decrypting slices. The method begins at step 616 where a processing module (e.g., of a dispersed storage and task (DST) execution unit) obtains a master key (e.g., retrieves from memory, receives from an encoding system, recovers from a dispersed storage network). The method continues at step 618 where the processing module obtains a chunk of encrypted chunk slices, where the chunk includes one or more slices. The obtaining includes at least one of receiving from an encoding system and retrieving from a slice memory. The method continues at step 620 where the processing module obtains chunk slice names corresponding to each encrypted chunk slice of the chunk. The obtaining includes at least one of receiving from the encoding system and retrieving from the slice memory.

The method continues at step 622 where the processing model regenerates a key set based on the chunk slice names and the master key. The regeneration may be in accordance with a key generation scheme, where the key generation scheme indicates whether to utilize a common key of the key set or an individual key of the key set for each slice of the chunk of encrypted chunk slices. For each key of the key set, the regenerating includes performing a deterministic function on one or more of a portion of a slice name and the master key to regenerate the key.

The method continues at step 624 where the processing module decrypts the encrypted chunk slices utilizing the key set to produce a chunk of chunk slices. For each encrypted slice, the decrypting includes decrypting the encrypted slice utilizing a corresponding key of the key set to produce a corresponding slice of the chunk slices. The method continues at step 626 where the processing module obtains partial tasks. The obtaining includes retrieving the partial tasks from a computing task queue and receiving the partial tasks from a DST client module. The method continues at step 628 where the processing module executes the partial tasks on the chunk of chunk slices in accordance with the chunk slice names to produce partial results.

FIG. 49A is a diagram illustrating an example of identifying stored chunks within a distributed storage and task (DST) execution unit 1 memory of a set of DST execution unit memories 1-n. The DST execution unit 1 memory includes storage of a plurality of chunks and a chunk storage location table 630. Each chunk of the plurality of chunks includes at least one slice. For example, a chunk 1 of a chunkset 1 includes a slice a, a slice b, and a slice c. Each chunk of the plurality of chunks is associated with a unique chunk identifier (ID). Each chunk ID includes a number of bits of a chunk ID field. For example, the chunk ID field includes 48 bytes when over 10^115 unique chunk identifiers are required to provide a system security improvement. For instance, the chunk 1 of the chunkset 1 is associated with a chunk ID of F4A7310B58 when the chunk ID with is 40 bits in length. Each slice of each chunk is associated with a unique slice name. For each chunk, the chunk storage location table six and 30 is utilized to store a corresponding chunk entry. Each chunk entry includes a chunk ID of the chunk and for each slice of one or more slices associated with the chunk, a slice name and a slice storage location. The slice storage location includes an indicator as to where a slice associated with the slice name is stored within the DST execution unit memory (e.g., a memory device ID, an offset within a memory device of the memory device ID, an address within the memory device, a disk sector, a module ID). The chunk storage location table six and 30 may be populated with entries when one of more slices of one or more chunks are received for storage within the DST execution unit memory FIG. 49B is a diagram illustrating an example of a chunk storage location table six and 30 that includes a plurality of chunk entries corresponding to a plurality of chunks stored within a distributed storage and task execution unit memory. Each chunk entry of the plurality of chunk entries includes a chunk identifier (ID) field 632, a slice name field 634, and a slice storage location field 636. The chunk ID field 632 includes a chunk ID entry corresponding to a chunk of the chunk entry. The slice name field 634 includes one or more slice name entries corresponding to one or more slices associated with the chunk of the chunk entry. The slice storage location field 636 includes a corresponding one or more slice storage location entries that correspond to the one or more slices associated with the chunk of the chunk entry. For example, a chunk associated with a chunk ID of F4A7310B58 includes three slices with corresponding slice names of a, b, and c. A slice of the three slices that corresponds to the slice name of a is stored at a slice storage location of F528, a slice of the three slices that corresponds to the slice name of b is stored at a slice storage location of F560, and a slice of the three slices that corresponds to the slice name of c is stored at a slice storage location of F5E0.

The chunk storage location table 630 may be utilized to facilitate slice access based on a chunk ID. For example, a partial task request includes a partial task and a chunk ID to identify slices for performing the partial task. In an example of operation, a partial task request is received, a received chunk ID is extracted, and the received chunk ID is compared to one or more chunk IDs within the chunk storage location table 630 to determine whether a corresponding chunk is stored within an associated DST execution unit. When the received chunk ID matches at least one of the one or more chunk IDs within the chunk storage location table 630, slices associated with the chunk ID are retrieved from corresponding slice storage locations and a partial task of the partial task request is performed on the slices to produce partial results. When the received chunk ID does not match at least one of the one or more chunk IDs within the chunk storage location table, an alternative partial result is generated. The alternative partial result includes at least one of an error message, random data, and a response code indicating that the chunk ID is not stored within the DST execution unit.

Figure 49C:
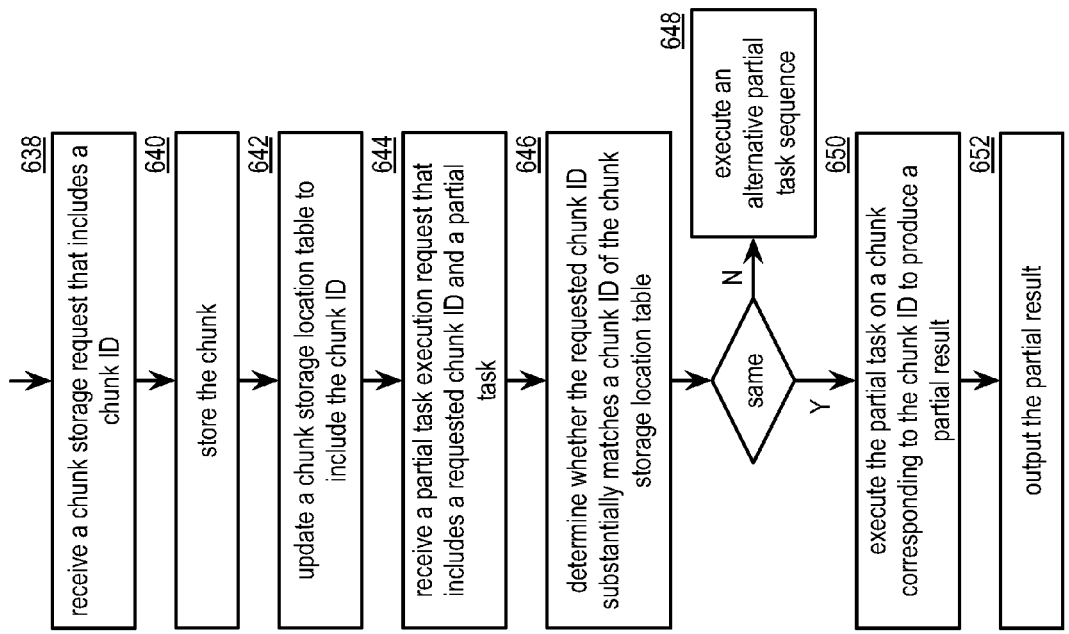
FIG. 49C is a flowchart illustrating an example of processing a partial task request in accordance with the present invention.

FIG. 49C is a flowchart illustrating an example of processing a partial task request. The method begins with step 638 where a processing module (e.g., of a dispersed storage and task (DST) execution unit) receives a chunk storage request that includes a chunk identifier (ID). The chunk storage request includes one or more of the chunk ID, one or more slices, and one or more slice names corresponding to the one or more slices. The method continues at step 640 where the processing module stores the chunk. The storing includes determining one or more storage locations (e.g., within the DST execution unit) for the one or more slices and storing the one or more slices at the one or more storage locations.

The method continues at step 642 where the processing module updates a chunk storage location table to include the chunk ID. For each slice of the one more slices, the chunk storage location table is updated to include the chunk ID, a slice name corresponding to the slice and a storage location corresponding to storage of the slice. The method continues at step 644 where the processing module receives a partial task execution request that includes a requested chunk ID and a partial task.

The method continues at step 646 where the processing module determines whether the requested chunk ID substantially matches a chunk ID of the chunk storage location table. The determining includes accessing the chunk storage location table and comparing each chunk ID stored in the chunk storage location table with the requested chunk ID. The method branches to step 650 when the processing module determines that the requested chunk ID substantially matches the chunk ID of the chunk storage location table. The method continues to step 648 when the processing module determines that the requested chunk ID does not substantially match the chunk ID of the chunk storage location table. The method continues at step 648 where the processing module executes an alternative partial task sequence. The alternative partial task sequence includes at least one of generating and sending an error message to a requesting entity, requesting authentication of the requesting entity, and generating a random partial result and sending the random partial result to the requesting entity.

The method continues at step 650 where the processing module executes the partial task on a chunk corresponding to the chunk ID to produce a partial result when the requested chunk ID substantially matches the chunk ID of the chunk storage location table. The executing includes one or more of identifying one or more slices corresponding of the chunk (e.g., extracting slice names from an entry of the chunk storage location table corresponding to the chunk ID), retrieving each of the one or more slices (e.g., by identifying slice storage locations corresponding to the one or more identified slices and retrieving the one or more slices from the identified slice storage locations), and executing the partial task on the one more slices in accordance with the partial task to produce a partial result. The method continues at step 652 where the processing module outputs the partial result (e.g., sends the partial result to the requesting entity).

Figure 50A:
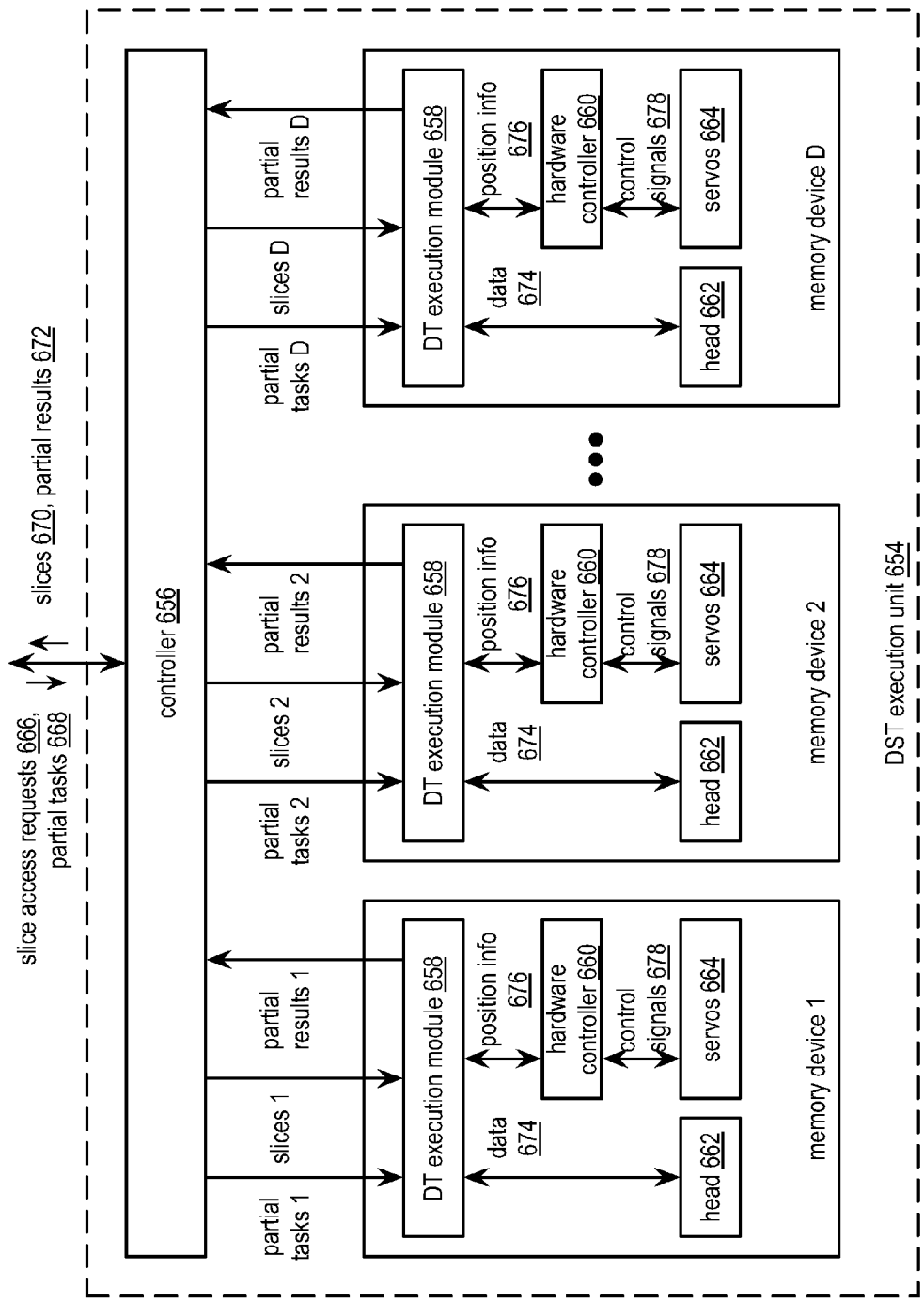
FIG. 50A is a schematic block diagram of another embodiment of a distributed storage and task (DST) execution unit in accordance with the present invention.

FIG. 50A is a schematic block diagram of another embodiment of a distributed storage and task (DST) execution unit 654 that includes a controller 656 and a plurality of memory devices 1-D. Each memory device of the plurality of memory devices 1-D includes a distributed task (DT) execution module 658, a hardware controller 660, a head 662, and servos 664 when the memory device is operational to store and retrieve data utilizing at least one of a magnetic medium (e.g., hard disc) and an optical medium (e.g., a Blu-Ray disc).

The controller 656 functions to receive slice access requests 666 and partial tasks 668 from a network, to facilitate processing of the slice access requests 666 and partial tasks 668 by one or more DT execution modules of the plurality of memory devices 1-D to produce slices 670 and partial results 672, to receive the slices 670 and partial results 672 from the plurality of memory devices 1-D, and to output the slices 670 and partial results 672 to the network. The controller 656 may be implemented utilizing one or more computing cores.

For each memory device of the plurality of memory devices 1-D, a corresponding DT execution module 658 functions to control the at least one of the magnetic medium and the optical medium and to process one or more partial tasks 668 associated with the memory device. The controlling includes facilitating storage of one or more slices 670 assigned to the memory device within the at least one of the magnetic medium and the optical medium and facilitating storage of one or more partial tasks 668 assigned to the DT execution module 658 corresponding to one or more slices 670 within the at least one of the magnetic medium and the optical medium. The processing of the one or more partial tasks 668 includes facilitating retrieval of at least one slice assigned to the memory device, retrieving a corresponding partial task 668 assigned to the DT execution module 658, performing the partial task 668 on the at least one slice to produce a partial result 672, and outputting the partial result 672 to the controller 656.

The DT execution module 658 is further operable to control the at least one of the magnetic medium and the optical medium by generating data 674 for the head 662 and position information 676 for the hardware controller 660 based on storage location information for the data 674. The data 674 includes one or more of a slice, a slice name, a chunk, a chunk identifier (ID), slice location table information, and a partial task. The position information 676 includes at least one of a drive identifier (ID) and sector numbers associated with the at least one of the magnetic medium and the optical medium. The DT execution module 658 is further operable to control the at least one of the magnetic medium and the optical medium by receiving data 674 from the head 662 and position information 676 from the hardware controller 660. The hardware controller 660 is operable to convert position information 676 into control signals 678 (e.g., disk speed, head position) to operate the servos 664. The servos 664 operate disk drive technology including spinning a disc past the head 662 and moving a position of the head 662. The head 662 is operable to convert data 674 into magnetic or optical signals for transfer to a disk and detects magnetic or optical signals from the disk to convert into data 674.

The DT execution module 658 is further operable to access a slice location table to store and retrieve slice table information to further facilitate storing data 674 and retrieving data 674. The slice table information includes one or more of slice names, memory device IDs, drive IDs, and position information. For example, the slice location table may include slice table information such that an entry indicates that a data slice associated with slice name 457 is stored at memory device 1_2, drive 3, at sector 7,050 through sector 11,600. The DT execution module 658 may store the slice table information in memory of the memory device and an internal memory associated with the DT execution module 658.

In a slice storage example of operation, the controller 656 receives the slice and forwards the slice to a DT execution module 658 of a memory device 2 when memory device 2 is associated with a slice name corresponding to the slice. The DT execution module 658 receives the slice from the controller 656 and accesses the slice location table to identify an available position within a disc associated with memory device 2. The DT execution module 658 creates a new slice location table entry that includes one or more of the slice name, integrity information of the slice, a memory device ID, a drive ID, and position information. The DT execution module 658 stores the new slice location table entry in the slice location table. The DT execution module 658 outputs the slice as data 674 to a head 662 of memory device 2 and outputs position information 676 corresponding to the available position to a hardware controller 660 of memory device 2. The hardware controller 660 produces control signals 678 based on one or more of the position information 676 and current position information 676 interpreted from a control signal 678 of a current position of the head 662 to operate servos 664 to spin the disc past the head 662 such that the head 662 writes the slice as data to the disc to store the slice. A partial task may be stored in a similar manner. Subsequent retrieval of the slice and partial task may be accomplished in a similar manner reversing the order of the steps described above. For example, receive a retrieval request, access the slice location table to identify a storage location, control the servos for the location, read the slice or partial task as data from the head. Next, the DT execution module 658 may perform the partial task on the slice to produce the partial result 672.

FIG. 50B is a flowchart illustrating another example of processing a partial task request. The method begins at step 680 where a processing module (e.g., of a controller of a dispersed storage and task (DST) execution unit) receives a partial task requests that includes one or more partial tasks associated with a plurality of slices. The request may include one or more partial tasks, the plurality of slices, slice names associated with the plurality of slices, and a chunk identifier (ID) corresponding to the plurality of slices.

For each slice of the relative slices to be processed with at least one partial task of the one or more partial tasks, the method continues at step 682 where the processing module selects a memory device to execute the processing of the slice. The selecting includes at least one of selecting a memory device such that the plurality of slices are already stored on the memory device and selecting an available memory device when the plurality of slices have not been stored yet. For example, the processing module selects the available memory device as a memory device with sufficient storage space to store the plurality of slices.

For each slice to be processed, the method continues at step 684 where the processing module sends the at least one partial task of the one or more partial tasks to the memory device. The sending includes outputting the slice to the memory device when the slice has not been previously stored in the memory device. For each slice to the process, the method continues at step 686 where the processing module receives at least one partial result from the memory device FIG. 50C is a flowchart illustrating another example of processing a partial task request. The method begins at step 688 where a processing module (e.g., of a distributed task (DT) execution module of a memory device of a dispersed storage and task (DST) execution unit) receives a slice for storage and partial task processing. The method continues at step 690 where the processing module stores the slice in a memory utilized to store a plurality of slices. The method continues at step 692 where the processing module receives at least one partial task associated with at least one slice of the plurality of slices. The method continues at step 694 where the processing module identifies a slice associated with the at least one partial task. For example, the processing module extracts a slice name from the partial task. As another example, the processing module extracts a chunk identifier (ID) from the partial task.

The method continues at step 696 where the processing module retrieves the slice associated with the at least one partial task to produce a retrieved slice. For example, the processing module controls a memory device servo to access the slice via a head of the memory device. The method continues at step 698 where the processing module executes the at least one partial task on the retrieved slice to produce a partial result. The method continues at step 700 where the processing module outputs the partial result. For example, a processing module sends the partial result to a controller of the DST execution unit. As another example, the processing module outputs the partial result to a requesting entity via the controller of the DST execution unit.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A method for dispersed storage error encoding data by a computing device, the method comprises:
generating, by the computing device, a data matrix from the data, wherein the data matrix includes a plurality of columns and a plurality of rows, a column of the plurality of columns is based on data size and a row of the plurality of rows is based on a data grouping;
generating, by the computing device, a chunkset data matrix, wherein generating, by the computing device, the chunkset data matrix comprises:
selecting, by the computing device, a row of the data matrix;
dividing, by the computing device, the data grouping of the selected row into a decode threshold number of data sub-groupings;
determining the selected number of data blocks based on a desired data size for a data block of the selected number of data blocks in accordance with a desired level of reliability performance;
dividing, by the computing device, each of the decode threshold number of data sub-groupings into the selected number of data blocks; and
arranging, by the computing device, the selected number of data blocks of the decode threshold number of data sub-groupings into the chunkset data matrix;
matrix multiplying, by the computing device, the chunkset data matrix by an encoding matrix to produce a chunkset slice matrix, wherein a row of the chunkset slice matrix corresponds to an encoded data slice and wherein the plurality of rows of the chunkset slice matrix corresponds to a set of encoded data slices, wherein a decode threshold number of encoded data slices of the set of encoded data slices is needed to recover the data grouping associated with the one or more rows of the data matrix.

2. The method of claim 1, wherein the generating, by the computing device, the data matrix comprises:
obtaining, by the computing device, the data, which includes a plurality of data groups;
determining, by the computing device, a data length for a data chunkset based on size of one or more data groups of the plurality of data groups;
arranging, by the computing device, the plurality of data groups into data chunksets based on the data length;
determining, by the computing device, whether data padding is needed for one or more of the data chunksets; and
when data padding is needed for one or more of the data chunksets, adding, by the computing device, data padding to the data one or more of the data chunksets such that each of the data chunksets is of a substantially similar data length.

3. The method of claim 1, wherein the matrix multiplying, by the computing device, comprises:
selecting, by the computing device, a column of the chunkset data matrix to produce a selected column of the chunkset data matrix;
matrix multiplying, by the computing device, the selected column of the chunkset data matrix by the encoding matrix to produce a column of the chunkset slice matrix; and repeating the selecting of the selected column and the matrix multiplying, by the computing device, of the selected column until each of the columns of the chunkset data matrix have been selected and matrix multiplied to produce the chunkset slice matrix.

4. The method of claim 1 further comprises:
encrypting, by the computing device, the decode threshold number of encoded data slices to produce a subset of encrypted encoded data slices; and
sending, by the computing device, the subset of encrypted encoded data slices and remaining encoded data slices of the set of encoded data slices to storage units for storage therein.

5. The method of claim 1, where the data comprises one or more of:
a text data object;
a portion of the text data object;
a video data object;
a portion of the vide data object;
an audio data object;
a portion of the audio data object;
an graphic image data object; and
a portion of the graphic image data object, wherein at least one of: the text data object, the portion of the text data object, the video data object, the portion of the vide data object, the audio data object, the portion of the audio data object, the graphic image data object, and the portion of the graphic image data object is in a group of data corresponding to the data grouping.

6. A computer readable memory device comprises:
a first memory section that stores operational instructions that, when executed by a computing device, causes the computing device to:
generate a data matrix from the data, wherein the data matrix includes a plurality of columns and a plurality of rows, a column of the plurality of columns is based on data size and a row of the plurality of rows is based on a data grouping;
a second memory section that stores operational instructions that, when executed by the computing device, causes the computing device to:
generate a chunkset data matrix from one or more rows of the data matrix, wherein generating the chunkset data matrix comprises:
selecting a row of the data matrix;
dividing the data grouping of the selected row into a decode threshold number of data sub-groupings;
determine the selected number of data blocks based on a desired data size for a data block of the selected number of data blocks in accordance with a desired level of reliability performance;
dividing each of the decode threshold number of data sub-groupings into the selected number of data blocks; and
arranging the selected number of data blocks of the decode threshold number of data sub-groupings into the chunkset data matrix;
a third memory section that stores operational instructions that, when executed by the computing device, causes the computing device to:
matrix multiply the chunkset data matrix by an encoding matrix to produce a chunkset slice matrix, wherein a row of the chunkset slice matrix corresponds to an encoded data slice and wherein the plurality of rows of the chunkset slice matrix corresponds to a set of encoded data slices, wherein a decode threshold number of encoded data slices of the set of encoded data slices is needed to recover the data grouping associated with the one or more rows of the data matrix.

7. The computer readable memory device of claim 6, wherein the first memory section further stores operational instructions that, when executed by the computing device, causes the computing device to generate the data matrix by:
obtaining the data, which includes a plurality of data groups;
determining a data length for a data chunkset based on size of one or more data groups of the plurality of data groups;
arranging the plurality of data groups into data chunksets based on the data length;
determining whether data padding is needed for one or more of the data chunksets; and
when data padding is needed for one or more of the data chunksets, adding data padding to the data one or more of the data chunksets such that each of the data chunksets is of a substantially similar data length.

8. The computer readable memory device of claim 6, wherein the third memory section further stores operational instructions that, when executed by the computing device, causes the computing device to matrix multiplying by:
selecting a column of the chunkset data matrix to produce a selected column of the chunkset data matrix;
matrix multiplying the selected column of the chunkset data matrix by the encoding matrix to produce a column of the chunkset slice matrix; and
repeating the selecting of the selected column and the matrix multiplying of the selected column until each of the columns of the chunkset data matrix have been selected and matrix multiplied to produce the chunkset slice matrix.

9. The computer readable memory device of claim 6, wherein the third memory section further stores operational instructions that, when executed by the computing device, causes the computing device to:
encrypt the decode threshold number of encoded data slices to produce a subset of encrypted encoded data slices; and
send the subset of encrypted encoded data slices and remaining encoded data slices of the set of encoded data slices to storage units for storage therein.

10. The computer readable memory device of claim 6, where the data comprises one or more of:
a text data object;
a portion of the text data object;
a video data object;
a portion of the vide data object;
an audio data object;
a portion of the audio data object;
an graphic image data object; and
a portion of the graphic image data object, wherein at least one of: the text data object, the portion of the text data object, the video data object, the portion of the vide data object, the audio data object, the portion of the audio data object, the graphic image data object, and the portion of the graphic image data object is in a group of data corresponding to the data grouping.

* * * * *